US 9,875,752 B2

(12) United States Patent
Sinder et al.

(10) Patent No.: US 9,875,752 B2
(45) Date of Patent: *Jan. 23, 2018

(54) VOICE PROFILE MANAGEMENT AND SPEECH SIGNAL GENERATION

(71) Applicant: QUALCOMM Incorporated, San Diego, CA (US)

(72) Inventors: Daniel Jared Sinder, San Diego, CA (US); Sharath Manjunath, Thornton, CO (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/603,270

(22) Filed: May 23, 2017

(65) Prior Publication Data
US 2017/0256268 A1 Sep. 7, 2017

Related U.S. Application Data

(63) Continuation of application No. 14/700,009, filed on Apr. 29, 2015, now Pat. No. 9,666,204.

(60) Provisional application No. 61/986,701, filed on Apr. 30, 2014.

(51) Int. Cl.
G10L 25/00 (2013.01)
G10L 21/003 (2013.01)
G10L 17/00 (2013.01)
G10L 25/48 (2013.01)
G10L 13/033 (2013.01)

(52) U.S. Cl.
CPC .......... *G10L 21/003* (2013.01); *G10L 13/033* (2013.01); *G10L 17/00* (2013.01); *G10L 25/48* (2013.01)

(58) Field of Classification Search
CPC ....... G06F 3/167; G10L 13/033; G10L 15/22; G10L 17/00; G10L 2015/223
USPC .......................................................... 704/270
See application file for complete search history.

(56) References Cited

U.S. PATENT DOCUMENTS 5,307,442 A 4/1994 Abe et al.
5,960,389 A 9/1999 Jarvinen et al.
6,026,360 A 2/2000 Ono
(Continued)

FOREIGN PATENT DOCUMENTS

WO 0072305 A2 11/2000

OTHER PUBLICATIONS

International Search Report and Written Opinion—PCT/US2015/028584—ISA/EPO—dated Sep. 8, 2015.
(Continued)

*Primary Examiner* — Charlotte M Baker
(74) *Attorney, Agent, or Firm* — Toler Law Group, P.C.

(57) ABSTRACT

A device includes a receiver, a memory, and a processor. The receiver is configured to receive a remote voice profile. The memory is electrically coupled to the receiver. The memory is configured to store a local voice profile associated with a person. The processor is electrically coupled to the memory and the receiver. The processor is configured to determine that the remote voice profile is associated with the person based on speech content associated with the remote voice profile or an identifier associated with the remote voice profile. The processor is also configured to select the local voice profile for profile management based on the determination.

34 Claims, 19 Drawing Sheets

(56) References Cited

U.S. PATENT DOCUMENTS

| | | | |
|---|---|---|---|
| 6,078,884 A | 6/2000 | Downey | |
| 7,720,681 B2* | 5/2010 | Milstein | G10L 25/48 704/210 |
| 2002/0174188 A1 | 11/2002 | Clark et al. | |
| 2003/0216912 A1 | 11/2003 | Chino | |
| 2006/0095259 A1 | 5/2006 | Bahl et al. | |
| 2007/0225980 A1 | 9/2007 | Sumita | |
| 2008/0065381 A1 | 3/2008 | Matsumoto | |
| 2008/0082332 A1 | 4/2008 | Mallett et al. | |
| 2008/0255827 A1 | 10/2008 | Nurminen et al. | |
| 2012/0105719 A1 | 5/2012 | Fratti et al. | |
| 2012/0265533 A1 | 10/2012 | Honeycutt | |
| 2014/0039895 A1 | 2/2014 | Aravamudani et al. | |
| 2015/0317977 A1 | 11/2015 | Manjunath et al. | |

OTHER PUBLICATIONS

Rabiner L., et al., "Fundamentals of Speech Recognition—Large Vocabulary Continuous Speech Recognition", Prentice Hall, 1993, pp. 434-495.

Shuang Z., et al., "Voice Conversion by Combining Frequency Warping with Unit Selection," IEEE International Conference on Acoustics, Speech and Signal Processing (ICASSP' 08), 2008, pp. 4661-4664.

Sundermann D., et al.,"Text-Independent Voice Conversion Based on Unit Selection", Proceedings of the International Conference on Acoustics, Speech, and Signal Processing (ICASSP), 2006, pp. I-81-I-84.

* cited by examiner

VOICE PROFILE MANAGEMENT AND SPEECH SIGNAL GENERATION

I. CROSS REFERENCE TO RELATED APPLICATIONS

The present application claims priority from and is a continuation application of U.S. Non-Provisional patent application Ser. No. 14/700,009, entitled "VOICE PROFILE MANAGEMENT AND SPEECH SIGNAL GENERATION," filed Apr. 29, 2015, which claims priority from U.S. Provisional Patent Application No. 61/986,701 entitled "SYSTEM AND METHOD TO REPLACE SPEECH SIGNALS," filed Apr. 30, 2014, the contents of which are incorporated by reference in their entireties.

II. FIELD

The present disclosure is generally related to voice profile management and speech signal generation.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, may communicate voice and data packets over wireless networks. Further, many such wireless telephones include other types of devices that are incorporated therein. For example, a wireless telephone may also include a digital still camera, a digital video camera, a digital recorder, and an audio file player. Also, such wireless telephones may process executable instructions, including software applications, such as a web browser application, that may be used to access the Internet. As such, these wireless telephones may include significant computing capabilities.

Transmission of voice by digital techniques is widespread, particularly in long distance and digital radio telephone applications. There may be an interest in determining the least amount of information that can be sent over a channel while maintaining a perceived quality of reconstructed speech. If speech is transmitted by sampling and digitizing, a data rate on the order of sixty-four kilobits per second (kbps) may be used to achieve a speech quality of an analog telephone. Through the use of speech analysis, followed by coding, transmission, and re-synthesis at a receiver, a significant reduction in the data rate may be achieved.

Devices for compressing speech may find use in many fields of telecommunications. An exemplary field is wireless communications. The field of wireless communications has many applications including, e.g., cordless telephones, paging, wireless local loops, wireless telephony such as cellular and personal communication service (PCS) telephone systems, mobile Internet Protocol (IP) telephony, and satellite communication systems. A particular application is wireless telephony for mobile subscribers.

Various over-the-air interfaces have been developed for wireless communication systems including, e.g., frequency division multiple access (FDMA), time division multiple access (TDMA), code division multiple access (CDMA), and time division-synchronous CDMA (TD-SCDMA). In connection therewith, various domestic and international standards have been established including, e.g., Advanced Mobile Phone Service (AMPS), Global System for Mobile Communications (GSM), and Interim Standard 95 (IS-95). An exemplary wireless telephony communication system is a code division multiple access (CDMA) system. The IS-95 standard and its derivatives, IS-95A, ANSI J-STD-008, and IS-95B (referred to collectively herein as IS-95), are promulgated by the Telecommunication Industry Association (TIA) and other well-known standards bodies to specify the use of a CDMA over-the-air interface for cellular or PCS telephony communication systems.

The IS-95 standard subsequently evolved into "3G" systems, such as cdma2000 and WCDMA, which provide more capacity and high speed packet data services. Two variations of cdma2000 are presented by the documents IS-2000 (cdma2000 1×RTT) and IS-856 (cdma2000 1×EV-DO), which are issued by TIA. The cdma2000 1×RTT communication system offers a peak data rate of 153 kbps whereas the cdma2000 1×EV-DO communication system defines a set of data rates, ranging from 38.4 kbps to 2.4 Mbps. The WCDMA standard is embodied in 3rd Generation Partnership Project "3GPP", Document Nos. 3G TS 25.211, 3G TS 25.212, 3G TS 25.213, and 3G TS 25.214. The International Mobile Telecommunications Advanced (IMT-Advanced) specification sets out "4G" standards. The IMT-Advanced specification sets peak data rate for 4G service at 100 megabits per second (Mbit/s) for high mobility communication (e.g., from trains and cars) and 1 gigabit per second (Gbit/s) for low mobility communication (e.g., from pedestrians and stationary users).

Devices that employ techniques to compress speech by extracting parameters that relate to a model of human speech generation are called speech coders. Speech coders may comprise an encoder and a decoder. The encoder divides the incoming speech signal into blocks of time, or analysis frames. The duration of each segment in time (or "frame") may be selected to be short enough that the spectral envelope of the signal may be expected to remain relatively stationary. For example, one frame length is twenty milliseconds, which corresponds to 160 samples at a sampling rate of eight kilohertz (kHz), although any frame length or sampling rate deemed suitable for the particular application may be used.

The encoder analyzes the incoming speech frame to extract certain relevant parameters, and then quantizes the parameters into binary representation, e.g., to a set of bits or a binary data packet. The data packets are transmitted over a communication channel (i.e., a wired and/or wireless network connection) to a receiver and a decoder. The decoder processes the data packets, unquantizes the processed data packets to produce the parameters, and resynthesizes the speech frames using the unquantized parameters.

The function of the speech coder is to compress the digitized speech signal into a low-bit-rate signal by removing natural redundancies inherent in speech. The digital compression may be achieved by representing an input speech frame with a set of parameters and employing quantization to represent the parameters with a set of bits. If the input speech frame has a number of bits $N_i$ and a data packet produced by the speech coder has a number of bits $N_o$, the compression factor achieved by the speech coder is $C_r = N_i/N_o$. The challenge is to retain high voice quality of the decoded speech while achieving the target compression factor. The performance of a speech coder depends on (1) how well the speech model, or the combination of the analysis and synthesis process described above, performs, and (2) how well the parameter quantization process is performed at the target bit rate of $N_o$ bits per frame. The goal of the speech model is thus to capture the essence of the speech signal, or the target voice quality, with a small set of parameters for each frame.

Speech coders generally utilize a set of parameters (including vectors) to describe the speech signal. A good set of parameters ideally provides a low system bandwidth for the reconstruction of a perceptually accurate speech signal. Pitch, signal power, spectral envelope (or formants), amplitude and phase spectra are examples of the speech coding parameters.

Speech coders may be implemented as time-domain coders, which attempt to capture the time-domain speech waveform by employing high time-resolution processing to encode small segments of speech (e.g., 5 millisecond (ms) sub-frames) at a time. For each sub-frame, a high-precision representative from a codebook space is found by means of a search algorithm. Alternatively, speech coders may be implemented as frequency-domain coders, which attempt to capture the short-term speech spectrum of the input speech frame with a set of parameters (analysis) and employ a corresponding synthesis process to recreate the speech waveform from the spectral parameters. The parameter quantizer preserves the parameters by representing them with stored representations of code vectors in accordance with known quantization techniques.

One time-domain speech coder is the Code Excited Linear Predictive (CELP) coder. In a CELP coder, the short-term correlations, or redundancies, in the speech signal are removed by a linear prediction (LP) analysis, which finds the coefficients of a short-term formant filter. Applying the short-term prediction filter to the incoming speech frame generates an LP residue signal, which is further modeled and quantized with long-term prediction filter parameters and a subsequent stochastic codebook. Thus, CELP coding divides the task of encoding the time-domain speech waveform into the separate tasks of encoding the LP short-term filter coefficients and encoding the LP residue. Time-domain coding can be performed at a fixed rate (i.e., using the same number of bits, $N_o$, for each frame) or at a variable rate (in which different bit rates are used for different types of frame contents). Variable-rate coders attempt to use the amount of bits needed to encode the codec parameters to a level adequate to obtain a target quality.

Time-domain coders such as the CELP coder may rely upon a high number of bits, $N_o$, per frame to preserve the accuracy of the time-domain speech waveform. Such coders may deliver excellent voice quality provided that the number of bits, $N_o$, per frame is relatively large (e.g., 8 kbps or above). At low bit rates (e.g., 4 kbps and below), time-domain coders may fail to retain high quality and robust performance due to the limited number of available bits. At low bit rates, the limited codebook space clips the waveform-matching capability of time-domain coders, which are deployed in higher-rate commercial applications. Hence, despite improvements over time, many CELP coding systems operating at low bit rates suffer from perceptually significant distortion characterized as noise.

An alternative to CELP coders at low bit rates is the "Noise Excited Linear Predictive" (NELP) coder, which operates under similar principles as a CELP coder. NELP coders use a filtered pseudo-random noise signal to model speech, rather than a codebook. Since NELP uses a simpler model for coded speech, NELP achieves a lower bit rate than CELP. NELP may be used for compressing or representing unvoiced speech or silence.

Coding systems that operate at rates on the order of 2.4 kbps are generally parametric in nature. That is, such coding systems operate by transmitting parameters describing the pitch-period and the spectral envelope (or formants) of the speech signal at regular intervals. Illustrative of these so-called parametric coders is the LP vocoder system.

LP vocoders model a voiced speech signal with a single pulse per pitch period. This basic technique may be augmented to include transmission information about the spectral envelope, among other things. Although LP vocoders provide reasonable performance generally, they may introduce perceptually significant distortion, characterized as buzz.

In recent years, coders have emerged that are hybrids of both waveform coders and parametric coders. Illustrative of these so-called hybrid coders is the prototype-waveform interpolation (PWI) speech coding system. The PWI coding system may also be known as a prototype pitch period (PPP) speech coder. A PWI coding system provides an efficient method for coding voiced speech. The basic concept of PWI is to extract a representative pitch cycle (the prototype waveform) at fixed intervals, to transmit its description, and to reconstruct the speech signal by interpolating between the prototype waveforms. The PWI method may operate either on the LP residual signal or the speech signal.

There may be research interest and commercial interest in improving audio quality of a speech signal (e.g., a coded speech signal, a reconstructed speech signal, or both). For example, a communication device may receive a speech signal with lower than optimal voice quality. To illustrate, the communication device may receive the speech signal from another communication device during a voice call. The voice call quality may suffer due to various reasons, such as environmental noise (e.g., wind, street noise), limitations of the interfaces of the communication devices, signal processing by the communication devices, packet loss, bandwidth limitations, bit-rate limitations, etc.

IV. SUMMARY

In a particular aspect, a device includes a receiver, a memory, and a processor. The receiver is configured to receive a remote voice profile. The memory is electrically coupled to the receiver. The memory is configured to store a local voice profile associated with a person. The processor is electrically coupled to the memory and the receiver. The processor is configured to determine that the remote voice profile is associated with the person based on speech content associated with the remote voice profile or an identifier associated with the remote voice profile. The processor is also configured to select the local voice profile for profile management based on the determination.

In another aspect, a method for communication includes receiving a remote voice profile at a device storing a local voice profile, the local voice profile associated with a person. The method also includes determining that the remote voice profile is associated with the person based on a comparison of the remote voice profile and the local voice profile, or based on an identifier associated with the remote voice profile. The method further includes selecting, at the device, the local voice profile for profile management based on the determination.

In another aspect, a device includes a memory and a processor. The memory is configured to store a plurality of substitute speech signals. The processor is electrically coupled to the memory. The processor is configured to receive a speech signal from a text-to-speech converter. The processor is also configured to detect a use mode of a plurality of use modes. The processor is further configured to select a demographic domain of a plurality of demographic domains. The processor is also configured to select a substitute speech signal of the plurality of substitute speech signals based on the speech signal, the demographic domain, and the use mode. The processor is further configured to generate a processed speech signal based on the substitute speech signal. The processor is also configured to provide the processed speech signal to at least one speaker.

Other aspects, advantages, and features of the present disclosure will become apparent after review of the application, including the following sections: Brief Description of the Drawings, Detailed Description, and the Claims.

V. BRIEF DESCRIPTION OF THE DRAWINGS

VI. DETAILED DESCRIPTION

Figure 1:
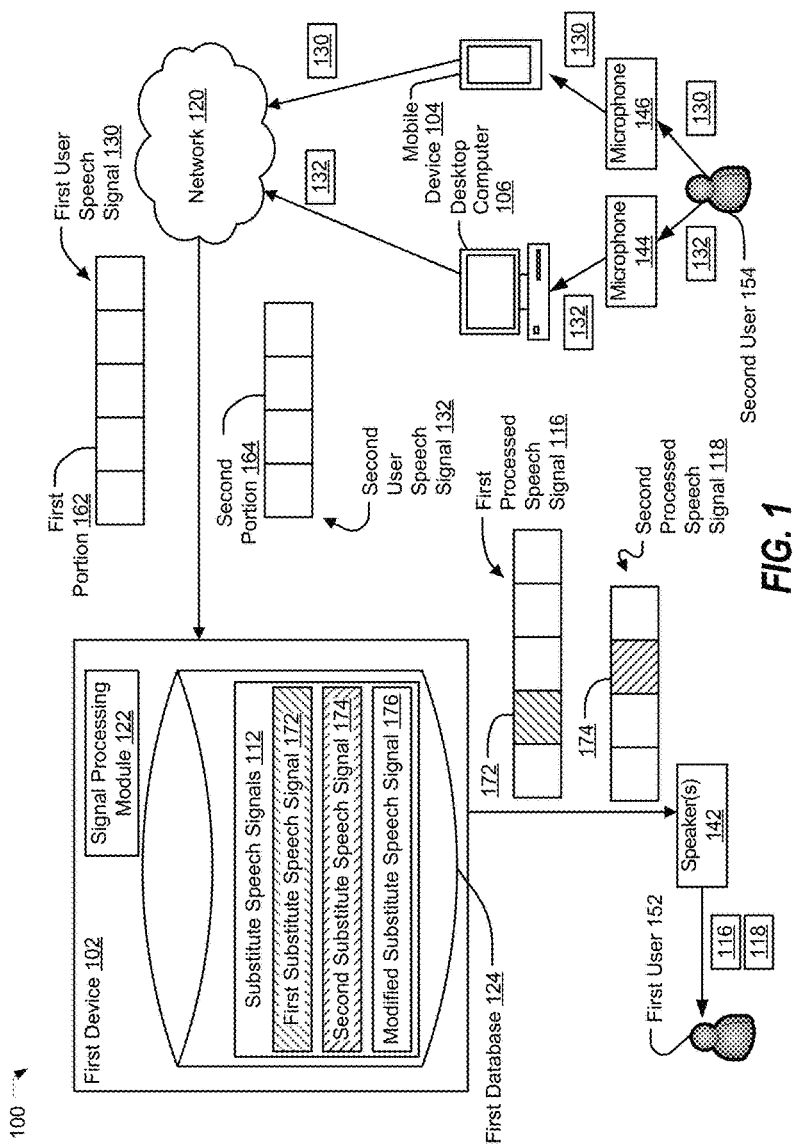
FIG. 1 is a block diagram of a particular illustrative aspect of a system that is operable to replace speech signals.

The principles described herein may be applied, for example, to a headset, a handset, or other audio device that is configured to perform speech signal replacement. Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, smoothing, and/or selecting from a plurality of values. Unless expressly limited by its context, the term "obtaining" is used to indicate any of its ordinary meanings, such as calculating, deriving, receiving (e.g., from another component, block or device), and/or retrieving (e.g., from a memory register or an array of storage elements).

Unless expressly limited by its context, the term "producing" is used to indicate any of its ordinary meanings, such as calculating, generating, and/or providing. Unless expressly limited by its context, the term "providing" is used to indicate any of its ordinary meanings, such as calculating, generating, and/or producing. Unless expressly limited by its context, the term "coupled" is used to indicate a direct or indirect electrical or physical connection. If the connection is indirect, it is well understood by a person having ordinary skill in the art, that there may be other blocks or components between the structures being "coupled".

The term "configuration" may be used in reference to a method, apparatus/device, and/or system as indicated by its particular context. Where the term "comprising" is used in the present description and claims, it does not exclude other elements or operations. The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B"). In the case (i) where A is based on B includes based on at least, this may include the configuration where A is coupled to B. Similarly, the term "in response to" is used to indicate any of its ordinary meanings, including "in response to at least." The term "at least one" is used to indicate any of its ordinary meanings, including "one or more". The term "at least two" is used to indicate any of its ordinary meanings, including "two or more".

The terms "apparatus" and "device" are used generically and interchangeably unless otherwise indicated by the particular context. Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The terms "method," "process," "procedure," and "technique" are used generically and interchangeably unless otherwise indicated by the particular context. The terms "element" and "module" may be used to indicate a portion of a greater configuration. Any incorporation by reference of a portion of a document shall also be understood to incorporate definitions of terms or variables that are referenced within the portion, where such definitions appear elsewhere in the document, as well as any figures referenced in the incorporated portion.

As used herein, the term "communication device" refers to an electronic device that may be used for voice and/or data communication over a wireless communication network. Examples of communication devices include cellular phones, personal digital assistants (PDAs), handheld devices, headsets, wireless modems, laptop computers, personal computers, etc.

Referring to FIG. 1, a particular illustrative aspect of a system operable to replace speech signals is disclosed and generally designated 100. The system 100 may include a first device 102 in communication with one or more other devices (e.g., a mobile device 104, a desktop computer 106, etc.) via a network 120. The mobile device 104 may be coupled to or in communication with a microphone 146. The desktop computer 106 may be coupled to or in communication with a microphone 144. The first device 102 may be coupled to one or more speakers 142. The first device 102 may include a signal processing module 122 and a first database 124. The first database 124 may be configured to store substitute speech signals 112.

The first device 102 may include fewer or more components than illustrated in FIG. 1. For example, the first device 102 may include one or more processors, one or more memory units, or both. The first device 102 may include a networked or a distributed computing system. In a particular illustrative aspect, the first device 102 may include a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, or a combination thereof. Such devices may include a user interface (e.g., a touch screen, voice recognition capability, or other user interface capabilities).

During operation, the first device 102 may receive a user speech signal (e.g., the first user speech signal 130, the second user speech signal 132, or both). For example, a first user 152 may be engaged in a voice call with a second user 154. The first user 152 may use the first device 102 and the second user 154 may use the mobile device 104 for the voice call. During the voice call, the second user 154 may speak into the microphone 146 coupled to the mobile device 104. The first user speech signal 130 may correspond to multiple words, a word, or a portion of a word spoken by the second user 154. The mobile device 104 may receive the first user speech signal 130, via the microphone 146, from the second user 154. In a particular aspect, the microphone 146 may capture an audio signal and an analog-to-digital converter (ADC) may convert the captured audio signal from an analog waveform into a digital waveform comprised of digital audio samples. The digital audio samples may be processed by a digital signal processor. A gain adjuster may adjust a gain (e.g., of the analog waveform or the digital waveform) by increasing or decreasing an amplitude level of an audio signal (e.g., the analog waveform or the digital waveform). Gain adjusters may operate in either the analog or digital domain. For example, a gain adjuster may operate in the digital domain and may adjust the digital audio samples produced by the analog-to-digital converter. After gain adjusting, an echo canceller may reduce any echo that may have been created by an output of a speaker entering the microphone 146. The digital audio samples may be "compressed" by a vocoder (a voice encoder-decoder). The output of the echo canceller may be coupled to vocoder pre-processing blocks, e.g., filters, noise processors, rate converters, etc. An encoder of the vocoder may compress the digital audio samples and form a transmit packet (a representation of the compressed bits of the digital audio samples). The transmit packet may be stored in a memory that may be shared with a processor of the mobile device 104. The processor may be a control processor that is in communication with a digital signal processor.

The mobile device 104 may transmit the first user speech signal 130 to the first device 102 via the network 120. For example, the mobile device 104 may include a transceiver. The transceiver may modulate some form (other information may be appended to the transmit packet) of the transmit packet and send the modulated information over the air via an antenna.

The signal processing module 122 of the first device 102 may receive the first user speech signal 130. For example, an antenna of the first device 102 may receive some form of incoming packets that comprise the transmit packet. The transmit packet may be "uncompressed" by a decoder of a vocoder at the first device 102. The uncompressed waveform may be referred to as reconstructed audio samples. The reconstructed audio samples may be post-processed by vocoder post-processing blocks and may be used by an echo canceller to remove echo. For the sake of clarity, the decoder of the vocoder and the vocoder post-processing blocks may be referred to as a vocoder decoder module. In some configurations, an output of the echo canceller may be processed by the signal processing module 122. Alternatively, in other configurations, the output of the vocoder decoder module may be processed by the signal processing module 122.

The audio quality of the first user speech signal 130 as received by the first device 102 may be lower than the audio quality of the first user speech signal 130 that the second user 154 sent. The audio quality of the first user speech signal 130 may deteriorate during transmission to the first device 102 due to various reasons. For example, the second user 154 may be in a noisy location (e.g., a busy street, a concert, etc.) during the voice call. The first user speech signal 130 received by the microphone 146 may include sounds in addition to the words spoken by the second user 154. As another example, the microphone 146 may have limited capability to capture sound, the mobile device 104 may process sound in a manner that loses some sound information, there may be packet loss within the network 120 during transmission of packets corresponding to the first user speech signal 130, or any combination thereof.

The signal processing module 122 may compare a portion of the speech signal (e.g., the first user speech signal 130, the second user speech signal 132, or both) to one or more of the substitute speech signals 112. For example, the first user speech signal 130 may correspond to a word (e.g., "cat") spoken by the second user 154 and a first portion 162 of the first user speech signal 130 may correspond to a portion (e.g., "c", "a", "t", "ca", "at", or "cat") of the word. The signal processing module 122 may determine that the first portion 162 matches a first substitute speech signal 172 of the substitute speech signals 112 based on the comparison. For example, the first portion 162 and the first substitute speech signal 172 may represent a common sound (e.g., "c"). The common sound may include a phoneme, a diphone, a triphone, a syllable, a word, or a combination thereof.

In a particular aspect, the signal processing module 122 may determine that the first portion 162 matches the first substitute speech signal 172 even when the first portion 162 and the first substitute speech signal 172 do not represent a common sound, such as a finite set of samples. The first portion 162 may correspond to a first set of samples (e.g., the word "do") and the first substitute speech signal 172 may correspond to a second set of samples (e.g., the word "to"). For example, the signal processing module 122 may determine that the first portion 162 has a higher similarity to the first substitute speech signal 172 as compared to other substitute speech signals of the substitute speech signals 112.

The first substitute speech signal 172 may have a higher audio quality (e.g., a higher signal-to-noise ratio value) than the first portion 162. For example, the substitute speech signals 112 may correspond to previously recorded words or portions of words spoken by the second user 154, as further described with reference to FIG. 2.

In a particular aspect, the signal processing module 122 may determine that the first portion 162 matches the first substitute speech signal 172 by comparing a waveform corresponding to the first portion 162 to another waveform corresponding to the first substitute speech signal 172. In a particular aspect, the signal processing module 122 may compare a subset of features corresponding to the first portion 162 to another subset of features corresponding to the first substitute speech signal 172. For example, the signal processing module 122 may determine that the first portion 162 matches the first substitute speech signal 172 by comparing a plurality of speech parameters corresponding to the first portion 162 to another plurality of speech parameters corresponding to the first substitute speech signal 172. The plurality of speech parameters may include a pitch parameter, an energy parameter, a linear predictive coding (LPC) parameter, mel-frequency cepstral coefficients (MFCC), line spectral pairs (LSP), line spectral frequencies (LSF), a cepstral, line spectral information (LSI), a discrete cosine transform (DCT) parameter (e.g., coefficient), a discrete fourier transform (DFT) parameter, a fast fourier transform (FFT) parameter, formant frequencies, or any combination thereof. The signal processing module 122 may determine values of the plurality of speech parameters using at least one of a vector quantizer, a hidden markov model (HMM), or a gaussian mixture model (GMM).

The signal processing module 122 may generate a processed speech signal (e.g., a first processed speech signal 116) by replacing the first portion 162 of the first user speech signal 130 with the first substitute speech signal 172. For example, the signal processing module 122 may copy the first user speech signal 130 and may remove the first portion 162 from the copied user speech signal. The signal processing module 122 may generate the first processed speech signal 116 by concatenating (e.g., splicing) the first substitute speech signal 172 and the copied user speech signal at a location of the copied user speech signal where the first portion 162 was removed.

In a particular aspect, the first processed speech signal 116 may include multiple substitute speech signals. In a particular aspect, the signal processing module 122 may splice the first substitute speech signal 172 and another substitute speech signal to generate an intermediate substitute speech signal. In this aspect, the signal processing module 122 may splice the intermediate substitute speech signal and the copied user speech signal at a location where the first portion 162 was removed. In an alternative aspect, the first processed speech signal 116 may be generated iteratively. During a first iteration, the signal processing module 122 may generate an intermediate processed speech signal by splicing the other substitute speech signal and the copied user speech signal at a location where a second portion is removed from the copied user speech signal. The intermediate processed speech signal may correspond to the first user speech signal 130 during a subsequent iteration. For example, the signal processing module 122 may remove the first portion 162 from the intermediate processed speech signal. The signal processing module 122 may generate the first processed speech signal 116 by splicing the first substitute speech signal 172 and the intermediate processed speech signal at the location where the first portion 162 was removed.

Such splicing and copying operations may be performed by a processor on a digital representation of an audio signal. In a particular aspect, the first processed speech signal 116 may be amplified or suppressed by a gain adjuster. The first device 102 may output the first processed speech signal 116, via the speakers 142, to the first user 152. For example, the output of the gain adjuster may be converted from a digital signal to an analog signal by a digital-to-analog-converter, and played out via the speakers 142.

In a particular aspect, the mobile device 104 may modify one or more speech parameters associated with the first user speech signal 130 prior to sending the first user speech signal 130 to the first device 102. In a particular aspect, the mobile device 104 may include the signal processing module 122. In this aspect, the one or more speech parameters may be modified by the signal processing module 122 of the mobile device 104. In a particular aspect, the mobile device 104 may have access to the substitute speech signals 112. For example, the mobile device 104 may have previously received the substitute speech signals 112 from a server, as further described with reference to FIG. 2.

The mobile device 104 may modify the one or more speech parameters to assist the signal processing module 122 in finding a match when comparing the first portion 162 of the first user speech signal 130 to the substitute speech signals 112. For example, the mobile device 104 may determine that the first substitute speech signal 172 (e.g., corresponding to "c" from "catatonic") is a better match for the first portion 162 (e.g., "c") of the first user speech signal 130 (e.g., "cat") than the second substitute speech signal 174 (e.g., corresponding to "c" from "cola"). The mobile device 104 may modify one or more speech parameters of the first portion 162 to assist the signal processing module 122 in determining that the first substitute speech signal 172 is a better match than the second substitute speech signal 174. For example, the mobile device 104 may modify a pitch parameter, an energy parameter, a linear predictive coding (LPC) parameter, or a combination thereof, such that the modified parameter is closer to a corresponding parameter of the first substitute speech signal 172 than to a corresponding parameter of the second substitute speech signal 174.

In a particular aspect, the mobile device 104 may send one or more transmission parameters to the first device 102. In a particular aspect, the signal processing module 122 of the mobile device 104 may send the transmission parameters to the first device 102. The transmission parameters may identify a particular substitute speech signal (e.g., the first substitute speech signal 172) that the mobile device 104 has determined to be a match for the first portion 162. As another example, the transmission parameter may include a particular vector quantizer table entry index number to assist the first device 102 in locating a particular vector quantizer in a vector quantizer table.

The modified speech parameters, the transmission parameters, or both, may assist the signal processing module 122 in selecting a substitute speech signal that matches the first portion 162. The efficiency of generating a processed speech signal (e.g., the first processed speech signal 116, the second processed speech signal 118) may also increase. For example, the signal processing module 122 may not compare the first portion 162 with each of the substitute speech signals 112 when the transmission parameters identify a particular substitute speech signal (e.g., the first substitute speech signal 172), resulting in an increased efficiency in generating the first processed speech signal 116.

In a particular aspect, the signal processing module 122 of the first device 102 may use a word prediction algorithm to predict a word that may include the first portion 162. For example, the word prediction algorithm may predict the word based on words that preceded the first user speech signal 130. To illustrate, the word prediction algorithm may determine the word based on subject-verb agreement, word relationships, grammar rules, or a combination thereof, related to the word and the preceding words. As another example, the word prediction algorithm may determine the word based on a frequency of the word in the preceding words, where the word includes the sound corresponding to the first portion 162. To illustrate, particular words may be repeated frequently in a particular conversation. The signal processing module 122 may predict that the first portion 162 corresponding to "c" is part of a word "cat" based on the preceding words including the word "cat" greater than a threshold number of times (e.g., 2). The signal processing module 122 may select the first substitute speech signal 172 based on the predicted word. For example, the first substitute speech signal 172, another substitute speech signal of the substitute speech signals 112, and the first portion 162 may all correspond to a common sound (e.g., "c"). The signal processing module 122 may determine that the first substitute speech signal 172 was generated from "catatonic" and the other substitute speech signal was generated from "cola". The signal processing module 122 may select the first substitute speech signal 172 in favor of the other substitute speech signal 172 based on determining that the first substitute speech signal 172 is closer to the predicted word than the other substitute speech signal.

In a particular aspect, the signal processing module 122 may determine that the processed speech signal (e.g., the first processed speech signal 116 or the second processed speech signal 118) does not meet a speech signal threshold. For example, the signal processing module 122 may determine that a variation of a speech parameter of the first processed speech signal 116 does not satisfy a threshold speech parameter variation. To illustrate, the variation of the speech parameter may correspond to a transition between the first substitute speech signal 172 and another portion of the first processed speech signal 116. In a particular aspect, the signal processing module 122 may modify the first processed speech signal 116 using a smoothing algorithm to reduce the variation of the speech parameter. In another particular aspect, the signal processing module 122 may discard the first processed speech signal 116 in response to the variation of the speech parameter not satisfying the threshold speech parameter. In this aspect, the signal processing module 122 may output the first user speech signal 130 via the speakers 142 to the first user 152.

In a particular aspect, the first device 102 may switch between outputting a processed speech signal (e.g., the first processed speech signal 116, the second processed speech signal 118) and a user speech signal (e.g., the first user speech signal 130, the second user speech signal 132) based on receiving a user input. For example, the first device 102 may receive a first input from the first user 152 indicating that the speech signal replacement is to be activated. In response to the first input, the first device 102 may output the first processed speech signal 116 via the speakers 142. As another example, the first device 102 may receive a second input from the first user 152 indicating that the speech signal replacement is to be deactivated. In response to the second input, the first device 102 may output the first user speech signal 130 via the speakers 142. In a particular aspect, the signal processing module 122 may include a user interface to enable a user (e.g., the first user 152) to manage the substitute speech signals 112. In this aspect, the first device 102 may receive the first input, the second input, or both, via the user interface of the signal processing module 122.

In a particular aspect, the signal processing module 122 may receive the first user speech signal 130 during a voice call, e.g., a call between the first user 152 and the second user 154, and may generate the first processed speech signal 116 during the voice call. In another particular aspect, the signal processing module 122 may receive the first user speech signal 130 (e.g., as a message from the second user 154) and may subsequently generate the first processed speech signal 116 and may store the first processed speech signal 116 for later playback to the first user 152.

In a particular aspect, the signal processing module 122 may use the substitute speech signals 112 to replace a portion of a user speech signal (e.g., the first user speech signal 130, the second user speech signal 132) corresponding to a particular user (e.g., the second user 154) irrespective of which device (e.g., the desktop computer 106, the mobile device 104) sends the user speech signal. For example, the signal processing module 122 may receive the second user speech signal 132 from the second user 154 via the microphone 144, the desktop computer 106, and the network 120. The signal processing module 122 may generate a second processed speech signal 118 by replacing a second portion 164 of the second user speech signal 132 with a second substitute speech signal 174 of the substitute speech signals 112.

In a particular aspect, the signal processing module 122 may generate a modified substitute speech signal (e.g., a modified substitute speech signal 176) based on a user speech signal (e.g., the first user speech signal 130, the second user speech signal 132). For example, the first portion 162 of the first user speech signal 130 and the first substitute speech signal 172 may correspond to a common sound and may each correspond to a different tone or inflection used by the second user 154. For example, the first user speech signal 130 may correspond to a surprised utterance by the second user 154, whereas the first substitute speech signal 172 may correspond to a calm utterance. The signal processing module 122 may generate the modified substitute speech signal 176 by modifying the first substitute speech signal 172 based on speech parameters corresponding to the first user speech signal 130. For example, the signal processing module 122 may modify at least one of a pitch parameter, an energy parameter, or a linear predictive coding parameter of the first substitute speech signal 172 to generate the modified substitute speech signal 176. The signal processing module 122 may add the modified substitute speech signal 176 to the substitute speech signals 112 in the first database 124. In a particular aspect, the first device 102 may send the modified substitute speech signal 176 to a server that maintains a copy of the substitute speech signals 112 associated with the second user 154.

Thus, the system 100 may enable replacement of speech signals. A portion of a user speech signal associated with a particular user may be replaced by a higher audio quality substitute speech signal associated with the same user.

Figure 2:
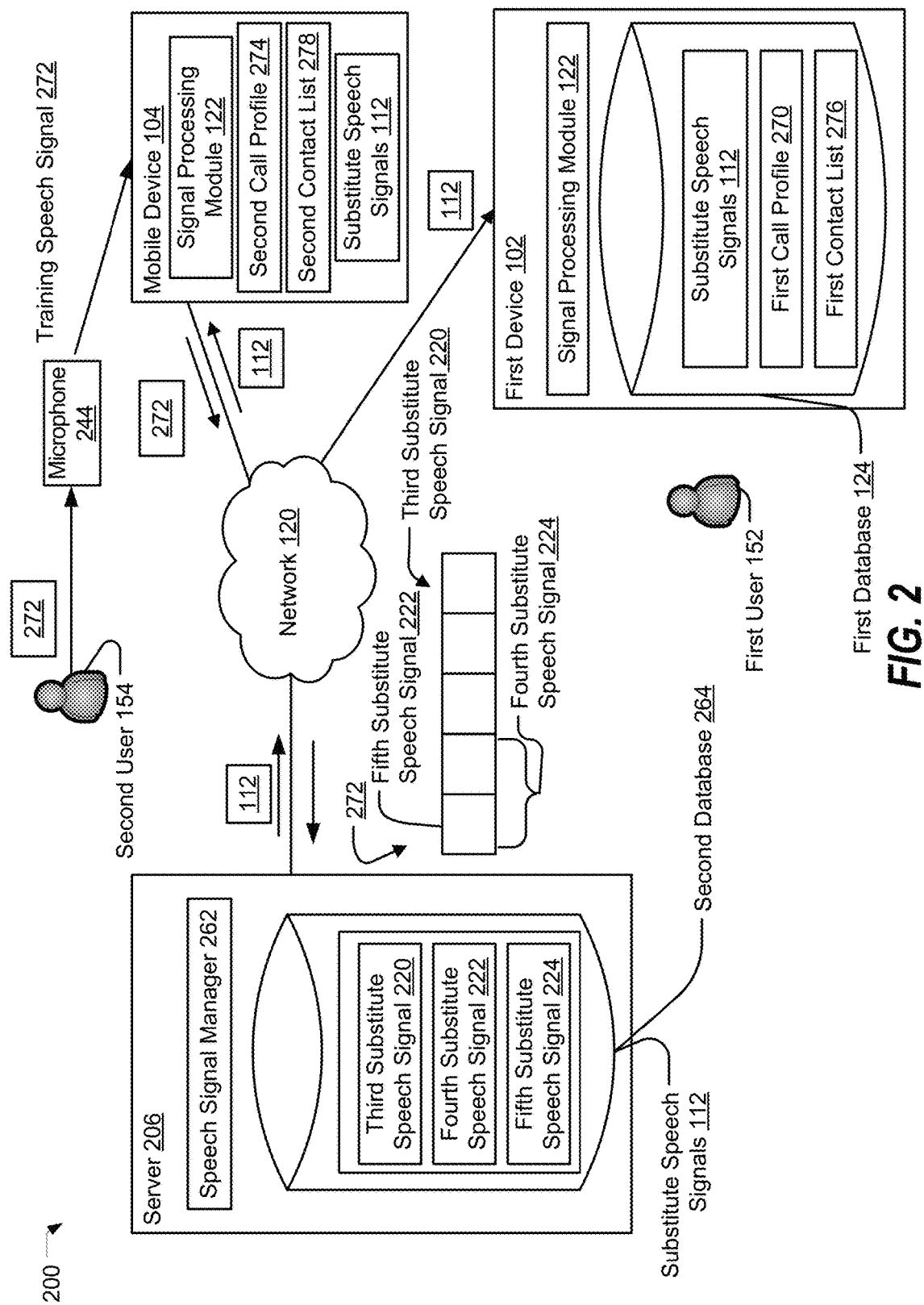
FIG. 2 is a diagram of another illustrative aspect of a system that is operable to replace speech signals.

Referring to FIG. 2, a particular illustrative aspect of a system operable to replace speech signals is disclosed and generally designated 200. The system 200 may include a server 206 coupled to, or in communication with, the first device 102 and the mobile device 104 via the network 120 of FIG. 1. The mobile device 104 may include the signal processing module 122 of FIG. 1. The server 206 may include a speech signal manager 262 and a second database 264.

FIG. 2 illustrates acquisition of the substitute speech signals 112 by the first device 102, the mobile device 104, or both. During operation, the second user 154 may send a training speech signal (e.g., a training speech signal 272) to the server 206. For example, the second user 154 may be a new employee and may be asked to read a script of text as part of an employee orientation. The second user 154 may send the training speech signal 272 by reading the script of words into a microphone 244 of the mobile device 104. For example, the second user 154 may read the script in a sound booth set up for the purpose of reading the script in a quiet environment. The signal processing module 122 of the mobile device 104 may send the training speech signal 272 to the server 206 via the network 120.

The speech signal manager 262 may generate the substitute speech signals 112 from the training speech signal 272. For example, the training speech signal 272 may correspond to a word (e.g., "catatonic"). The speech signal manager 262 may copy a particular portion of the training speech signal 272 to generate each of the substitute speech signals 112. To illustrate, the speech signal manager 262 may copy the training speech signal 272 to generate a third substitute speech signal 220 (e.g., "catatonic"). The speech signal manager 262 may copy a portion of the training speech signal 272 to generate a fourth substitute speech signal 224 (e.g., "ta"). The speech signal manager 262 may copy another portion of the training speech signal 272 to generate a fifth substitute speech signal 222 (e.g., "t"). The fourth substitute speech signal 224 and the fifth substitute speech signal 222 may correspond to overlapping portions of the training speech signal 272. In a particular aspect, a particular portion of the training speech signal 272 may be copied to generate a substitute speech signal based on the particular portion corresponding to a phoneme, a diphone, a triphone, a syllable, a word, or a combination thereof. In a particular aspect, a particular portion of the training speech signal 272 may be copied to generate a substitute speech signal based on a size of the particular portion. For example, the speech signal manager 262 may generate the substitute speech signal by copying a portion of the training speech signal 272 corresponding to a particular signal sample size (e.g., 100 milliseconds).

In a particular aspect, the speech signal manager 262 may determine a textual representation of a sound corresponding to a particular substitute speech signal. For example, the fifth substitute speech signal 222 may correspond to a particular sound (e.g., the sound "t"). The speech signal manager 262 may determine the textual representation (e.g., the letter "t") of the particular sound based on a comparison of the particular sound to another speech signal (e.g., a previously generated substitute speech signal of the second user 154, another substitute speech signal corresponding to another user or a synthetic speech signal) corresponding to the textual representation.

The speech signal manager 262 may store the substitute speech signals 112 in the second database 264. For example, the speech signal manager 262 may store the substitute speech signals 112 in the second database 264 as unaltered speech, in a compressed format, or in another format. The speech signal manager 262 may store selected features of the substitute speech signals 112 in the second database 264.

The speech signal manager 262 may store the textual representation of each of the substitute speech signals 112 in the second database 264.

The server 206 may send substitute speech signals (e.g., the substitute speech signals 112) to a device (e.g., the mobile device 104, the first device 102, the desktop computer 106). The server 206 may periodically send the substitute speech signals 112 to the device (e.g., the mobile device 104, the first device 102, the desktop computer 106). In a particular aspect, the server 206 may send the substitute speech signals 112 to a device in response to receiving a request from the device (e.g., the mobile device 104, the first device 102, the desktop computer 106). In an alternative aspect, the substitute speech signals 112 may be sent from a device (e.g., the mobile device 104, the first device 102, or the desktop computer 106) to another device (e.g., the mobile device 104, the first device 102, or the desktop computer 106) either periodically or in response to receiving a request.

In a particular aspect, the server 206 may send the substitute speech signals 112 associated with the second user 154 to one or more devices (e.g., the mobile device 104, the desktop computer 106) associated with the second user 154. For example, the second user 154 may send the training speech signal 272 to the server 206 by speaking into the microphone 244 in a quiet environment (e.g., at home) and may receive the substitute speech signals 112 from the server 206 at the mobile device 104. The substitute speech signals 112 associated with the second user 154 may be used by various applications on the one or more devices (e.g., the mobile device 104 or the desktop computer 106) associated with the second user 154. For example, the second user 154 may subsequently use a voice activated application on the mobile device 104 in a noisy environment (e.g., at a concert). The signal processing module 122 of the mobile device 104 may replace a portion of a user speech signal received from the second user 154 with one of the substitute speech signals 112 to generate a processed speech signal, as described with reference to FIG. 1. The processed speech signal may be used by the voice activated application on the mobile device 104. Thus, the voice activated application of the mobile device 104 may be used in a noisy environment (e.g., at a noisy concert).

As another example, an electronic reading application on the mobile device 104 may use the substitute speech signals 112 to output audio. The electronic reading application may output audio corresponding to an electronic mail (e-mail), an electronic book (e-book), an article, voice feedback, or any combination thereof. For example, the second user 154 may activate the electronic reading application to read an e-mail. A portion of the e-mail may correspond to "cat". The substitute speech signals 112 may indicate the textual representations corresponding to each of the substitute speech signals 112. For example, the substitute speech signals 112 may include the sounds "catatonic", "ca", and "t" and may indicate the textual representation of each sound. The electronic reading application may determine that a subset of the substitute speech signals 112 matches the portion of the e-mail based on a comparison of the portion of the e-mail (e.g., "cat") to the textual representation (e.g., "ca" and "t") of the subset. The electronic reading application may output the subset of the substitute speech signals 112. Thus, the electronic reading application may read the e-mail in a voice that sounds like the second user 154.

In a particular aspect, the system 200 may include a locking mechanism to disable unauthorized access to the substitute speech signals 112. A device (e.g., the first device 102, the mobile device 104, or the desktop computer 106) may be unable to generate (or use) the substitute speech signals 112 prior to receiving authorization (e.g., from a server). The authorization may be based on whether the first user 152, the second user 154, or both, have paid for a particular service. The authorization may be valid per use (e.g., per voice call, per application activation), per time period (e.g., a billing cycle, a week, a month, etc.), or a combination thereof. In a particular aspect, the authorization may be valid per update of the substitute speech signals 112. In a particular aspect, the authorization may be valid per application. For example, the mobile device 104 may receive a first authorization to use the substitute speech signals 112 during voice calls and receive another authorization to use the substitute speech signals 112 with an electronic reading application. In a particular aspect, the authorization may be based on whether the device is licensed to generate (or use) the substitute speech signals 112. For example, the mobile device 104 may receive authorization to use the substitute speech signals 112 in an electronic reading application in response to the second user 154 acquiring a license to use the electronic reading application on the mobile device 104.

In a particular aspect, the speech signal manager 262 may maintain a list of devices, users, or both, that are authorized to access the substitute speech signals 112. The speech signal manager 262 may send a lock request to a device (e.g., the first device 102, the mobile device 104, the desktop computer 106, or a combination thereof) in response to determining that the device is not authorized to access the substitute speech signals 112. The device may delete (or disable access to) locally stored substitute speech signals 112 in response to the lock request. For example, the speech signal manager 262 may send the lock request to a device (e.g., the first device 102, the mobile device 104 or the desktop computer 106) that was previously authorized to access the substitute speech signals 112.

In a particular aspect, the signal processing module 122 may determine an authorization status of a corresponding device (e.g., the first device 102) prior to each access of the substitute speech signal 112. For example, the signal processing module 122 may send an authorization status request to the server 206 and may receive the authorization status from the server 206. The signal processing module 122 may refrain from accessing the substitute speech signals 112 in response to determining that the first device 102 is not authorized. In a particular aspect, the signal processing module 122 may delete (or disable access to) the substitute speech signals 112. For example, the signal processing module 122 may delete the substitute speech signals 112 or disable access to the substitute speech signals 112 by a particular application.

In a particular aspect, the signal processing module 122 may delete the substitute speech signals 112 in response to a first user input received via the user interface of the signal processing module 122. In a particular aspect, the signal processing module 122 may send a deletion request to the server 206 in response to a second user input received via the user interface of the signal processing module 122. In response to the deletion request, the speech signal manager 262 may delete (or disable access to) the substitute speech signals 112. In a particular aspect, the speech signal manager 262 may delete (or disable access to) the substitute speech signals 112 in response to determining that the deletion request is received from a device (e.g., the mobile device 104 or the desktop computer 106) associated with a user (e.g., the second user 154) corresponding to the substitute speech signals 112.

In a particular aspect, the mobile device 104 may include a speech signal manager 262. The mobile device 104 may receive the training speech signal 272 and the speech signal manager 262 on the mobile device 104 may generate the substitute speech signals 112. The speech signal manager 262 may store the substitute speech signals 112 on the mobile device 104. In this aspect, the mobile device 104 may send the substitute speech signals 112 to the server 206.

In a particular aspect, the server 206 may send the substitute speech signals 112 associated with the second user 154 to one or more devices (e.g., the first device 102) associated with a user (e.g., the first user 152) distinct from the second user 154. For example, the server 206 may send the substitute speech signals 112 to the first device 102 based on a call profile (e.g., a first call profile 270, a second call profile 274) indicating a call frequency over a particular time period that satisfies a threshold call frequency. The first call profile 270 may be associated with the first user 152, the first device 102, or both. The second call profile 274 may be associated with the second user 154, the mobile device 104, or both. The call frequency may indicate a call frequency between the first user 152, the first device 102, or both, and the second user 154, the mobile device 104, or both. To illustrate, the server 206 may send the substitute speech signals 112 to the first device 102 based on the first call profile 270 indicating that a call frequency between the first user 152 and the second user 154 satisfies the threshold call frequency (e.g., 3 times in a preceding week). In a particular aspect, the server 206 may send the substitute speech signals 112 to the first device 102 prior to a voice call. For example, the server 206 may send the substitute speech signals 112 to the first device 102 prior to the voice call based on the call profile (e.g., the first call profile 270 or the second call profile 274).

As another example, the server 206 may send the substitute speech signals 112 to the first device 102 based on a contact list (e.g., a first contact list 276, a second contact list 278) indicating a particular user (e.g., the first user 152, the second user 154), a particular device (e.g., the first device 102, the mobile device 104), or a combination thereof. For example, the server 206 may send the substitute speech signals 112 associated with the second user 154 to one or more devices (e.g., the first device 102) associated with a particular user (e.g., the first user 152) based on the second contact list 278 indicating the particular user. In a particular aspect, the server 206 may send the substitute speech signals 112 to the first device 102 prior to a voice call. For example, the server 206 may send the substitute speech signals 112 to the first device 102 prior to the voice call based on the contact list (e.g., a first contact list 276, a second contact list 278). The server 206 may send the substitute speech signals 112 to the first device 102 in response to receiving the training speech signal 272.

In a particular aspect, the server 206 may send the substitute speech signals 112 in response to receiving a request for the substitute speech signals 112 from the first device 102, in response to receiving a request from the mobile device 104 to send the substitute speech signals 112 to the first device 102, or both. For example, the first device 102 may send the request for the substitute speech signals 112 in response to a user input received via a user interface of the signal processing module 122 of the first device 102. As another example, the mobile device 104 may send the request to send the substitute speech signals 112 in response to a user input received via a user interface of the signal processing module 122 of the mobile device 104. In a particular aspect, the server 206 may send the substitute speech signals 112 to the first device 102 in response to receiving a contact list update notification related to the first contact list 276, the second contact list 278, or both. The server 206 may receive the contact list update notification related to the first contact list 276 from the first device 102, and the server 206 may receive the contact list update notification related to the second contact list 278 from the mobile device 104. For example, the server 206 may receive the contact list update notification from the signal processing module 122 of the corresponding device.

In a particular aspect, the server 206 may send the substitute speech signals 112 to the first device 102 in response to receiving a call profile update notification related to the first call profile 270, the second call profile 274, or both. The server 206 may receive the call profile update notification related to the first call profile 270 from the first device 102, and the server 206 may receive the call profile update notification related to the second call profile 274 from the mobile device 104. For example, the server 206 may receive the call profile update notification from the signal processing module 122 of the corresponding device.

As a further example, the server 206 may send the substitute speech signals 112 associated with the second user 154 to the first device 102 in response to a call initiation notification regarding a voice call between a device (e.g., the mobile device 104, the desktop computer 106) associated with the second user 154 and the first device 102. For example, the server 206 may receive the call initiation notification from the mobile device 104 when the voice call is placed from the mobile device 104. In a particular aspect, the signal processing module 122 of the mobile device 104 may send the call initiation notification to the server 206. The server 206 may send at least a subset of the substitute speech signals 112 at a beginning of the voice call, during the voice call, or both. For example, the server 206 may begin sending the substitute speech signals 112 in response to receiving the call initiation notification. A first subset of the substitute speech signals 112 may be sent by the server 206 at the beginning of the voice call. A second subset of the substitute speech signals 112 may be sent by the server 206 during the voice call.

In a particular aspect, the speech signal manager 262 may include a user interface that enables a system administrator to perform diagnostics. For example, the user interface may display a usage profile including upload and download frequency associated with the substitute speech signals 112. The usage profile may also include the upload and download frequency per device (e.g., the first device 102, the mobile device 104, and/or the desktop computer 106).

Thus, the system 200 may enable acquisition of substitute speech signals that may be used to replace speech signals by the system 100 of FIG. 1.

Figure 3:
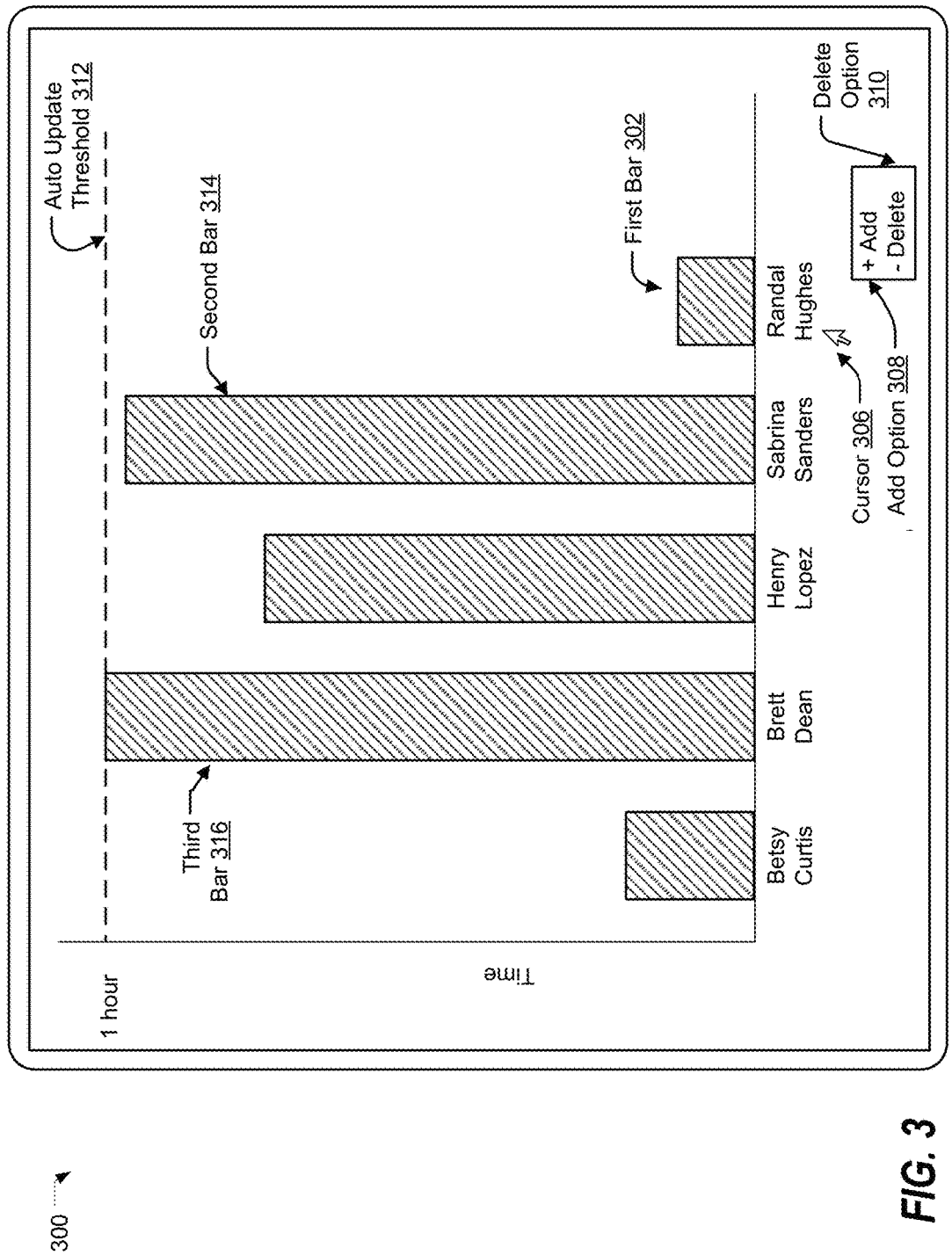
FIG. 3 is a diagram of a particular illustrative aspect of a user interface that may be displayed by a system that is operable to replace speech signals.

Referring to FIG. 3, an illustrative aspect of a user interface is disclosed and generally designated 300. In a particular aspect, the user interface 300 may be displayed by the system 100 of FIG. 1, the system 200 of FIG. 2, or both.

During operation, the signal processing module 122 of a device (e.g., the first device 102) may have access to a contact list of a user (e.g., the first user 152). The signal processing module 122 may provide the user interface 300 to a display of the first device 102. For example, the signal processing module 122 may provide the user interface 300 to a display of the first device 102 in response to receiving a request from the first user 152.

A horizontal axis (e.g., an x-axis) of the user interface 300 may display identifiers (e.g., names) of one or more users from the contact list (e.g., "Betsy Curtis", "Brett Dean", "Henry Lopez", "Sabrina Sanders", and "Randal Hughes"). In a particular aspect, the first user 152 may select the one or more users from the contact list and the user interface 300 may include names of the selected users along the horizontal axis. In another aspect, the signal processing module 122 may automatically select a subset of users from the contact list. For example, the subset of users may be a particular number (e.g., 5) of users that the first user 152 communicates with most frequently, that the first user 152 communicated with most recently, that the first user 152 communicated with for a longest duration (e.g., sum of phone call durations) over a particular time interval, or a combination thereof.

The user interface 300 may indicate time durations along the vertical axis (e.g., a y-axis). The time durations may be associated with speech signals corresponding to the one or more users. For example, the user interface 300 may include a first bar 302 corresponding to the second user 154 (e.g., "Randal Hughes"). The first bar 302 may indicate playback duration of one or more speech signals associated with the second user 154. For example, the first bar 302 may indicate playback duration of the training speech signal 272. In a particular aspect, the first bar 302 may indicate playback duration of speech signals associated with the second user 154 that are captured over a particular time interval (e.g., a particular day, a particular week, or a particular month).

In a particular aspect, the user interface 300 may indicate time durations of speech signals of particular users captured over distinct time intervals. For example, the first bar 302 may indicate a first time duration of speech signals of the second user 154 captured over a first time interval (e.g., a preceding week) and a second bar 314 associated with another user (e.g., "Sabrina Sanders") may indicate a second time duration of speech signals of the other user captured over a second time interval (e.g., a preceding month). For example, the first user 152 may have downloaded substitute speech signals associated with the second user 154 a week ago and the first bar 302 may indicate the first time duration of the speech signals of the second user 154 captured subsequent to the download. As another example, the first user 152 may have downloaded substitute speech signals associated with the other user a month ago and the second bar 314 may indicate the second time duration associated with the speech signals of the other user (e.g., "Sabrina Sanders") captured subsequent to the download.

The first user 152 may select the name (e.g., "Randal Hughes") of the second user 154 or the first bar 302 using a cursor 306. The user interface 300 may display an add option 308, a delete option 310, or both, in response to receiving the selection. The first user 152 may select the delete option 310. For example, the first user 152 may determine that additional substitute speech signals associated with the second user 154 are not to be generated. To illustrate, the first user 152 may determine that there is a sufficient collection of substitute speech signals associated with the second user 154, the first user 152 may not expect to communicate with the second user 154 in the near future, the first user 152 may want to conserve resources (e.g., memory or processing cycles), or a combination thereof. In response to receiving the selection of the delete option 310, the signal processing module 122 may remove the one or more speech signals associated with the second user 154, may remove the indication of the first time duration associated with the speech signals of the second user 154 from the user interface 300, or both.

In a particular aspect, the speech signals associated with the second user 154 may be stored in memory accessible to the first device 102 and the signal processing module 122 may remove the one or more speech signals associated with the second user 154 in response to receiving the selection of the delete option 310. In a particular aspect, the one or more speech signals associated with the second user 154 may be stored in memory accessible to a server (e.g., the server 206 of FIG. 2). The signal processing module 122 may send a delete request to the server 206 in response to receiving the selection of the delete option 310. In response to receiving the delete request, the server 206 may remove the speech signals associated with the second user 154, may make the speech signals associated with the second user 154 inaccessible to the first device 102, may make the speech signals associated with the second user 154 inaccessible to the first user 152, or a combination thereof. For example, the first user 152 may select the delete option 310 to make the speech signals associated with the second user 154 inaccessible to the first device 102. In this example, the first user 152 may want the one or more speech signals associated with the second user 154 to remain accessible to other devices.

Alternatively, the first user 152 may select the add option 308. In response to receiving the selection of the add option 308, the signal processing module 122 may request the speech signal manager 262 of FIG. 2 to provide substitute speech signals (e.g., the substitute speech signals 112) generated from the speech signals associated with the second user 154. The speech signal manager 262 may generate the substitute speech signals 112 using the speech signals associated with the second user 154, as described with reference to FIG. 2. The speech signal manager 262 may provide the substitute speech signals 112 to the signal processing module 122 in response to receiving the request from the signal processing module 122.

In a particular aspect, the signal processing module 122 may reset the first bar 302 (e.g., to zero) subsequent to receiving the selection of the delete option 310, subsequent to receiving the selection of the add option 308, or subsequent to receiving the substitute speech signals 112 from the speech signal manager 262. The first bar 302 may indicate the first time duration associated with the speech signals of the second user 154 that are captured subsequent to a previous deletion of speech signals associated with the second user 154 or subsequent to a previous download (or generation) of other substitute speech signals associated with the second user 154.

In a particular aspect, the signal processing module 122 may automatically send the request to the speech signal manager 262 for substitute speech signals in response to determining that a time duration (e.g., indicated by a third bar 316) corresponding to speech signals of a particular user (e.g., "Brett Dean") satisfies an auto update threshold 312 (e.g., 1 hour).

In a particular aspect, the signal processing module 122 may periodically (e.g., once a week) request the substitute speech signals 112 corresponding to speech signals associated with the second user 154. In another aspect, the speech signal manager 262 may periodically send the substitute speech signals 112 to the first device 102. In a particular aspect, the user interface 300 may enable the first user 152 to download the substitute speech signals 112 in addition to the periodic updates.

In a particular aspect, the speech signals associated with the second user 154 may be captured by the signal processing module 122 at a device (e.g., the mobile device 104) associated with the second user 154, by a device (e.g., the first device 102) associated with the first user 152, by a server (e.g., the server 206 of FIG. 2), or a combination thereof. For example, the signal processing module 122 at the first device 102 (or the mobile device 104) may record the speech signals during a phone call between the second user 154 and the first user 152. As another example, the speech signals may correspond to an audio message from the second user 154 stored at the server 206. In a particular aspect, the mobile device 104, the first device 102, or both, may provide the speech signals associated with the second user 154 to the server 206. In a particular aspect, the user interface 300 may indicate the time durations using a textual representation, a graphical representation (e.g., a bar chart, a pie chart, or both), or both.

The user interface 300 may thus enable the first user 152 to monitor availability of speech signals associated with users for substitute speech signal generation. The user interface 300 may enable the first user 152 to choose between generating substitute speech signals and conserving resources (e.g., memory, processing cycles, or both).

Figure 4:
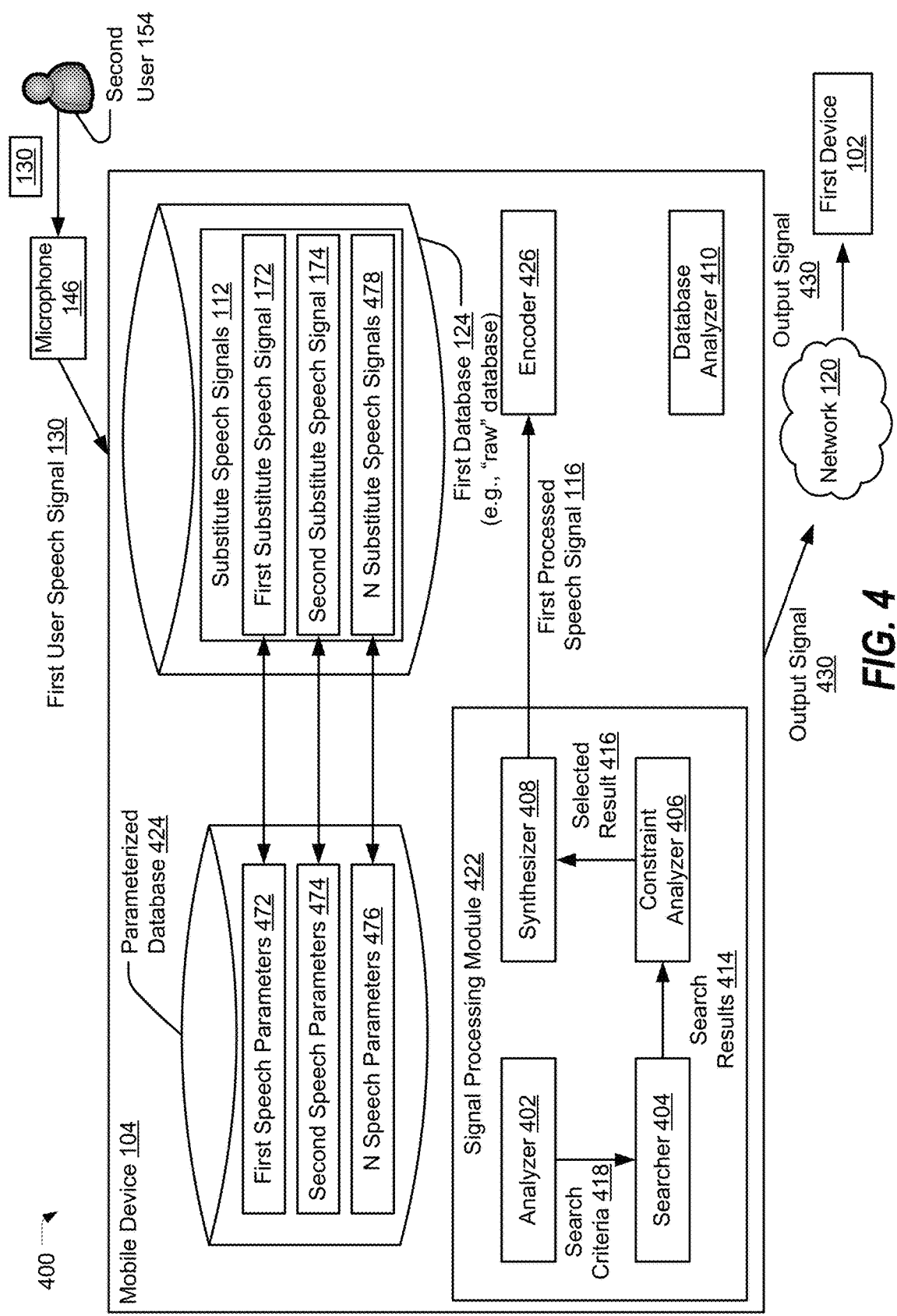
FIG. 4 is a diagram of another illustrative aspect of a system that is operable to replace speech signals.

Referring to FIG. 4, an illustrative aspect of a system that is operable to perform "pre-encode" replacement of speech signals is disclosed and generally designated 400. The system 400 may include the mobile device 104 in communication with the first device 102 via the network 120. The mobile device 104 may include a signal processing module 422 coupled to, or in communication with, an encoder 426. The mobile device 104 may include a database analyzer 410. The mobile device 104 may include the first database 124, a parameterized database 424, or both.

FIG. 4 illustrates replacement of a speech signal prior to providing the replaced speech signal to an encoder (e.g., the encoder 426). During operation, the mobile device 104 may receive the first user speech signal 130, via the microphone 146, from the second user 154. The first database 124 (e.g., a "raw" database) may include the substitute speech signals 112. The substitute speech signals 112 may include the first substitute speech signal 172, the second substitute speech signal 174, and N substitute speech signals 478. Each of the substitute speech signals 112 may be generated as described with reference to FIG. 2.

The parameterized database 424 may include a set of speech parameters associated with the substitute speech signals 112. For example, the parameterized database 424 may include first speech parameters 472 of the first substitute speech signal 172, second speech parameters 474 of the second substitute speech signal 174, and N speech parameters 476 of the N substitute speech signals 478. The speech parameters 472, 474, and 476 may take up less storage space than the substitute speech signals 112 so the parameterized database 424 may be smaller than the first database 124.

In a particular aspect, the parameterized database 424 may include a particular reference (e.g., an index, a database address, a database pointer, a memory address, a uniform resource locator (URL), a uniform resource identifier (URI), or a combination thereof) associated with each of the speech parameters 472, 474, and 476 to a location of a corresponding substitute speech signal in the first database 124. For example, the parameterized database 424 may include a first reference associated with the first speech parameters 472 to a first location of the first substitute speech signal 172 in the first database 124. The signal processing module 422 may use a particular reference to access a corresponding substitute speech signal associated with particular speech parameters. For example, the signal processing module 422 may use the first reference to access the first substitute speech signal 172 associated with the first speech parameters 472.

In a particular aspect, the first database 124 may include a particular reference (e.g., an index, a database address, a database pointer, a memory address, a uniform resource locator (URL), a uniform resource identifier (URI), or a combination thereof) associated with each of the substitute speech signals 112 to a location of corresponding speech parameters in the parameterized database 424. For example, the first database 124 may include a first reference associated with the first substitute speech signal 172 to a first location of the first speech parameters 472 in the parameterized database 424. The signal processing module 422 may use a particular reference to access corresponding speech parameters associated with a particular substitute speech signal. For example, the signal processing module 422 may use the first reference to access the first speech parameters 472 of the first substitute speech signal 172.

In a particular aspect, the database analyzer 410 may determine whether the parameterized database 424 is up-to-date in response to the mobile device 104 receiving the first user speech signal 130. For example, the database analyzer 410 may determine whether the parameterized database 424 includes speech parameters (e.g., the speech parameters 472, 474, and 476) associated with the substitute speech signals 112. To illustrate, the database analyzer 410 may determine whether the parameterized database 424 includes speech parameters corresponding to one or more substitute speech signals of the substitute speech signals 112. In response to determining that the parameterized database 424 includes speech parameters associated with the substitute speech signals 112, the database analyzer 410 may determine whether any modifications were made to the first database 124 subsequent to a previous update of the parameterized database 424. To illustrate, the database analyzer 410 may determine whether a modification timestamp of the first database 124 is subsequent to an update timestamp of the parameterized database 424. In response to determining that modifications were not made to the first database 124 subsequent to the previous update of the parameterized database 424, the database analyzer 410 may determine that the parameterized database 424 is up-to-date.

In response to determining that the parameterized database 424 does not include speech parameters associated with the substitute speech signals 112, or that modifications were made to the first database 124 subsequent to the previous update of the parameterized database 424, the database analyzer 410 may generate speech parameters corresponding to the substitute speech signals 112. For example, the database analyzer 410 may generate the first speech parameters 472 from the first substitute speech signal 172, the second speech parameters 474 from the second substitute speech signal 174, and the N speech parameters 476 from the N substitute speech signals 478. The first speech parameters 472, the second speech parameters 474, and the N speech parameters 476 may include a pitch parameter, an energy parameter, a linear predictive coding (LPC) parameter, or any combination thereof, of the first substitute speech signal 172, the second substitute speech signal 174, and the N substitute speech signals 478, respectively.

The signal processing module 422 may include an analyzer 402, a searcher 404, a constraint analyzer 406, and a synthesizer 408. The analyzer 402 may generate search criteria 418 based on the first user speech signal 130. The search criteria 418 may include a plurality of speech parameters associated with the first user speech signal 130. For example, the plurality of speech parameters may include a pitch parameter, an energy parameter, a linear predictive coding (LPC) parameter, or any combination thereof, of the first user speech signal 130. The analyzer 402 may provide the search criteria 418 to the searcher 404.

The searcher 404 may generate search results 414 by searching the parameterized database 424 based on the search criteria 418. For example, the searcher 404 may compare the plurality of speech parameters with each of the speech parameters 472, 474, and 476. The searcher 404 may determine that the first speech parameters 472 and the second speech parameters 474 match the plurality of speech parameters. For example, the searcher 404 may select (or identify) the first speech parameters 472 and the second speech parameters 474 based on the comparison. To illustrate, the first user speech signal 130 may correspond to "bat". The first substitute speech signal 172 may correspond to "a" generated from "cat", as described with reference to FIG. 2. The second substitute speech signal 174 may correspond to "a" generated from "tag", as described with reference to FIG. 2.

In a particular aspect, the searcher 404 may generate the search results 414 based on similarity measures associated with each of the speech parameters 472, 474, and 476. A particular similarity measure may indicate how closely related corresponding speech parameters are to the plurality of speech parameters associated with the first user speech signal 130. For example, the searcher 404 may determine a first similarity measure of the first speech parameters 472 by calculating a difference between the plurality of speech parameters of the first user speech signal 130 and the first speech parameters 472.

The searcher 404 may select speech parameters having a similarity measure that satisfies a similarity threshold. For example, the searcher 404 may select the first speech parameters 472 and the second speech parameters 474 in response to determining that the first similarity measure and a second similarity measure of the second speech parameters 474 satisfy (e.g., are below) the similarity threshold.

As another example, the searcher 404 may select a particular number (e.g., 2) of speech parameters that are most similar to the plurality of speech parameters of the first user speech signal 130 based on the similarity measures. The searcher 404 may include the selected speech parameters (e.g., the first speech parameters 472 and the second speech parameters 474) in the search results 414. In a particular aspect, the searcher 404 may include substitute speech signals corresponding to the selected pluralities of speech parameters in the search results 414. For example, the searcher 404 may include the first substitute speech signal 172 and the second substitute speech signal 174 in the search results 414. The searcher 404 may provide the search results 414 to the constraint analyzer 406.

The constraint analyzer 406 may select a particular search result (e.g., a selected result 416) from the search results 414 based on a constraint. The constraint may include an error constraint, a cost constraint, or both. For example, the constraint analyzer 406 may select the first speech parameters 472 (or the first substitute speech signal 172) from the search results 414 based on an error constraint or a cost constraint. To illustrate, the constraint analyzer 406 may generate a processed speech signal based on each of the search results 414. Each of the processed speech signals may represent the first user speech signal 130 having a portion replaced with the corresponding search result. The constraint analyzer 406 may identify a particular processed speech signal having a lowest error of the processed speech signals. For example, the constraint analyzer 406 may determine an error measure associated with each of the processed speech signals based on a comparison of the processed speech signal with the first user speech signal 130. In a particular aspect, the constraint analyzer 406 may identify the particular processed speech signal having a lowest cost. For example, the constraint analyzer 406 may determine a cost measure associated with each of the processed speech signals based on a cost of retrieving a substitute speech signal associated with the corresponding search result, one or more prior substitute speech signals, one or more subsequent substitute speech signals, or a combination thereof. To illustrate, the cost of retrieving a plurality of substitute signals may be determined based on a difference among memory locations corresponding to the plurality of substitute signals. For example, a lower cost may be associated with retrieving a subsequent substitute speech signal that is located closer in memory to a previously retrieved substitute speech signal. The constraint analyzer 406 may select the search result corresponding to the particular processed speech signal as the selected result 416.

The synthesizer 408 may generate the first processed speech signal 116 based on the selected result 416. For example, if the selected result 416 is associated with the first substitute speech signal 172, the synthesizer 408 may generate the first processed speech signal 116 by replacing at least a portion of the first user speech signal 130 with the first substitute speech signal 172. In a particular aspect, the synthesizer 408 may generate (e.g., synthesize) a replacement speech signal based on the first speech parameters 472 and may generate the first processed speech signal 116 by replacing at least a portion of the first user speech signal 130 with the replacement speech signal.

The synthesizer 408 may provide the first processed speech signal 116 to the encoder 426. The encoder 426 may generate an output signal 430 by encoding the first processed speech signal 116. In a particular aspect, the output signal 430 may indicate the first substitute speech signal 172. For example, the output signal 430 may include a reference to the first substitute speech signal 172 in the first database 124, a reference to the first speech parameters 472 in the parameterized database 424, or both. The mobile device 104 may send the output signal 430, via the network 120, to the first device 102.

The system 400 may thus enable "pre-encode" replacement of a portion of a user speech signal with a substitute speech signal prior to encoding the user speech signal. The substitute speech signal may have a higher audio quality than the replaced portion of the user speech signal. For example, the second user 154 may be talking on the mobile device 104 in a noisy environment (e.g., at a concert or at a busy street). The substitute speech signal may be generated from a training signal, as described with reference to FIG. 2, that the second user 154 provided in a quiet environment. The signal processing module 422 may provide a higher quality audio to an encoder than the original user speech signal. The encoder may encode the higher quality audio and may transmit the encoded signal to another device.

Figure 5:
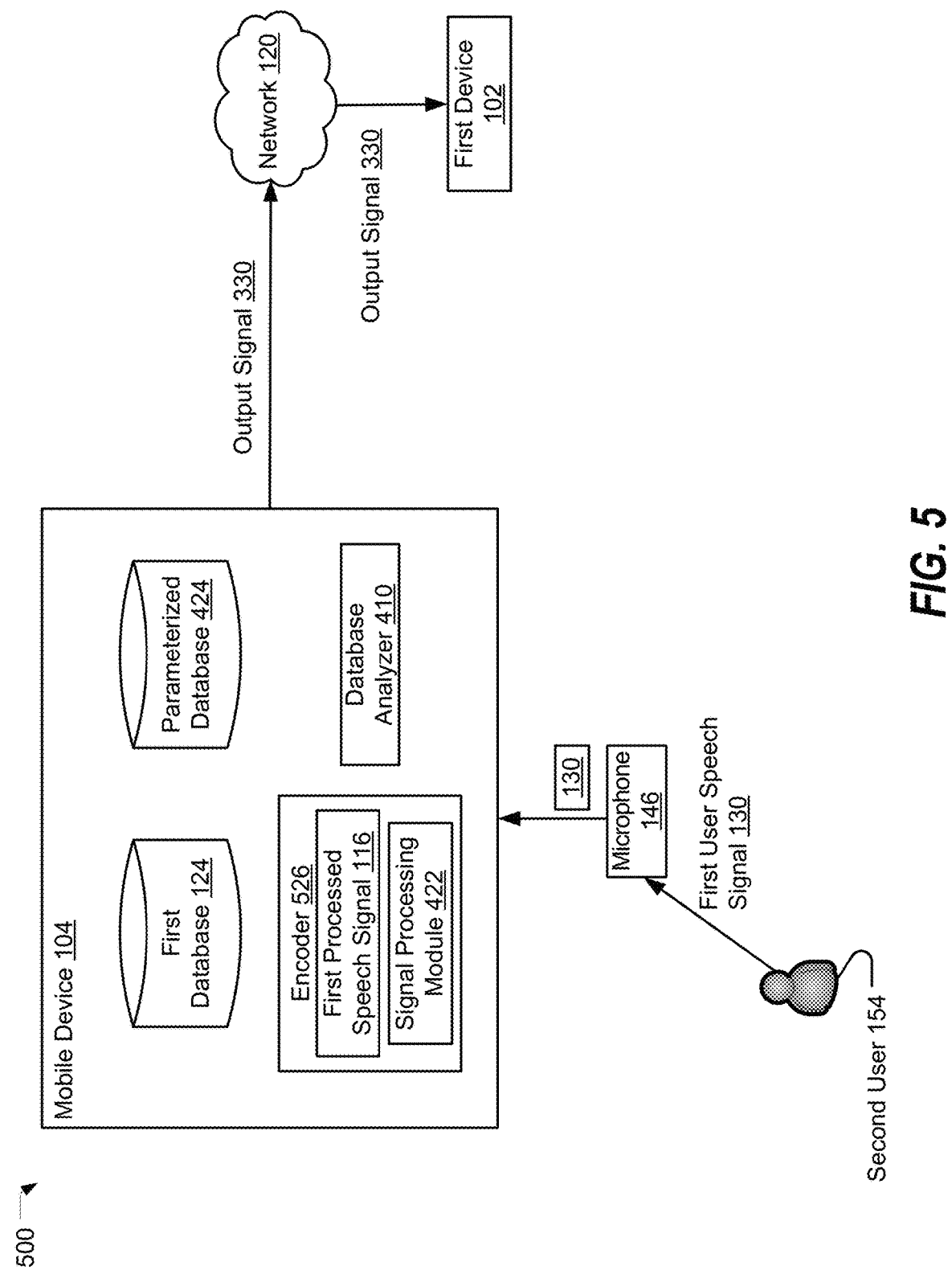
FIG. 5 is a diagram of another illustrative aspect of a system that is operable to replace speech signals.

Referring to FIG. 5, an illustrative aspect of a system that is operable to perform "in-encode" replacement of speech signals is disclosed and generally designated 500. The system 500 may include an encoder 526, the database analyzer 410, the first database 124, the parameterized database 424, or a combination thereof.

FIG. 5 illustrates replacement of a speech signal at an encoder (e.g., the encoder 526). Whereas the aspect of FIG. 4 illustrates the signal processing module 422 coupled to the encoder 426, the encoder 526 includes one or more components of the signal processing module 422. During operation, the mobile device 104 may receive the first user speech signal 130. Within the encoder 526, the analyzer 402 may generate the search criteria 418, the searcher 404 may generate the search results 414, the constraint analyzer 406 may generate the selected result 416, and the synthesizer 408 may generate the first processed speech signal 116, as described with reference to FIG. 4. The encoder 526 may generate the output signal 430 by encoding the first processed speech signal 116. The mobile device 104 may send the output signal 430, via the network 120, to the first device 102.

In a particular aspect, the constraint analyzer 406 may generate the first processed signal corresponding to the selected result 416, as described with reference to FIG. 4. The encoder 526 may generate the output signal 430 by encoding the first processed signal. In this aspect, the signal processing module 422 may refrain from generating the first processed speech signal 116. In a particular aspect, the output signal 430 may indicate the first substitute speech signal 172, as described with reference to FIG. 4.

The system 500 may thus enable generation of a processed speech signal at an encoder by performing "in-encode" replacement of a portion of a user speech signal associated with a user with a substitute speech signal. The processed speech signal may have a higher audio quality than the user speech signal. For example, the second user 154 may be talking on the mobile device 104 in a noisy environment (e.g., at a concert or at a busy street). The substitute speech signal may be generated from a training signal, as described with reference to FIG. 2, that the second user 154 provided in a quiet environment. The encoder may encode a higher quality audio than the original user speech signal and may transmit the encoded signal to another device. In a particular aspect, in-encode replacement of the portion of the user speech signal may reduce steps associated with generating the encoded speech signal from the user speech signal, resulting in faster and more efficient signal processing than pre-encode replacement of the portion of the user speech signal.

Figure 6:
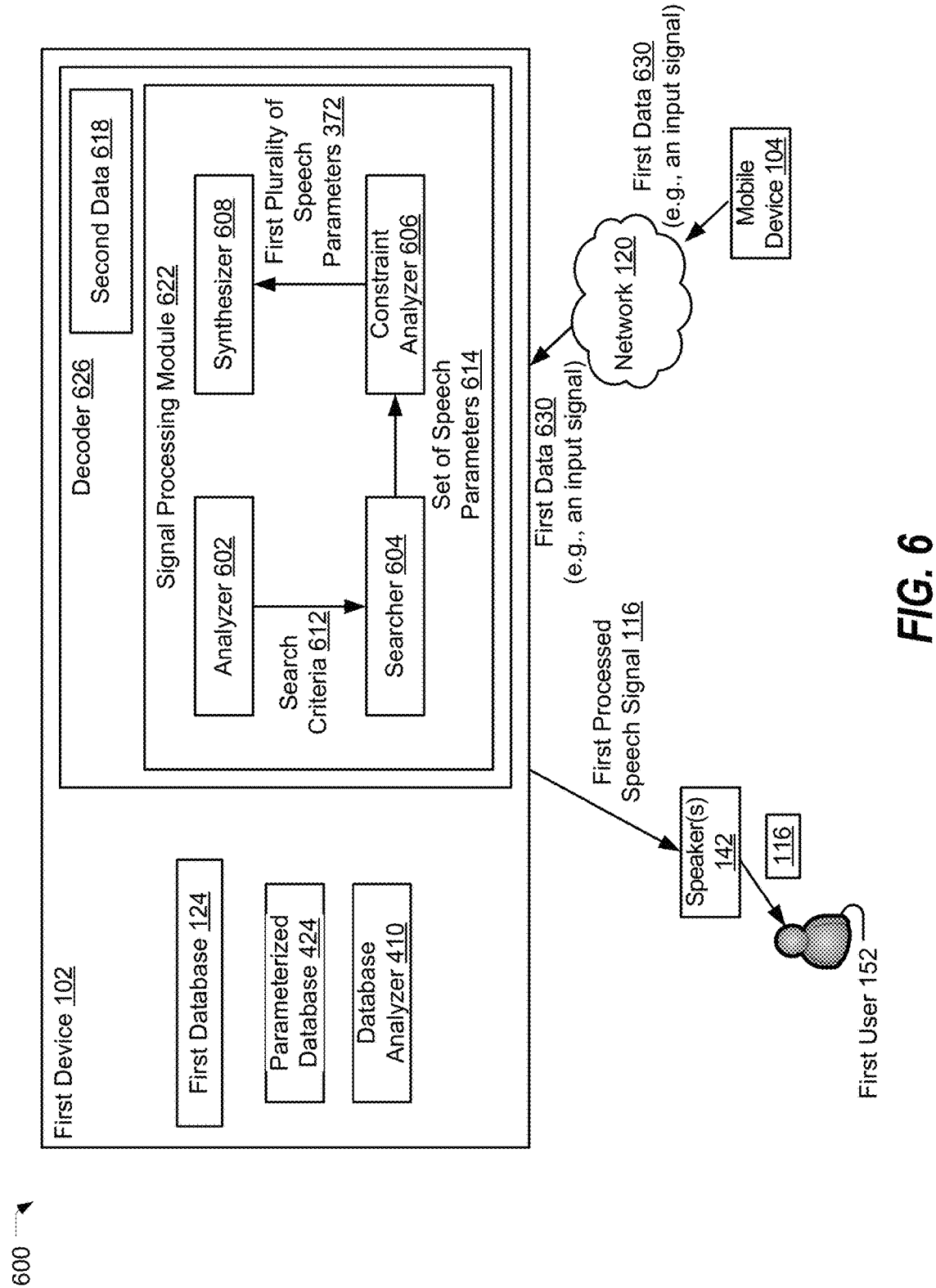
FIG. 6 is a diagram of another illustrative aspect of a system that is operable to replace speech signals.
Figure 7:
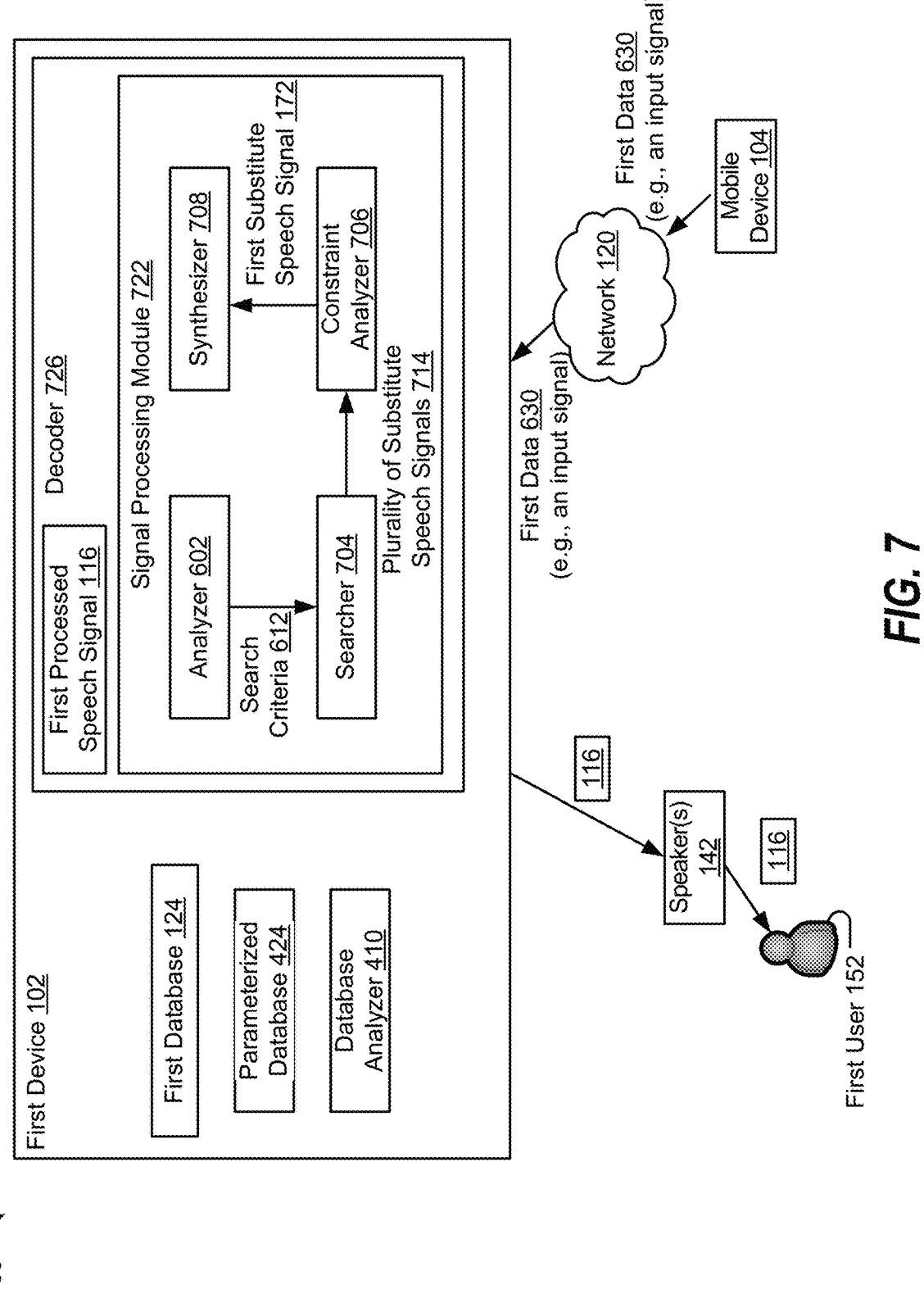
FIG. 7 is a diagram of another illustrative aspect of a system that is operable to replace speech signals.

Whereas aspects of FIGS. 4-5 illustrate replacement of a speech signal in an encoder system, aspects of FIGS. 6 and 7 illustrate replacement of a speech signal in a decoder system. In a particular aspect, speech signal replacement may occur at a local decoder of an encoder system. For example, a first processed speech signal may be generated by the local decoder to determine signal parameters based on a comparison of the first processed speech signal and a user speech signal (e.g., the first user speech signal 130). To illustrate, the local decoder may emulate behavior of a decoder at another device. The encoder system may encode the signal parameters to transmit to the other device.

Referring to FIG. 6, an illustrative aspect of a system that is operable to perform "parametric" replacement of speech signals at a decoder is disclosed and generally designated 600. The system 600 includes the first device 102. The first device 102 may include the first database 124, the parameterized database 424, the database analyzer 410, a decoder 626, or a combination thereof. The decoder 626 may include, be coupled to, or be in communication with, a signal processing module 622.

FIG. 6 illustrates replacement of a speech signal at a receiving device. During operation, the first device 102 may receive first data 630 via the network 120 from the mobile device 104. The first data 630 may include packet data corresponding to one or more frames of an audio signal. The audio signal may be a user speech signal corresponding to a user (e.g., the second user 154 of FIG. 1). The first data 630 may include a plurality of parameters associated with the audio signal. The plurality of parameters may include a pitch parameter, an energy parameter, a linear predictive coding (LPC) parameter, or any combination thereof.

The analyzer 602 may generate search criteria 612 based on the first data 630. For example, the analyzer 602 may extract the plurality of speech parameters associated with the audio signal from the first data 630. The search criteria 612 may include the extracted plurality of speech parameters. The analyzer 602 may provide the search criteria 612 to the searcher 604.

The searcher 604 may identify one or more speech parameters of the speech parameters 472, 474, and 476 of FIG. 4. In a particular aspect, the searcher 604 may identify the first speech parameters 472 and the second speech parameters 474 by comparing the plurality of speech parameters with each of the speech parameters 472, 474, and 476, as described with reference to the searcher 404 of FIG. 4. The searcher 604 may include the identified speech parameters (e.g., the first speech parameters 472 and the second speech parameters 474) in a set of speech parameters 614. The searcher 604 may provide the set of speech parameters 614 to the constraint analyzer 606. The constraint analyzer 606 may select the first speech parameters 472 of the set of speech parameters 614 based on a constraint, as described with reference to the constraint analyzer 406 of FIG. 4. The constraint analyzer 606 may provide the first speech parameters 472 to the synthesizer 608.

The synthesizer 608 may generate second data 618 by replacing the plurality of speech parameters in the first data 630 with the first speech parameters 472. The decoder 626 may generate the first processed speech signal 116 by decoding the second data 618. For example, the first processed speech signal 116 may be a processed signal generated based on the first speech parameters 472. The first device 102 may provide the first processed speech signal 116 to the speakers 142.

In a particular aspect, the analyzer 602 may determine that the first data 630 indicates the first substitute speech signal 172. For example, the analyzer 602 may determine that the first data 630 includes a reference to the first substitute speech signal 172 in the first database 124, a reference to the first speech parameters 472 in the parameterized database 424, or both. The analyzer 602 may provide the first speech parameters 472 to the synthesizer 608 in response to determining that the first data 630 indicates the first substitute speech signal 172. In this aspect, the analyzer 602 may refrain from generating the search criteria 612.

The system 600 may thus enable generating a processed speech signal by "parametric" replacement of a first plurality of speech parameters of received data with speech parameters corresponding to a substitute speech signal. Generating a processed signal using the speech parameters corresponding to the substitute speech signal may result in higher audio quality than generating the processed signal using the first plurality of speech parameters. For example, the received data may not represent a high quality audio signal. To illustrate, the received data may correspond to a user speech signal received from a user in a noisy environment (e.g., at a concert) and may be generated by another device without performing speech replacement. Even if the other device performed speech replacement, some of the data sent by the other device may not be received, e.g., because of packet loss, bandwidth limitations, and/or bit-rate limitations. The speech parameters may correspond to a substitute speech signal generated from a training signal, as described with reference to FIG. 2, that the second user 154 provided in a quiet environment. The decoder may use the speech parameters to generate a higher quality processed signal than may be generated using the first plurality of speech parameters.

Referring to FIG. 7, an illustrative aspect of a system that is operable to perform "waveform" replacement of speech signals at a decoder is disclosed and generally designated 700. The system 700 may include the first database 124, the parameterized database 424, the database analyzer 410, a decoder 726, or a combination thereof. The decoder 726 may include, be coupled to, or be in communication with, a signal processing module 722.

FIG. 7 illustrates replacement of a speech signal at a receiving device. Whereas the aspect of FIG. 6 illustrates generating a processed speech signal by replacing received speech parameters with speech parameters corresponding to a substitute speech signal, the aspect of FIG. 7 illustrates identifying the substitute speech signal based on the received speech parameters and generating the processed speech signal using the substitute speech signal.

During operation, the first device 102 may receive the first data 630. The analyzer 602 may generate the search criteria 612 based on the first data 630, as described with reference to FIG. 6. The searcher 604 may identify a subset (e.g., a plurality of substitute speech signals 714) of the substitute speech signal 112 based on the search criteria 612, as described with reference to the searcher 404 of FIG. 4. For example, the plurality of substitute speech signals 714 may include the first substitute speech signal 172 and the second substitute speech signal 174. The constraint analyzer 706 may select a first substitute speech signal (e.g., the first substitute speech signal 172) of the plurality of substitute speech signals 714 based on a constraint, as described with reference to the constraint analyzer 406 of FIG. 4. In a particular aspect, the constraint analyzer 706 may select the first speech parameters 472 based on the constraint, as described with reference to the constraint analyzer 406 of FIG. 4, and may select the first substitute speech signal 172 corresponding to the selected first speech parameters 472.

The constraint analyzer 706 may provide the first substitute speech signal 172 to the synthesizer 708. The synthesizer 708 may generate the first processed speech signal 116 based on the first substitute speech signal 172. For example, the synthesizer 708 may generate the first processed speech signal 116 by replacing a portion of the input signal with the first substitute speech signal 172. The first device 102 may output the first processed speech signal 116 via the speakers 142.

The system 700 may thus enable "waveform" replacement by receiving data corresponding to a user speech signal and generating a processed signal by replacing a portion of the user speech signal with a substitute speech signal. The processed signal may have higher audio quality than the user speech signal. For example, the received data may not represent a high quality audio signal. To illustrate, the received data may correspond to a user speech signal received from a user in a noisy environment (e.g., at a concert) and may be generated by another device without performing speech replacement. Even if the other device performed speech replacement, some of the data sent by the other device may not be received, e.g., because of packet loss, bandwidth limitations, and/or bit-rate limitations. The substitute speech signal may be generated from a training signal, as described with reference to FIG. 2, that the second user 154 provided in a quiet environment. The decoder may use the substitute speech signal to generate a higher quality processed signal than may be generated using the received data.

Figure 8:
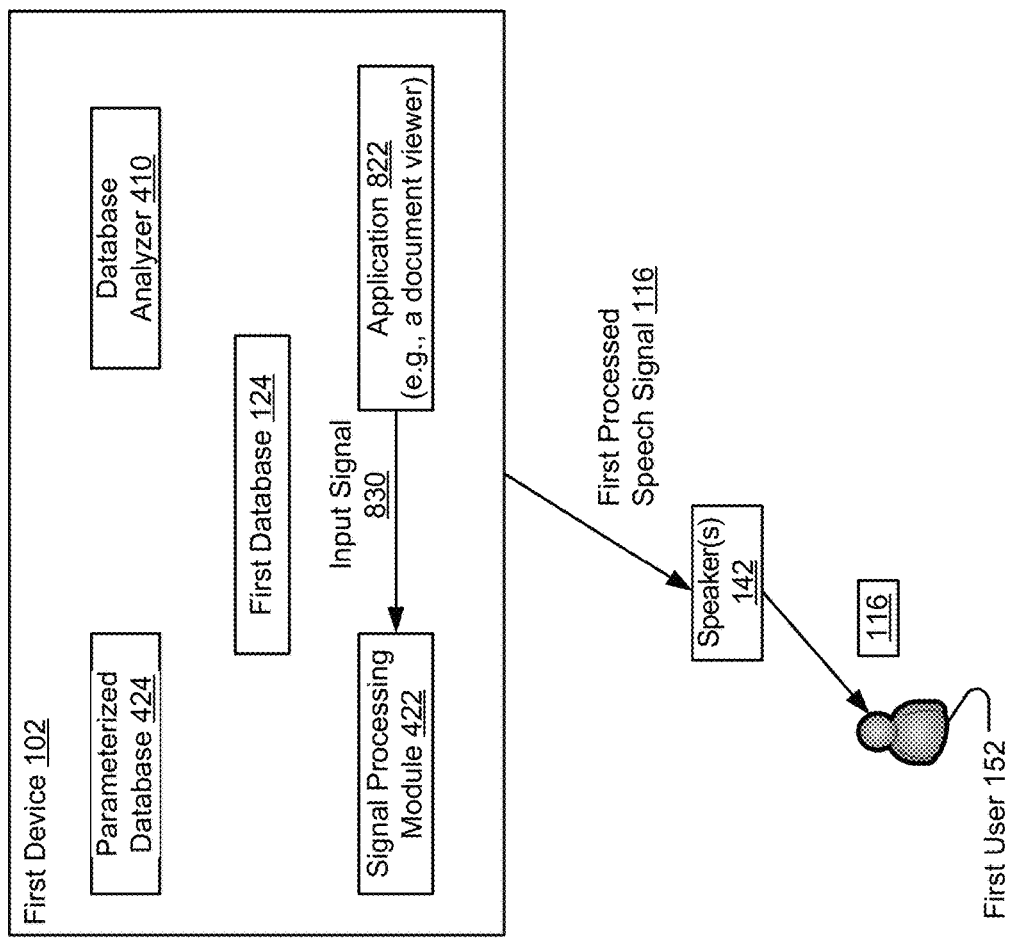
FIG. 8 is a diagram of another illustrative aspect of a system that is operable to replace speech signals.

Referring to FIG. 8, an illustrative aspect of a system that is operable to perform "in-device" replacement of speech signals is disclosed and generally designated 800. The system 800 may include the first database 124, the database analyzer 410, the signal processing module 422, the parameterized database 424, an application 822, or a combination thereof.

During operation, the signal processing module 422 may receive an input signal 830 from the application 822. The input signal 830 may correspond to a speech signal. The application 822 may include a document viewer application, an electronic book viewer application, a text-to-speech application, an electronic mail application, a communication application, an internet application, a sound recording application, or a combination thereof. The analyzer 402 may generate the search criteria 418 based on the input signal 830, the searcher 404 may generate the search results 414 based on the search criteria 418, the constraint analyzer 406 may identify the selected result 416, and the synthesizer 408 may generate the first processed speech signal 116 by replacing a portion of the input signal 830 with a replacement speech signal based on the selected result 416, as described with reference to FIG. 4. The first device 102 may output the first processed speech signal 116 via the speakers 142. In a particular aspect, the signal processing module 422 may generate the search criteria 418 in response to receiving a user request from the first user 152 to generate the first processed speech signal 116.

In a particular aspect, the first database 124 may include multiple sets of substitute speech signals. Each set of substitute speech signals may correspond to a particular celebrity, a particular character (e.g., a cartoon character, a television character, or a movie character), a particular user (e.g., the first user 152 or the second user 154), or a combination thereof. The first user 152 may select a particular set of substitute speech signals (e.g., the substitute speech signals 112). For example, the first user 152 may select a corresponding celebrity, a corresponding character, a corresponding user, or a combination thereof. The signal processing module 422 may use the selected set of substitute speech signals (e.g., the substitute speech signals 112) to generate the first processed speech signal 116, as described herein.

In a particular aspect, the first device 102 may send a request to another device (e.g., the server 206 of FIG. 2 or the mobile device 104). The request may identify the particular celebrity, the particular character, the particular user, or a combination thereof. The other device may send the substitute speech signals 112 to the first device 102 in response to receiving the request.

The system 800 may thus enable "in-device" replacement by replacing a portion of an input speech signal generated by an application with a substitute speech signal. The substitute speech signal may have higher audio quality than the input speech signal. In a particular aspect, the substitute speech signal may be generated from training speech of the first user 152. For example, the input speech signal generated by the application may sound robotic or may correspond to default voice. The first user 152 may prefer another voice (e.g., the voice of the first user 152, the second user 154 of FIG. 1, a particular celebrity, a particular character, etc.). The substitute speech signal may correspond to the preferred voice.

Although aspects of FIGS. 4-8 illustrate a local database analyzer 410, in a particular aspect the database analyzer 410, or components thereof, may be included in a server (e.g., the server 206 of FIG. 2). In this aspect, the mobile device 104, the first device 102, or both, may receive at least a portion of the parameterized database 424 from the server 206. For example, the server 206 may analyze the substitute speech signal 112 to generate the first speech parameters 472, the second speech parameters 474, the N speech parameters 476, or a combination thereof.

The server 206 may provide at least the portion of the parameterized database 424 to the mobile device 104, the first device 102, or both. For example, the mobile device 104, the first device 102, or both, may request at least the portion of the parameterized database 424 from the server 206, either periodically or in response to receiving the first user speech signal 130 of FIG. 1, the first data 630 of FIG. 6, the input signal 830, a user request, or a combination thereof. In an alternative aspect, the server 206 may periodically send at least the portion of the parameterized database 424 to the mobile device 104, the first device 102, or both.

In a particular aspect, a server (e.g., the server 206 of FIG. 2) may include the signal processing module 422. The server 206 may receive the first user speech signal 130 from the mobile device 104. The server 206 may generate the output signal 430, as described with reference to FIGS. 3 and 4. The server 206 may send the output signal 430 to the first device 102. In a particular aspect, the output signal 430 may correspond to the first data 630 of FIG. 6.

Figure 9:
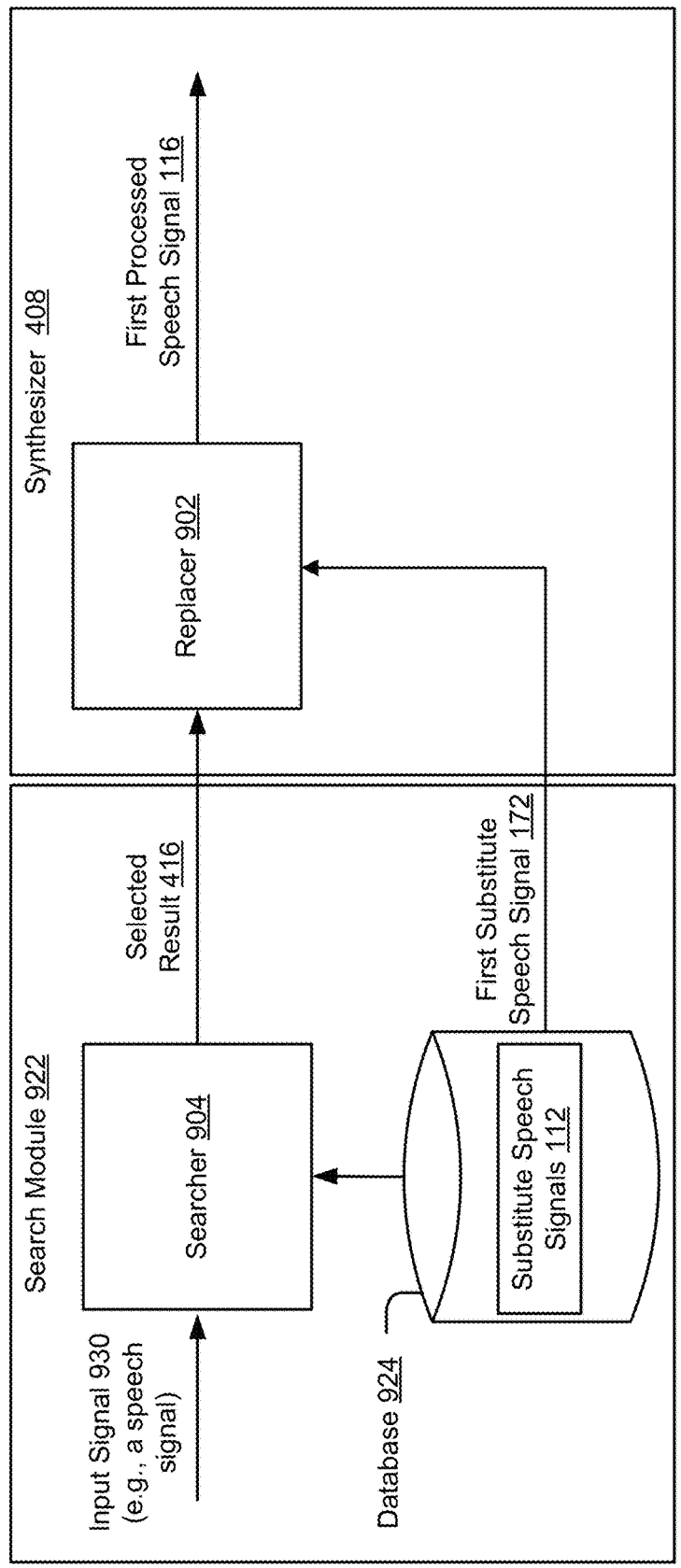
FIG. 9 is a diagram of another illustrative aspect of a system that is operable to replace speech signals.

Referring to FIG. 9, a diagram of a particular aspect of a system that is operable to replace speech signals is shown and generally designated 900. In a particular aspect, the system 900 may correspond to, or may be included in, the first device 102.

The system 900 includes a search module 922 coupled to the synthesizer 408. The search module 922 may include or have access to a database 924 coupled to a searcher 904. In a particular aspect, the database 924 may include the first database 124 of FIG. 1, the parameterized database 424 of FIG. 4, or both. For example, the database 924 may store the substitute speech signals 112 and/or a set of speech parameters (e.g., the speech parameters 472, 474, and/or 476) corresponding to the substitute speech signals 112. In a particular aspect, the database 924 may receive and store the substitute speech signals 112 and the set of speech parameters. For example, the database 924 may receive the substitute speech signals 112 and the set of speech parameters from another device (e.g., the server 206 of FIG. 2). As another example, the database 924 may receive the substitute speech signals 112 from the server 206 and the searcher 904 may generate the set of speech parameters using at least one of a vector quantizer, a hidden markov model (HMM), or a gaussian mixture model (GMM). The searcher 904 may store the generated set of speech parameters in the database 924.

In a particular aspect, the searcher 904 may include the analyzer 402 and the searcher 404 of FIG. 4. The synthesizer 408 may include a replacer 902. The replacer 902 may be coupled to the searcher 904 and to the database 924.

During operation, the searcher 904 may receive an input signal 930. The input signal 930 may correspond to speech. In a particular aspect, the input signal 930 may include the first user speech signal 130 of FIGS. 1 and 4-5, the first data 630 of FIGS. 6-7, or the input signal 830 of FIG. 8. For example, the searcher 904 may receive the input signal 930 from a user (e.g., the first user 152 of FIG. 1), another device, an application, or a combination thereof. The application may include a document viewer application, an electronic book viewer application, a text-to-speech application, an electronic mail application, a communication application, an internet application, a sound recording application, or a combination thereof.

The searcher 904 may compare the input signal 930 to the substitute speech signals 112. In a particular aspect, the searcher 904 may compare a first plurality of speech parameters of the input signal 930 to the set of speech parameters. The searcher 904 may determine the first plurality of speech parameters using at least one of a vector quantizer, a hidden markov model (HMM), or a gaussian mixture model (GMM).

The searcher 904 may determine that a particular substitute speech signal (e.g., the first substitute speech signal 172) matches the input signal 930 based on the comparison. For example, the searcher 904 may select the first substitute speech signal 172, the first speech parameters 472, or both, based on a comparison of the first plurality of speech parameters and the set of speech parameters corresponding to the substitute speech signals 112, a constraint, or both, as described with reference to FIG. 4.

The searcher 904 may provide a selected result 416 to the replacer 902. The selected result 416 may indicate the first substitute speech signal 172, the first speech parameters 472, or both. The replacer 902 may retrieve the first substitute speech signal 172 from the database 924 based on the selected result 416. The replacer 902 may generate the first processed speech signal 116 by replacing a portion of the input signal 930 with the first substitute speech signal 172, as described with reference to FIG. 4.

In a particular aspect, the database 924 may include labels associated with the substitute speech signals 112. For example, a first label may indicate a sound (e.g., a phoneme, a diphone, a triphone, a syllable, a word, or a combination thereof) corresponding to the first substitute speech signal 172. The first label may include a text identifier associated with the sound. In a particular aspect, the replacer 902 may retrieve the first label from the database 924 based on the selected result 416. For example, the selected result 416 may indicate the first substitute speech signal 172 and the replacer 902 may retrieve the corresponding first label from the database 924. The synthesizer 408 may generate a text output including the first label.

Existing speech recognition systems use a language model and operate on higher-order constructs, such as words or sounds. In contrast, the search module 922 does not use a language model and may operate at a parameter-level or at a signal-level to perform the comparison of the input signal 930 and the substitute speech signals 112 to determine the selected result 416.

The system 900 may enable replacement of the portion of the input signal 930 with the first substitute speech signal 172 to generate the first processed speech signal 116. The first processed speech signal 116 may have a higher audio quality than the input signal 930.

Figure 10:
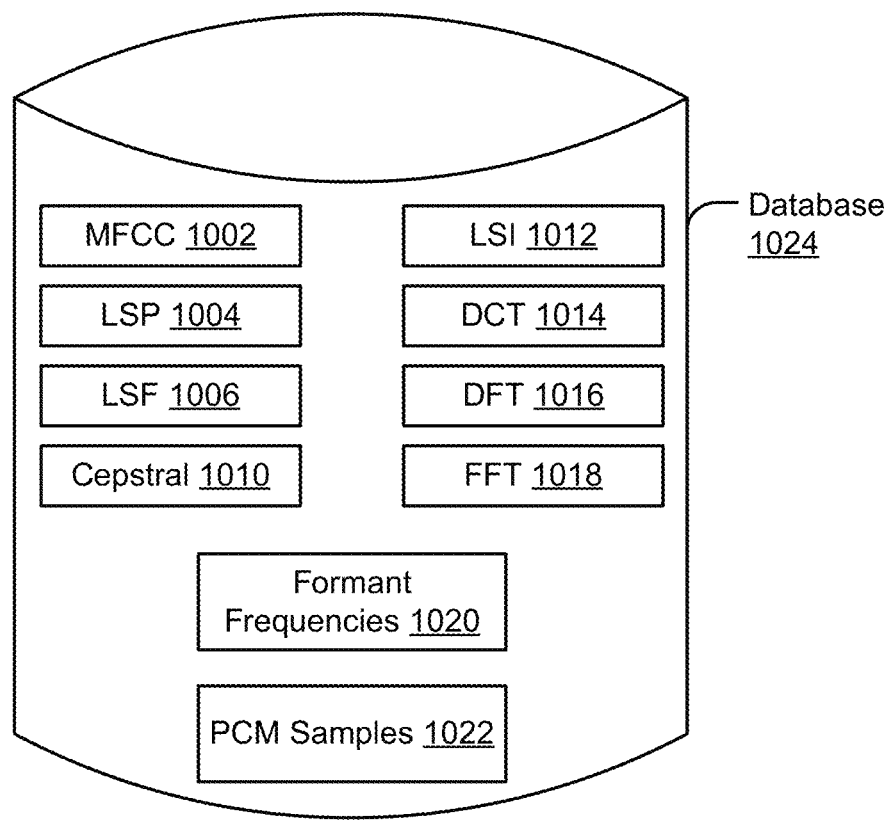
FIG. 10 is a diagram of an illustrative aspect of a database that may be used by a system operable to replace speech signals.

Referring to FIG. 10, a diagram of a particular aspect of a database is shown and generally designated 1024. In a particular aspect, the database 1024 may correspond to the first database 124 of FIG. 1, the parameterized database 424 of FIG. 4, the database 924 of FIG. 9, or a combination thereof.

The database 1024 may include mel-frequency cepstral coefficients (MFCC) 1002, line spectral pairs (LSP) 1004, line spectral frequencies (LSF) 1006, a cepstral 1010, line spectral information (LSI) 1012, discrete cosine transform (DCT) parameters 1014, discrete fourier transform (DFT) parameters 1016, fast fourier transform (FFT) parameters 1018, formant frequencies 1020, pulse code modulation (PCM) samples 1022, or a combination thereof.

In a particular aspect, an analog-to-digital convertor (ADC) of a device (e.g., the server 206 of FIG. 2) may generate the PCM samples 1022 based on a training speech signal (e.g., the training speech signal 272). The speech signal manager 262 may receive the PCM samples 1022 from the ADC and may store the PCM samples 1022 in the database 1024. The speech signal manager 262 may generate the substitute speech signals 112, as described with reference to FIG. 2, based on the PCM samples 1022.

The speech signal manager 262 may calculate a representation of a spectrum of each of the PCM samples 1022. For example, the speech signal manager 262 may generate the MFCC 1002, the LSP 1004, the LSF 1006, the cepstral 1010, the LSI 1012, the DCT parameters 1014, the DFT parameters 1016, the FFT parameters 1018, the formant frequencies 1020, or a combination thereof, corresponding to each of the PCM samples 1022 (or each of the substitute speech signals 112).

For example, the MFCC 1002 may be a representation of a short-term power spectrum of a sound corresponding to a particular PCM sample. The speech signal manager 262 may determine the MFCC 1002 based on a linear cosine transform of a log power spectrum on a non-linear mel-scale of frequency. The log power spectrum may correspond to the particular PCM sample.

As another example, the LSP 1004 or the LSF 1006 may be a representation of linear prediction coefficients (LPC) corresponding to the particular PCM sample. The LPC may represent a spectral envelope of the particular PCM sample. The speech signal manager 262 may determine the LPC of the particular PCM sample based on a linear predictive model. The speech signal manager 262 may determine the LSP 1004, the LSF 1006, or both, based on the LPC.

As a further example, the cepstral 1010 may represent a power spectrum of the particular PCM sample. The speech signal manager 262 may determine the cepstral 1010 by applying an inverse fourier transform (IFT) to a logarithm of an estimated spectrum of the particular PCM sample.

As an additional example, the LSI 1012 may represent a spectrum of the particular PCM sample. The speech signal manager 262 may apply a filter to the particular PCM sample to generate the LSI 1012.

The speech signal manager 262 may apply a particular discrete cosine transform (DCT) to the particular PCM sample to generate the DCT parameters 1014, may apply a particular discrete fourier transform (DFT) to the particular PCM sample to generate the DFT parameters 1016, may apply a particular fast fourier transform (FFT) to the particular PCM sample to generate the FFT parameters 1018, or a combination thereof.

The formant frequencies 1020 may represent spectral peaks of a spectrum of the particular PCM sample. The speech signal manager 262 may determine the formant frequencies 1020 based on phase information of the particular PCM sample, by applying a band pass filter to the particular PCM sample, by performing an LPC analysis of the particular PCM sample, or a combination thereof.

In a particular aspect, the MFCC 1002, the LSP 1004, the LSF 1006, the cepstral 1010, the LSI 1012, the DCT parameters 1014, the DFT parameters 1016, the FFT parameters 1018, the formant frequencies 1020, or a combination thereof, may correspond to the first speech parameters 472 and the particular PCM sample may correspond to the first substitute speech signal 172.

The database 1024 illustrates examples of parameters of a substitute speech signal that may be used by a signal processing module to compare an input speech signal to a plurality of substitute speech signals during a search for a matching substitute speech signal. The signal processing module may generate a processed signal by replacing a portion of the input speech signal with the matching substitute speech signal. The processed signal may have a better audio quality than the input speech signal.

Figure 11:
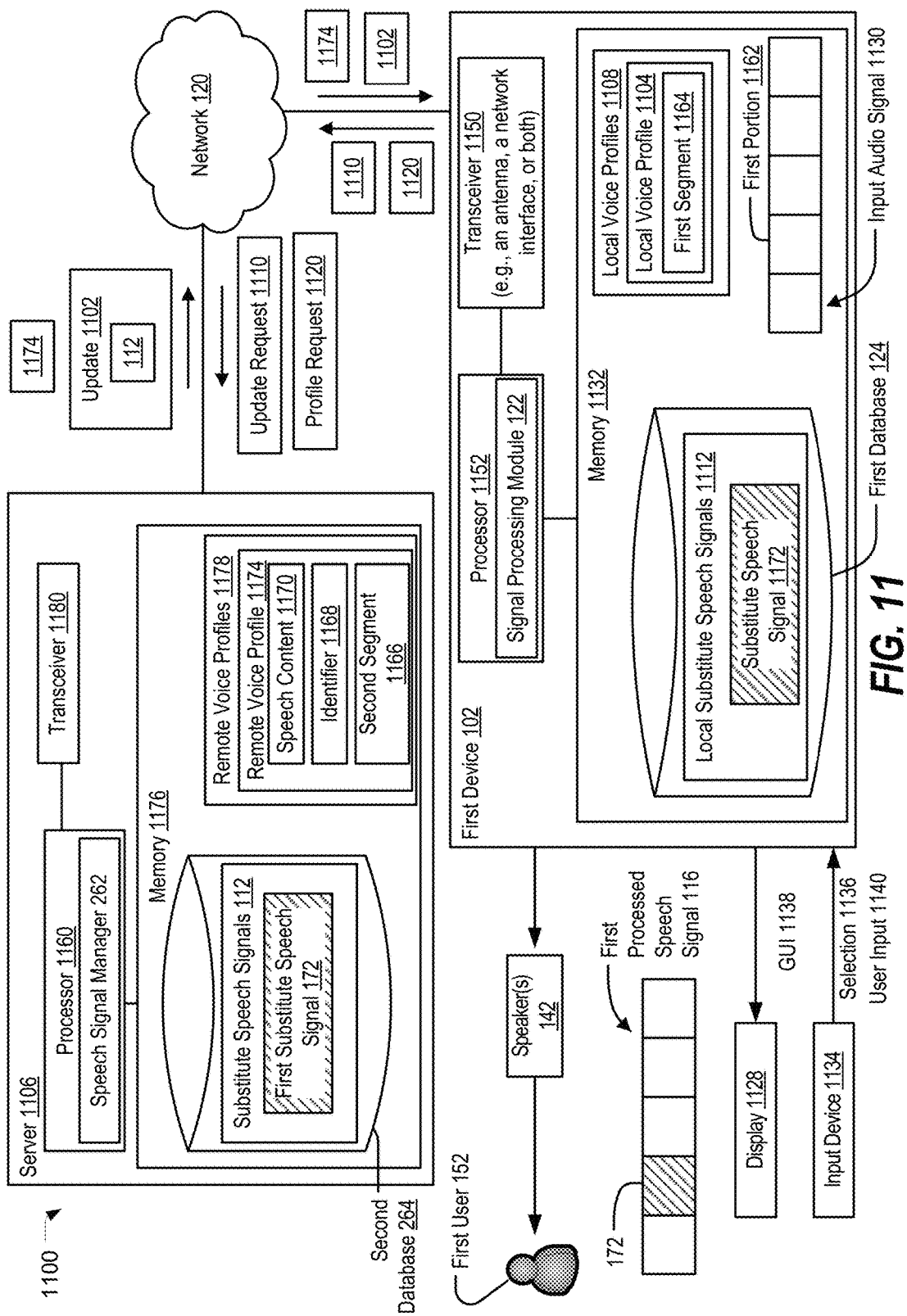
FIG. 11 is a diagram of another illustrative aspect of a system that is operable to replace speech signals.

Referring to FIG. 11, a particular aspect of a system is disclosed and generally designated 1100. The system 1100 may perform one or more operations described with reference to the systems 100-200 and 400-900 of FIGS. 1-2 and 4-9.

The system 1100 may include a server 1106 coupled to, or in communication with, the first device 102 via the network 120. The server 1106 may include a processor 1160 electrically coupled to a memory 1176. The processor 1160 may be electrically coupled, via a transceiver 1180, to the network 120. A transceiver (e.g., the transceiver 1180) may include a receiver, a transmitter, or both. A receiver may include one or more of an antenna, a network interface, or a combination of the antenna and the network interface. A transmitter may include one or more of an antenna, a network interface, or a combination of the antenna and the network interface. The processor 1160 may include, or may be electrically coupled to, the speech signal manager 262. The memory 1176 may include the second database 264. The second database 264 may be configured to store the substitute speech signals 112 associated with a particular user (e.g., the second user 154 of FIG. 1). For example, the speech signal manager 262 may generate the substitute speech signals 112 based on a training signal, as described with reference to FIG. 2. The substitute speech signals 112 may include the first substitute speech signal 172.

The memory 1176 may be configured to store one or more remote voice profiles 1178. The remote voice profiles 1178 may be associated with multiple persons. For example, the remote voice profiles 1178 may include a remote voice profile 1174. The remote voice profile 1174 may be associated with a person (e.g., the second user 154 of FIG. 1). To illustrate, the remote voice profile 1174 may include an identifier 1168 (e.g., a user identifier) associated with the second user 154. Another remote voice profile of the remote voice profiles 1178 may be associated with another person (e.g., the first user 152).

The remote voice profile 1174 may be associated with the substitute speech signals 112. For example, the remote voice profile 1174 may include speech content 1170 associated with the substitute speech signals 112. To illustrate, the speech content 1170 may correspond to a speech signal or a speech model of the second user 154. The speech content 1170 may be based on features extracted from one or more of the substitute speech signals 112. The remote voice profile 1174 may indicate that the substitute speech signals 112 correspond to audio data having a first playback duration. For example, the training signal used to generate the substitute speech signals 112, as described with reference to FIG. 2, may have the first playback duration.

The first device 102 may include a processor 1152 electrically coupled, via a transceiver 1150, to the network 120. The processor 1152 may be electrically coupled to a memory 1132. The memory 1132 may include the first database 124. The first database 124 may be configured to store local substitute speech signals 1112. The processor 1152 may include, or may be electrically coupled to, the signal processing module 122. The memory 1132 may be configured to store one or more local voice profiles 1108. For example, the local voice profiles 1108 may include a local voice profile 1104 associated with a particular user (e.g., the second user 154 of FIG. 1). The first device 102 may be electrically coupled to, or may include, at least one speaker (e.g., the speakers 142), a display 1128, an input device 1134 (e.g., a touchscreen, a keyboard, a mouse, or a microphone), or a combination thereof.

During operation, the signal processing module 122 may receive one or more remote voice profiles (e.g., the remote voice profile 1174) of the remote voice profiles 1178 from the server 1106. The signal processing module 122 may determine that the remote voice profile 1174 is associated with a person (e.g., the second user 154 of FIG. 1) based on the identifier 1168, the speech content 1170, or both. For example, the signal processing module 122 may determine that the remote voice profile 1174 is associated with the second user 154 in response to determining that the identifier 1168 (e.g., a user identifier) corresponds to the second user 154. As another example, the signal processing module 122 may determine that the remote voice profile 1174 is associated with the second user 154 in response to determining that the speech content 1170 corresponds to the second user 154. The signal processing module 122 may generate second speech content (e.g., a speech model) based on the local substitute speech signals 1112. The signal processing module 122 may determine that the remote voice profile 1174 is associated with the second user 154 in response to determining that a difference between the speech content 1170 and the second speech content satisfies (e.g., is less than) a threshold. For example, the speech content 1170 may correspond to features associated with one or more of the substitute speech signals 112. The second speech content may correspond to a speech model of second user 154. The signal processing module 122 may determine a confidence value indicating whether the features correspond to the speech model. The signal processing module 122 may determine that the remote voice profile 1174 is associated with the second user 154 in response to determining that the confidence value satisfies (e.g., is higher than) a confidence threshold.

The signal processing module 122 may select the local voice profile 1104 for profile management in response to determining that the local voice profile 1104 and the remote voice profile 1174 are associated with the same person (e.g., the second user 154). The signal processing module 122 may, in response to selecting the local voice profile 1104, generate a graphical user interface (GUI) 1138 to enable profile management by the first user 152, send an update request 1110 to the server 1106 to update the local voice profile 1104, or both, as described herein.

In a particular implementation, the signal processing module 122 may send a profile request 1120 to the server 1106. The profile request 1120 may indicate the local voice profile 1104, the remote voice profile 1174, or both. For example, the profile request 1120 may include the identifier 1168 associated with the second user 154. The speech signal manager 262 may send the remote voice profile 1174 to the first device 102 in response to receiving the profile request 1120.

In a particular aspect, the signal processing module 122 may receive user input 1140, via the input device 1134, indicating when the profile request 1120 is to be sent to the server 1106. The signal processing module 122 may send the profile request 1120 based on the user input 1140. For example, the signal processing module 122 may send the profile request 1120 to the server 1106 in response to receiving the user input 1140 and determining that the user input 1140 indicates that the profile request 1120 is to be sent to the server 1106 upon receipt of the user input 1140, at a particular time, and/or in response to a particular condition being satisfied. As another example, the signal processing module 122 may periodically send multiple instances of the profile request 1120 to the server 1106. In a particular aspect, the signal processing module 122 may send the profile request 1120 to the server 1106 in response to determining that a particular application (e.g., a profile management application) of the first device 102 is in an activated mode.

The signal processing module 122 may generate the GUI 1138 subsequent to selecting the local voice profile 1104. In a particular implementation, the GUI 1138 may correspond to the GUI 300 of FIG. 3. The GUI 1138 may include a representation of the local voice profile 1104, a representation of the remote voice profile 1174, or both. For example, the GUI 1138 may indicate the first playback duration associated with the substitute speech signals 112 corresponding to the remote voice profile 1174. To illustrate, the first bar 302, the second bar 314, or the third bar 316 of FIG. 3 may indicate the first playback duration when the remote voice profile 1174 corresponds to "Randal Hughes", "Sabrina Sanders", or "Brett Dean", respectively. Each of the first bar 302, the second bar 314, and the third bar 316 may be associated with a distinct remote voice profile of the remote voice profiles 1178. For example, the first bar 302 may be associated with the remote voice profile 1174, the second bar 314 may be associated with a second remote voice profile of the remote voice profiles 1178, and the third bar 316 may be associated with a third remote voice profile of the remote voice profiles 1178.

In a particular aspect, the GUI 1138 may indicate a second playback duration associated with the local substitute speech signals 1112 corresponding to the local voice profile 1104. To illustrate, the first bar 302, the second bar 314, or the third bar 316 of FIG. 3 may indicate the second playback duration when the local voice profile 1104 corresponds to "Randal Hughes", "Sabrina Sanders", or "Brett Dean", respectively. Each of the first bar 302, the second bar 314, and the third bar 316 may be associated with a distinct local voice profile of the local voice profiles 1108. For example, the first bar 302 may be associated with the local voice profile 1104, the second bar 314 may be associated with a second local voice profile of the local voice profiles 1108, and the third bar 316 may be associated with a third local voice profile of the local voice profiles 1108. In a particular implementation, the GUI 1138 may indicate the first playback duration associated with the remote voice profile 1174 and the second playback duration associated with the local voice profile 1104, where the remote voice profile 1174 and the local voice profile 1104 are associated with the same person (e.g., the second user 154 of FIG. 1). The first user 152 may determine whether to update the local voice profile 1104 based on the GUI 1138. For example, if the first user 152 determines that the local voice profile 1104 corresponds to a short playback duration, the first user 152 may decide to update the local voice profile 1104 based on the remote voice profile 1174. As another example, the first user 152 may reduce a frequency of updates by refraining from using the remote voice profile 1174 to update the local voice profile 1104 in response to determining that the GUI 1138 indicates that the remote voice profile 1174 corresponds to a short playback duration. Reducing the frequency of updates may conserve resources (e.g., power, bandwidth, or both).

The GUI 1138 may indicate an option to specify when an update request 1110 associated with a voice profile (e.g., the local voice profile 1104 or the remote voice profile 1174) is to be sent. The signal processing module 122 may provide the GUI 1138 to the display 1128. For example, the option may correspond to the auto update threshold 312 or the add option 308. The signal processing module 122 may receive the user input 1140 corresponding to the option via the input device 1134 from the first user 152. The user input 1140 may indicate when the update request 1110 is to be sent. For example, the first user 152 may increase or decrease the auto update threshold 312. The signal processing module 122 may send the update request 1110 in response to determining that the first playback duration satisfies (e.g., is greater than or equal to) the auto update threshold 312. To illustrate, the signal processing module 122 may send the update request 1110 in response to determining that the remote voice profile 1174 indicates that the first playback duration corresponding to the substitute speech signals 112 satisfies the auto update threshold 312. The signal processing module 122 may thus reduce a frequency of updates by refraining from sending the update request 1110 when the first playback duration fails to satisfy (e.g., is lower than) the auto update threshold 312. As another example, the first user 152 may select a particular bar (e.g., the first bar 302) associated with a voice profile (e.g., the remote voice profile 1174, the local voice profile 1104, or both) and may select the add option 308. The signal processing module 122 may send the update request 1110 indicating the voice profile (e.g., the remote voice profile 1174, the local voice profile 1104, or both) to the server 1106 in response to receiving the user input 1140 indicating a selection of the add option 308 and the first bar 302.

In a particular implementation, the GUI 1138 may include an option to specify that an update request (e.g., the update request 1110) associated with a voice profile (e.g., the remote voice profile 1174, the local voice profile 1104, or both) is to be sent periodically (e.g., daily, weekly, or monthly) to the server 1106. The signal processing module 122 may periodically send multiple instances of the update request 1110 to the server 1106, e.g., in response to receiving the user input 1140 indicating that an update request is to be sent periodically. In a particular aspect, the user input 1140 may indicate an update time threshold. The signal processing module 122 may determine that a first update associated with the voice profile (e.g., the remote voice profile 1174, the local voice profile 1104, or both) was received from the server 1106 at a first time. The signal processing module 122 may, at a second time, determine a difference between the first time and the second time. The signal processing module 122 may send the update request 1110 to the server 1106 in response to determining that the difference satisfies the update time threshold indicated by the user input 1140.

In a particular implementation, the GUI 1138 may include an option to specify when to refrain from sending an update request (e.g., the update request 1110) associated with a voice profile (e.g., the remote voice profile 1174, the local voice profile 1104, or both). The option may correspond to a stop update threshold, a resource usage threshold, or both. For example, the signal processing module 122 may refrain from sending the update request 1110 to the server 1106 in response to determining that the second playback duration associated with the local substitute speech signals 1112 satisfies (e.g., is greater than or equal to) the stop update threshold. To illustrate, the first user 152 may specify the stop update threshold so that the signal processing module 122 discontinues automatically updating the local voice profile 1104 when the second playback duration corresponding to the local substitute speech signals 1112 satisfies (e.g., is greater than or equal to) the stop update threshold. As another example, the signal processing module 122 may refrain from sending the update request 1110 to the server 1106 in response to determining that a resource usage (e.g., remaining battery power, available memory, billing cycle network usage, or a combination thereof) satisfies the resource usage threshold. For example, the signal processing module 122 may refrain from sending the update request 1110 to the server 1106 when a remaining batter power satisfies (e.g., is less than) a power conservation threshold, when available memory satisfies (e.g., is less than) a memory conservation threshold, when billing cycle network usage satisfies (e.g., is greater than or equal to) a network usage threshold, or a combination thereof.

In a particular aspect, the GUI 1138 may include the delete option 310. The first user 152 may select the first bar 302 and the delete option 310. The signal processing module 122 may send a delete request to the server 1106 indicating a corresponding voice profile (e.g., the remote voice profile 1174) in response to receiving the user input 1140 indicating a selection of the delete option 310 and the first bar 302. The speech signal manager 262 may delete the substitute speech signals 112 in response to receiving the delete request. In a particular implementation, the signal processing module 122 may delete the local substitute speech signals 1112 in response to receiving the user input 1140 indicating a selection of the delete option 310 and the first bar 302.

The speech signal manager 262 may send an update 1102 to the first device 102 in response to receiving the update request 1110, as described herein. The speech signal manager 262 may update a last update sent time associated with the remote voice profile 1178 and the first device 102 to indicate when the update 1102 is sent to the first device 102. In a particular implementation, the speech signal manager 262 may, at a first time, update the last update sent time associated with the first device 102 and the remote voice profile 1178 to indicate the first time in response to receiving the delete request. For example, the speech signal manager 262 may update the last update sent time without sending an update to the first device 102 so that the substitute speech signals 112 are excluded from a subsequent update to the first device 102, as described herein, while retaining the substitute speech signals 112 to provide an update associated with the remote voice profile 1178 to another device.

The signal processing module 122 may receive the update 1102 from the server 1106. The update 1102 may indicate the local voice profile 1104, the remote voice profile 1174, or both. For example, the update 1102 may include the identifier 1168 corresponding to the second user 154 of FIG. 1. The update 1102 may include speech data corresponding to the substitute speech signals 112. The signal processing module 122 may add each of the substitute speech signals 112 to the local substitute speech signals 1112. For example, the signal processing module 122 may add the speech data to the local voice profile 1104. As another example, the signal processing module 122 may generate the substitute speech signals 112 based on the speech data and may add each of the generated substitute speech signals 112 to the local substitute speech signals 1112.

In a particular aspect, the signal processing module 122 may replace a first segment 1164 of the local voice profile 1104 with a second segment 1166 of the remote voice profile 1174. For example, the first segment 1164 may correspond to a substitute speech signal 1172 of the local substitute speech signals 1112. The second segment 1166 may correspond to the first substitute speech signal 172 of the substitute speech signals 112. The signal processing module 122 may remove the substitute speech signal 1172 from the local substitute speech signals 1112 and may add the first substitute speech signal 172 to the local substitute speech signals 1112.

The first substitute speech signal 172 and the substitute speech signal 1172 may correspond to similar sounds (e.g., a phoneme, a diphone, a triphone, a syllable, a word, or a combination thereof). In a particular aspect, the signal processing module 122 may replace the substitute speech signal 1172 with the first substitute speech signal 172 in response to determining that the first substitute speech signal 172 has higher audio quality (e.g., a higher signal-to-noise ratio) than the substitute speech signal 1172. In another aspect, the signal processing module 122 may replace the substitute speech signal 1172 with the first substitute speech signal 172 in response to determining that the substitute speech signal 1172 has expired (e.g., has a timestamp that exceeds an expiration threshold).

In a particular implementation, the speech signal manager 262 may, at a first time, send a first update associated with the remote voice profile 1174 to the first device 102. The speech signal manager 262 may update the last update sent time to indicate the first time. The speech signal manager 262 may subsequently determine that the substitute speech signals 112 associated with the remote voice profile 1174 were generated subsequent to sending the first update to the first device 102. For example, the speech signal manager 262 may select the substitute speech signals 112 in response to determining that a timestamp corresponding to each of the substitute speech signals 112 indicates a time that is subsequent to the last update sent time. The speech signal manager 262 may send the update 1102 to the first device 102 in response to determining that the substitute speech signals 112 were generated subsequent to sending the first update to the first device 102. In this particular implementation, the update 1102 may include fewer than all substitute speech signals associated with the remote voice profile 1174. For example, the update 1102 may include only those substitute speech signals 112 that the server 1106 has not previously sent to the first device 102.

In a particular aspect, an update request 1110 may indicate whether all substitute speech signals are requested or whether only substitute speech signals that have not previously been sent are requested. For example, the signal processing module 122 may, at a first time, send a first update to the first device 102 and may update the last update sent time to indicate the first time. The second database 264 may include second substitute speech signals associated with the remote voice profile 1174 that were generated prior to the first time. The substitute speech signals 112 may be generated subsequent to the first time.

The signal processing module 122 may send the update request 1110 to request all substitute speech signals associated with the local voice profile 1104. In a particular aspect, the signal processing module 122 may send the update request 1110 in response to determining that speech data associated with the local voice profile 1104 has been deleted at the first device 102. The speech signal manager 262 may receive the update request 1110. The speech signal manager 262 may determine that the update request 1110 corresponds to the remote voice profile 1174 in response to determining that the update request 1110 includes the identifier 1168 associated with the second user 154. The speech signal manager 262 may send the update 1102 including all substitute speech signals associated with the remote voice profile 1174 in response to determining that the update request 1110 indicates that all corresponding substitute speech signals are requested. Alternatively, the speech signal manager 262 may send the update 1102 including fewer than all substitute speech signals associated with the remote voice profile 1174 in response to determining that the update request 1110 indicates that only those substitute speech signals that have not been previously sent to the first device 102 are requested. For example, the update 1102 may include the substitute speech signals 112 having a timestamp indicating a time (e.g., a generation time) that is subsequent to the last update sent time.

In a particular aspect, the speech signal manager 262 may send the update 1102 to the first device 102 independently of receiving the update request 1110. For example, the speech signal manager 262 may send the update 1102 periodically. As another example, the speech signal manager 262 may determine a playback duration associated with substitute speech signals (e.g., the substitute speech signals 112) that have a timestamp indicating a time (e.g., a generation time) that exceeds the last update sent time. The speech signal manager 262 may send the substitute speech signals 112 in response to determining that the playback duration satisfies the auto update threshold.

The local substitute speech signals 1112 may be used to generate processed speech signals, as described herein. The first user 152 may provide a selection 1136 indicating the local voice profile 1104 to the first device 102. For example, the first device 102 may receive the selection 1136 via the input device 1134. In a particular aspect, the selection 1136 may correspond to a voice call with a second device associated with the local voice profile 1104. For example, the local voice profile 1104 may be associated with a user profile of the second user 154 of FIG. 1. The user profile may indicate the second device. The first user 152 may initiate the voice call or may accept the voice call from the second device. The signal processing module 122 may receive an input audio signal 1130 subsequent to receiving the selection 1136. For example, the signal processing module 122 may receive the input audio signal 1130 during the voice call. The signal processing module 122 may compare a first portion 1162 of the input audio signal 1130 to the local substitute speech signals 1112. The local substitute speech signals 1112 may include the first substitute speech signal 172. The signal processing module 122 may determine that the first portion 1162 matches (e.g., is similar to) the first substitute speech signal 172. The signal processing module 122 may generate the first processed speech signal 116 by replacing the first portion 1162 with the first substitute speech signal 172 in response to determining that the first portion 1162 matches the first substitute speech signal 172, as described with reference to FIG. 1. The first substitute speech signal 172 may have a higher audio quality than the first portion 1162. The signal processing module 122 may output the first processed speech signal 116, via the speakers 142, to the first user 152.

In a particular implementation, the server 1106 may correspond to a device (e.g., the mobile device 104 of FIG. 1) associated with the local voice profile 1104. For example, one or more of the operations described herein as being performed by the server 1106 may be performed by the mobile device 104. In this particular implementation, one or more messages (e.g., the update request 1110, the profile request 1120, or both) described herein as being sent by the first device 102 to the server 1106 may be sent to the mobile device 104. Similarly, one or more messages (e.g., the update 1102, the remote voice profile 1174, or both) described herein as being received by the first device 102 from the server 1106 may be received from the mobile device 104.

The system 1100 may improve user experience by providing a processed speech signal to a user, where the processed speech signal is generated by replacing a portion of an input audio signal with a substitute speech signal, and where the substitute speech signal has a higher audio quality than the portion of the input audio signal. The system 1100 may also provide a GUI to enable a user to manage voice profiles.

Figure 12:
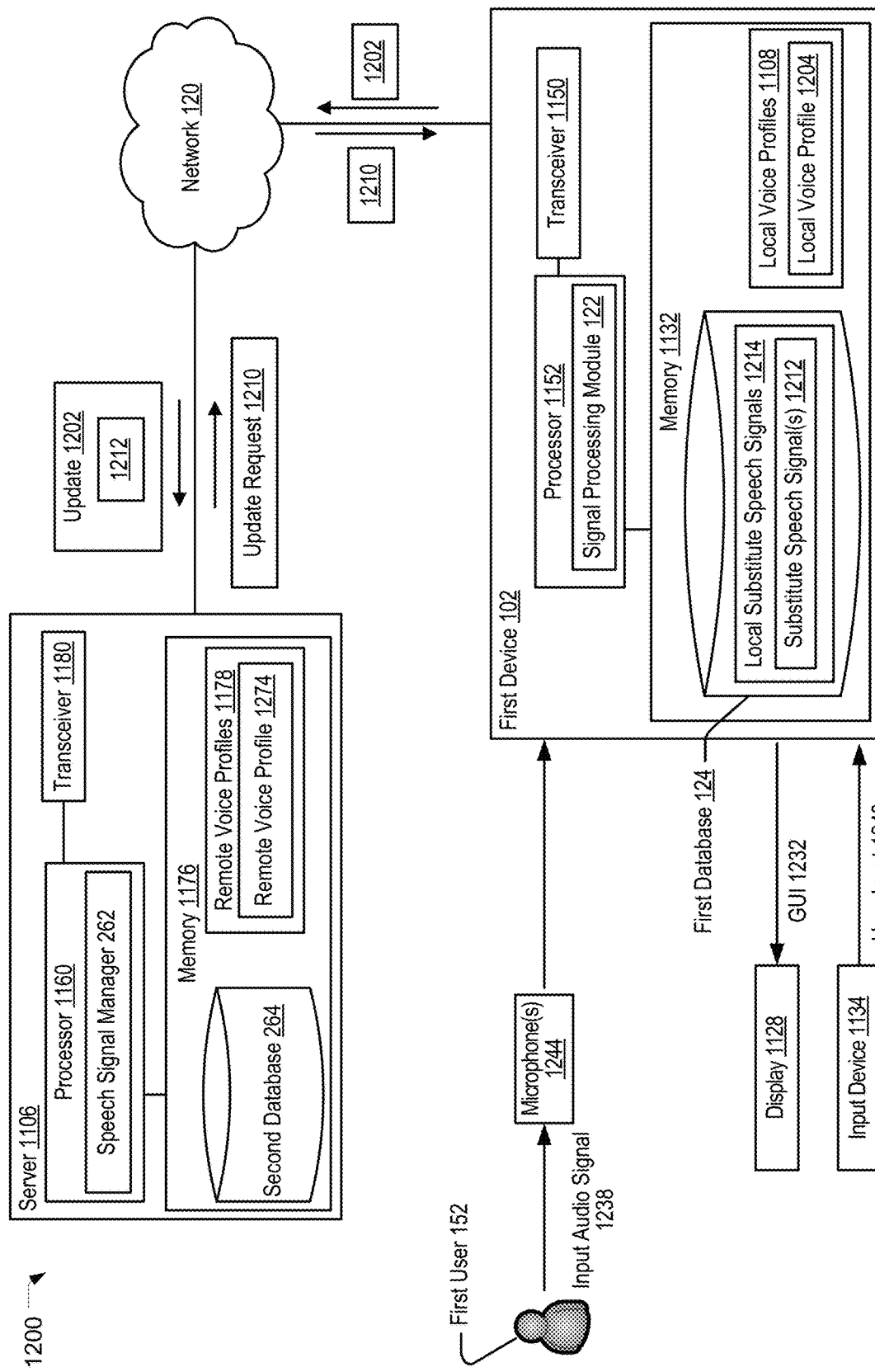
FIG. 12 is a diagram of another illustrative aspect of a system that is operable to replace speech signals.

Referring to FIG. 12, a particular aspect of a system is disclosed and generally designated 1200. The system 1200 may perform one or more operations described with reference to the systems 100-200, 400-900, and 1100 of FIGS. 1-2, 4-9, and 11. The system 1200 may include one or more components of the system 1100 of FIG. 11. For example, the system 1200 may include the server 1106 coupled to, or in communication with, the first device 102 via the network 120. The first device 102 may be coupled to, or may include, one or more microphones 1244. The first device 102 may include the first database 124 of FIG. 1. The first database 124 may be configured to store one or more local substitute speech signals 1214. The local substitute speech signals 1214 may correspond to a local voice profile 1204 that is associated with a person (e.g., the first user 152).

During operation, the signal processing module 122 may receive a training speech signal (e.g., an input audio signal 1238), via the microphones 1244, from the first user 152. For example, the signal processing module 122 may receive the input audio signal 1238 during a voice call. The signal processing module 122 may generate substitute speech signals 1212 based on the input audio signal 1238, as described with reference to FIG. 2. The signal processing module 122 may add the substitute speech signals 1212 to the local substitute speech signals 1214. The signal processing module 122 may provide an update 1202 to the server 206. The update 1202 may include speech data corresponding to the substitute speech signals 1212. The update 1202 may include an identifier associated with the first user 152, the local voice profile 1204, or both. The server 206 may receive the update 1202 and the speech signal manager 262 may determine that the update 1202 is associated with a remote voice profile 1274 of the remote voice profiles 1178 based on the identifier of the update 1202.

In a particular implementation, the speech signal manager 262 may determine that none of the remote voice profiles 1178 correspond to the update 1202. In response, the speech signal manager 262 may add the remote voice profile 1274 to the remote voice profiles 1178. The remote voice profile 1274 may be associated with (e.g., include) the identifier of the update 1202. The speech signal manager 262 may store the substitute speech signals 1212 in the second database 264 and may associate the stored substitute speech signals 1212 with the remote voice profile 1274. For example, the speech signal manager 262 may generate the substitute speech signals 1212 based on the speech data and may store the substitute speech signals 1212, the speech data, or both, in the second database 264.

The speech signal manager 262 may determine a timestamp (e.g., a generation timestamp) associated with the substitute speech signals 1212 and may store the timestamp in the second database 264, the memory 1176, or both. For example, the timestamp may indicate a time at which the input audio signal 1238 is received by the first device 102, a time at which the substitute speech signals 1212 are generated by the signal processing module 122, a time at which the update 1202 is sent by the first device 102, a time at which the update 1202 is received by the server 1106, a time at which the substitute speech signals 1212 are stored in the second database 264, or a combination thereof. The speech signal manager 262 may determine a playback duration associated with the substitute speech signals 1212 and may store the playback duration in the second database 264, the memory 1176, or both. For example, the playback duration may be a playback duration of the input audio signal 1238. In a particular implementation, the update 1202 may indicate the playback duration and the speech signal manager 262 may determine the playback duration based on the update 1202.

In a particular aspect, the first device 102 may send the update 1202 to the server 1106 in response to receiving an update request 1210 from the server 1106 or another device. For example, the server 1106 may send the update request 1210 to the first device 102 periodically or in response to detecting an event (e.g., initiation of a voice call). The signal processing module 122 may send the update 1202 in response to receiving the update request 1210.

In a particular aspect, the signal processing module 122 may send the update 1202 in response to determining that a user (e.g., the first user 152) of the first device 102 has authorized sending the substitute speech signals 1212 (or the speech data) to the server 1106. For example, the signal processing module 122 may receive user input 1240, via the input device 1134, from the first user 152. The signal processing module 122 may send the update 1202 to the server 1106 in response to determining that the user input 1240 indicates that the first user 152 has authorized the substitute speech signals 1212 to be sent to the server 1106.

In a particular aspect, the signal processing module 122 may determine that a user (e.g., the first user 152) of the first device 102 has authorized the substitute speech signals 1212 (or the speech data) to be sent to one or more devices associated with a particular user profile (e.g., a user profile of the second user 154 of FIG. 1). The update 1202 may indicate the one or more devices, the particular user profile, or a combination thereof, with which the substitute speech signals 1212 are authorized to be shared. The signal processing module 122 may store authorization data indicating the one or more devices, the particular user profile, or a combination thereof, in the second database 264, the memory 1176, or both. The signal processing module 122 may send an update including data associated with the substitute speech signals 1212 to a particular device, as described with reference to FIG. 11, in response to determining that the authorization data indicates the particular device.

In a particular aspect, the signal processing module 122 may generate a GUI 1232 indicating an option to select when to send the update 1202 to the server 1106. The signal processing module 122 may provide the GUI 1232 to the display 1128. The signal processing module 122 may receive the user input 1240, via the input device 1134, from the first user 152. The signal processing module 122 may send the update 1202 in response to receiving the user input 1240. In a particular aspect, the user input 1240 may indicate that the update 1202 (e.g., the substitute speech signals 1212 or the speech data) is to be sent periodically (e.g., hourly, daily, weekly, or monthly) or may indicate an update threshold (e.g., 4 hours). In response, the signal processing module 122 may periodically send multiple instances of the update 1202 to the server 1106 periodically or based on the update threshold.

The system 1200 may enable a device to provide substitute speech signals associated with a user to another device. The other device may generate a processed speech signal based on an input audio signal corresponding to the user. For example, the other device may generate the processed speech signal by replacing a portion of the input audio signal with a substitute speech signal. The substitute speech signal may have higher audio quality than the portion of the input audio signal.

Figure 13:
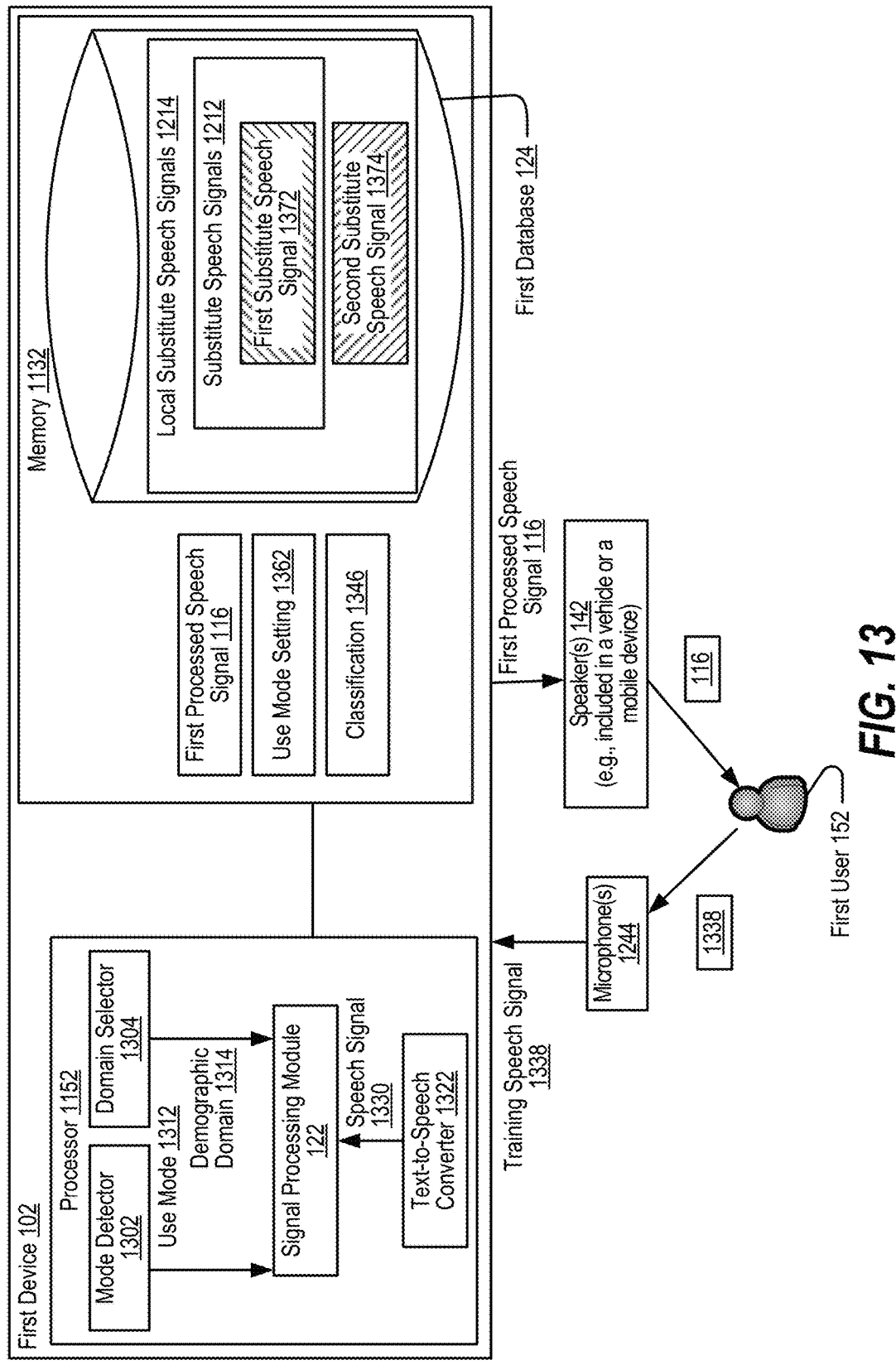
FIG. 13 is a diagram of another illustrative aspect of a system that is operable to replace speech signals.

Referring to FIG. 13, a particular aspect of a system is disclosed and generally designated 1300. The system 1300 may perform one or more operations described with reference to the systems 100-200, 400-900, and 1100-1200 of FIGS. 1-2, 4-9, and 11-12.

The system 1300 may include one or more components of the system 1100 of FIG. 11, the system 1200 of FIG. 12, or both. For example, the system 1300 includes the first device 102 and the processor 1152. The first device 102 may be coupled to the microphones 1244, the speakers 142, or both. The processor 1152 may be coupled to, or may include, the signal processing module 122. The signal processing module 122 may be coupled to a mode detector 1302, a domain selector 1304, a text-to-speech converter 1322, or a combination thereof.

One or more components of the system 1300 may be included in at least one of a vehicle, an electronic reader (e-reader) device, a mobile device, an acoustic capturing device, a television, a communication device, a tablet, a smart phone, a navigation device, a laptop, a wearable device, or a computing device. For example, one or more of the speakers 142 may be included in a vehicle or a mobile device. The mobile device may include an e-reader device, a tablet, a communication device, a smart phone, a navigation device, a laptop, a wearable device, a computing device, or a combination thereof. The memory 1132 may be included in a storage device that is accessible by the at least one of the vehicle, the e-reader device, the mobile device, the acoustic capturing device, the television, the communication device, the tablet, the smart phone, the navigation device, the laptop, the wearable device, or the computing device.

During operation, the signal processing module 122 may receive a training speech signal 1338, via the microphones 1244, from the first user 152. In a particular implementation, the training speech signal 1338 may be text-independent and may be received during general or "normal" use of the first device 102. For example, the first user 152 may activate an "always-on" capture mode of the signal processing module 122 and the signal processing module 122 may receive the training speech signal 1338 in the background as the first user 152 speaks in the vicinity of the microphones 1244. The signal processing module 122 may generate the substitute speech signals 1212 based on the training speech signal 1338, as described with reference to FIGS. 2 and 12. The substitute speech signals 1212 may include a first substitute speech signal 1372. The signal processing module 122 may add the substitute speech signals 112, speech data associated with the substitute speech signals 112, or both, to the local substitute speech signals 1214, as described with reference to FIG. 12.

The mode detector 1302 may be configured to detect a use mode 1312 of a plurality of use modes (e.g., a reading mode, a conversation mode, a singing mode, a command and control mode, or a combination thereof). The use mode 1312 may be associated with the training speech signal 1338. For example, the mode detector 1302 may detect the use mode 1312 based on a use mode setting 1362 of the signal processing module 122 when the training speech signal 1338 is received. To illustrate, the signal processing module 122 may set the use mode setting 1362 to the reading mode in response to detecting that a first application (e.g., a reader application or another reading application) of the first device 102 is activated. The signal processing module 122 may set the use mode setting 1362 to the conversation mode in response to detecting an ongoing voice call or that a second application (e.g., an audio chatting application and/or a video conferencing application) of the first device 102 is activated.

The signal processing module 122 may set the use mode setting 1362 to the singing mode in response to determining that a third application (e.g., a singing application) of the first device 102 is activated. In a particular aspect, the signal processing module 122 may set the use mode setting 1362 to the singing mode in response to determining that the training speech signal 1338 corresponds to singing. For example, the signal processing module 122 may extract features of the training speech signal 1338 and may determine that the training speech signal 1338 corresponds to singing based on the extracted features and a classifier (e.g., a support vector machine (SVM)). The classifier may detect singing by analyzing a voice speech duration, a rate of voiced speech, a rate of speech pauses, a similarity measure between voiced speech intervals (e.g., corresponding to syllables), or a combination thereof.

The signal processing module 122 may set the use mode setting 1362 to the command and control mode in response to determining that a fourth application (e.g., a personal assistant application) of the first device 102 is activated. In a particular aspect, the signal processing module 122 may set the use mode setting 1362 to the command and control mode in response to determining that the training speech signal 1338 includes a command keyword (e.g., "Activate"). For example, the signal processing module 122 may use speech analysis techniques to determine that the training speech signal 1338 includes the command keyword. One of the reading mode, the conversation mode, the singing mode, or the command and control mode may correspond to a "default" use mode. The use mode setting 1362 may correspond to the default use mode unless overridden. In a particular aspect, the signal processing module 122 may set the use mode setting 1362 to a particular use mode indicated by user input. The mode detector 1302 may provide the use mode 1312 to the signal processing module 122.

The domain selector 1304 may be configured to detect a demographic domain 1314 of a plurality of demographic domains (e.g., a language domain, a gender domain, an age domain, or a combination thereof). The demographic domain 1314 may be associated with the training speech signal 1338. For example, the domain selector 1304 may detect the demographic domain 1314 based on demographic data (e.g., a particular language, a particular gender, a particular age, or a combination thereof) associated with the first user 152. In a particular aspect, the memory 1132 may include the demographic data in a user profile associated with the first user 152. As another example, the domain selector 1304 may detect the demographic domain 1314 by analyzing the training speech signal 1338 using a classifier. To illustrate, the classifier may classify the training speech signal 1338 into a particular language, a particular gender, a particular age, or a combination thereof. The demographic domain 1314 may indicate the particular language, the particular gender, the particular age, or a combination thereof. The domain selector 1304 may provide the demographic domain 1314 to the signal processing module 122.

The signal processing module 122 may associate the use mode 1312, the demographic domain 1314, or both, with each of the substitute speech signals 1212. The signal processing module 122 may determine a classification 1346 associated with the substitute speech signals 1212. The classification 1346 may include a timestamp indicating a time and/or date of when the substitute speech signals 1212 were generated by the signal processing module 122. The classification 1346 may indicate an application (e.g., a reading application) or component (e.g., a particular story) of the application that was activated when the training speech signal 1338 was received by the first device 102. The classification 1346 may indicate a word, a phrase, text, or a combination thereof, corresponding to the training speech signal 1338. The signal processing module 122 may use speech analysis techniques to classify the training speech signal 1338 into one or more emotions (e.g., joy, anger, sadness, etc.). The classification 1346 may indicate the one or more emotions. The signal processing module 122 may associate the classification 1346 with each of the substitute speech signals 1212.

The local substitute speech signals 1214 may include one or more additional substitute speech signals (e.g., a second substitute speech signal 1374) generated by the signal processing module 122 based on a second training speech signal, as described with reference to FIG. 2. The second substitute speech signal 1374 may be associated with a second use mode, a second demographic domain, a second classification, or a combination thereof.

The signal processing module 122 may receive a speech signal 1330 from the text-to-speech converter 1322. For example, the first user 152 may activate the text-to-speech converter 1322 and the text-to-speech converter 1322 may provide the speech signal 1330 to the signal processing module 122. The signal processing module 122 may detect a particular use mode based on the user mode setting 1362, as described herein. The signal processing module 122 may also select a particular demographic domain. For example, the signal processing module 122 may receive a user input from the first user 152 indicating a particular user profile. The signal processing module 122 may select the particular demographic domain based on demographic data corresponding to the particular user profile. As another example, the user input may indicate a particular language, a particular age, a particular gender, or a combination thereof. The signal processing module 122 may select the particular demographic domain corresponding to the particular language, the particular age, the particular gender, or a combination thereof.

The signal processing module 122 may select a particular substitute speech signal (e.g., the first substitute speech signal 1372 or the second substitute speech signal 1374) of the local substitute speech signals 1214 based on the detected particular use mode, the selected particular demographic domain, or both. For example, the signal processing module 122 may compare a portion of the speech signal 1330 to each of the local substitute speech signals 1214. Each of the first substitute speech signal 1372, the second substitute speech signal 1374, and the portion of the speech signal 1330 may correspond to similar sounds. The signal processing module 122 may select the first substitute speech signal 1372 based on determining that the particular use mode corresponds to (e.g., matches) the use mode 1312, that the particular demographic domain corresponds to (e.g., matches at least in part with) the demographic domain 1314, or both. Thus, use modes and demographic domains may be used to ensure that the portion of the speech signal 1330 is replaced by a substitute speech signal (e.g., the first substitute speech signal 1372) that was generated in a similar context. For example, when the speech signal 1330 corresponds to a singing mode, the portion of the speech signal 1330 may be replaced by a substitute speech signal that corresponds to higher audio quality singing and not to higher audio quality conversational speech.

In a particular aspect, the local substitute speech signals 1214 may be associated with classifications. Each of the classifications may have a priority. The signal processing module 122 may select the first substitute speech signal 1372 by comparing the portion of the speech signal 1330 to the local substitute speech signals 1214 in order of priority. For example, the signal processing module 122 may select the first substitute speech signal 1372 based at least in part on determining that a first timestamp indicated by the classification 1346 is subsequent to a second timestamp indicated by the second classification associated with the second substitute speech signal 1374. As another example, the signal processing module 122 may select the first substitute speech signal 1372 based at least in part on determining that a particular application (e.g., an e-reader application) is activated and that the particular application is indicated by the classification 1346 and not indicated by the second classification.

The signal processing module 122 may generate the first processed speech signal 116 by replacing the portion of the speech signal 1330 with the first substitute speech signal 1372. The signal processing module 122 may store the first processed speech signal 116 in the memory 1132. Alternatively, or in addition, the signal processing module 122 may output the first processed speech signal 116, via the speakers 142, to the first user 152.

In a particular aspect, the training speech signal 1338 may be received from a particular user (e.g., the first user 152) and the first processed speech signal 116 may be output to the same user (e.g., the first user 152). For example, the first processed speech signal 116 may sound similar to speech of the first user 152.

In another aspect, the training speech signal 1338 may be received from a particular user (e.g., a parent) and the first processed speech signal 116 may be output to another user (e.g., a child of the parent). For example, the parent may activate an e-reader application and read a particular story on a first day. The training speech signal 1338 may correspond to speech of the parent. The signal processing module 122 may generate the substitute speech signals 1212 based on the training speech signal 1338, as described with reference to FIGS. 2 and 12. The signal processing module 122 may associate the use mode 1312 (e.g., the reading mode) with each of the substitute speech signals 1212. The signal processing module 122 may associate the demographic domain 1314 (e.g., an adult, female, and English language) with each of the substitute speech signals 1212. The signal processing module 122 may associate the classification 1346 (e.g., the particular story, the e-reader application, a timestamp corresponding to the first day, text corresponding to the training speech signal, and one or more emotions corresponding to the training speech signal 1338) with each of the substitute speech signals 1212.

The other user (e.g., the child) may activate the text-to-speech converter 1322 on a second day. For example, the child may select the particular story and may select a user profile of the parent. To illustrate, the child may select a subsequent portion of the particular story than previously read by the parent. The text-to-speech converter 1322 may generate the speech signal 1330 based on text of the particular story. The signal processing module 122 may receive the speech signal 1330. The signal processing module 122 may detect a particular user mode (e.g., the reading mode) and may select a particular demographic domain (e.g., an adult, female, and English language) corresponding to the user profile of the parent. The signal processing module 122 may determine a particular classification (e.g., the particular story). The signal processing module 122 compare a portion of the speech signal 1330 to the local substitute speech signals 1214 in order of priority. The signal processing module 122 may select the first substitute speech signal 1372 based on determining that the use mode 1312 matches the particular use mode, that the classification 1346 matches the particular classification, or both. The signal processing module 122 may generate the first processed speech signal 116 by replacing the portion of the speech signal 1330 with the first substitute speech signal 1372. The signal processing module 122 may output the first processed speech signal 116 via the speakers 142 to the child. The first processed speech signal 116 may sound similar to speech of the parent. The child may thus be able to hear subsequent chapters of the particular story in a voice of the parent when the parent is unavailable (e.g., out of town).

The system 1300 may thus enable generation of substitute speech signals corresponding to speech of a user based on an audio signal received from the user. The substitute speech signals may be used to generate a processed speech signal that sounds similar to speech of the user. For example, the processed speech signal may be generated by replacing a portion of a speech signal generated by a text-to-speech converter with a substitute speech signal.

Figure 14:
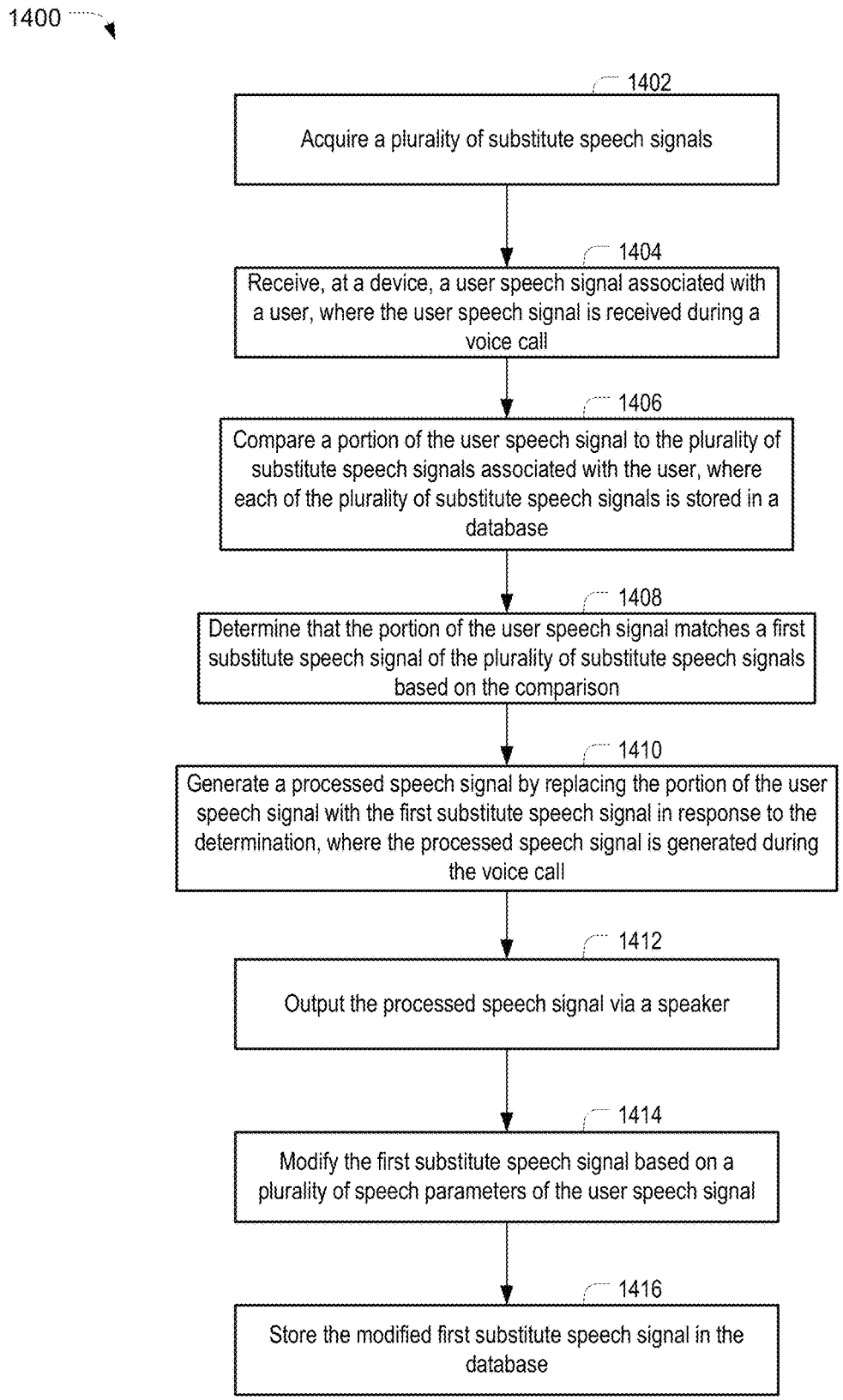
FIG. 14 is a flow chart illustrating a particular aspect of a method of replacing a speech signal.

Referring to FIG. 14, a flow chart of a particular illustrative aspect of a method of replacing a speech signal is shown and is generally designated 1400. The method 1400 may be executed by the signal processing module 122 of FIG. 1, the signal processing module 422 of FIG. 4, the signal processing module 622 of FIG. 6, the signal processing module 722 of FIG. 7, or a combination thereof.

The method 1400 includes acquiring a plurality of substitute speech signals, at 1402. For example, the first device 102 may acquire the substitute speech signals 112, as further described with reference to FIG. 2.

The method 1400 may also include receiving, at a device, a user speech signal associated with a user, at 1404. The user speech signal may be received during a voice call. For example, the first device 102 may receive the first user speech signal 130 during a voice call with the mobile device 104, as further described with reference to FIG. 1.

The method 1400 may further include comparing a portion of the user speech signal to the plurality of substitute speech signals associated with the user, at 1406. The plurality of substitute speech signals may be stored in a database. For example, the signal processing module 122 of FIG. 1 may compare the first portion 162 of the first user speech signal 130 to the substitute speech signals 112 stored in the first database 124, as further described with reference to FIG. 1.

The method 1400 may also include determining that the portion of the user speech signal matches a first substitute speech signal of the plurality of substitute speech signals based on the comparison, at 1408. For example, the signal processing module 122 of FIG. 1 may determine that the first portion 162 matches the first substitute speech signal 172, as described with reference to FIG. 1.

The method 1400 may further include generating a processed speech signal by replacing the portion of the user speech signal with the first substitute speech signal in response to the determination, at 1410. The processed speech signal may be generated during the voice call. For example, the signal processing module 122 may generate the first processed speech signal 116 by replacing the first portion 162 with the first substitute speech signal 172 in response to the determination. In a particular aspect, the signal processing module 122 may use a smoothing algorithm to reduce speech parameter variation corresponding to a transition between the first substitute speech signal 172 and another portion of the first processed speech signal 116, as further described with reference to FIG. 1.

The method 1400 may also include outputting the processed speech signal via a speaker, at 1412. For example, the first device 102 of FIG. 1 may output the first processed speech signal 116 via the speakers 142.

The method 1400 may further include modifying the first substitute speech signal based on a plurality of speech parameters of the user speech signal, at 1414, and storing the modified first substitute speech signal in the database, at 1416. For example, the signal processing module 122 may modify the first substitute speech signal 172 based on a plurality of speech parameters of the first user speech signal 130 to generate a modified substitute speech signal 176, as further described with reference to FIG. 1. The signal processing module 122 may store the modified substitute speech signal 176 in the first database 124.

Thus, the method 1400 may enable generation of a processed speech signal by replacing a portion of a user speech signal associated with a user with a substitute speech signal associated with the same user. The processed speech signal may have a higher audio quality than the user speech signal.

The method 1400 of FIG. 14 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 1400 of FIG. 14 may be performed by a processor that executes instructions, as described with respect to FIG. 19.

Figure 15:
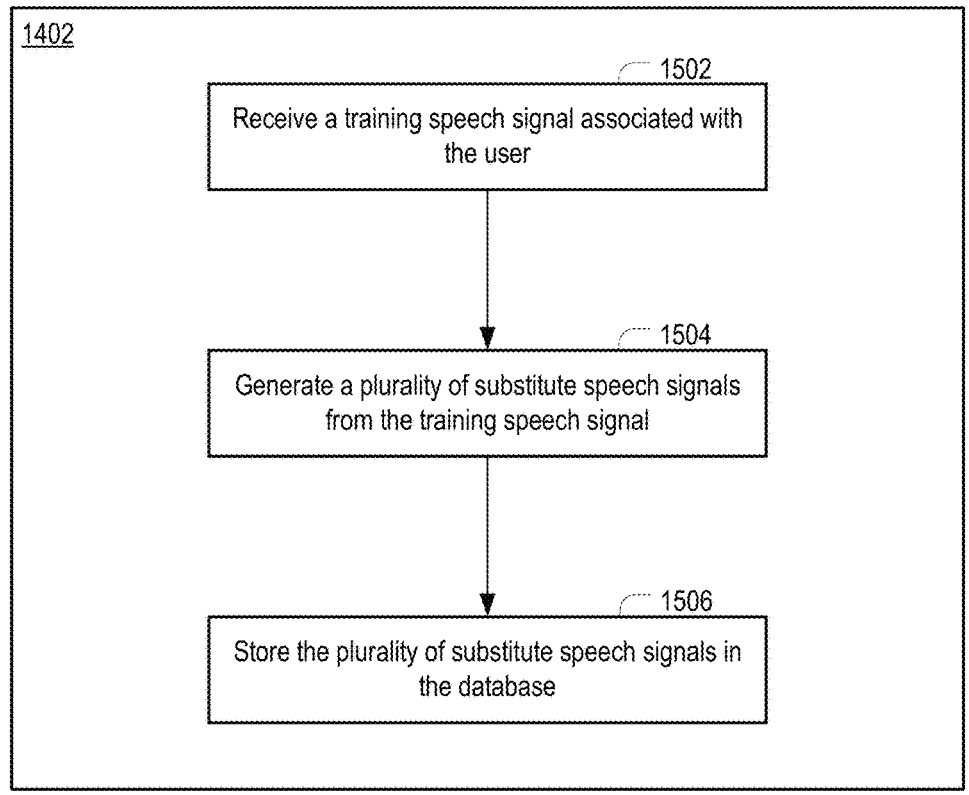
FIG. 15 is a flow chart illustrating a particular aspect of a method of acquiring a plurality of substitute speech signals and may correspond to operation 802 of FIG. 11.

Referring to FIG. 15, a flow chart of a particular illustrative aspect of a method of acquiring a plurality of substitute speech signals is shown and is generally designated 1500. In a particular aspect, the method 1500 may correspond to the operation 1402 of FIG. 14. The method 1500 may be executed by the speech signal manager 262 of FIG. 2.

The method 1500 may include receiving a training speech signal associated with the user, at 1502. For example, the server 206 of FIG. 2 may receive the training speech signal 272 associated with the second user 154, as further described with reference to FIG. 2.

The method 1500 may also include generating a plurality of substitute speech signals from the training speech signal, at 1504, and storing the plurality of substitute speech signals in the database, at 1506. For example, the speech signal manager 262 may generate the substitute speech signals 112 from the training speech signal 272, as further described with reference to FIG. 2. The speech signal manager 262 may store the substitute speech signals 112 in the second database 264.

Thus, the method 1500 may enable acquisition of substitute speech signals that may be used to replace a portion of a user speech signal.

The method 1500 of FIG. 15 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 1500 of FIG. 15 may be performed by a processor that executes instructions, as described with respect to FIG. 19.

Figure 16:
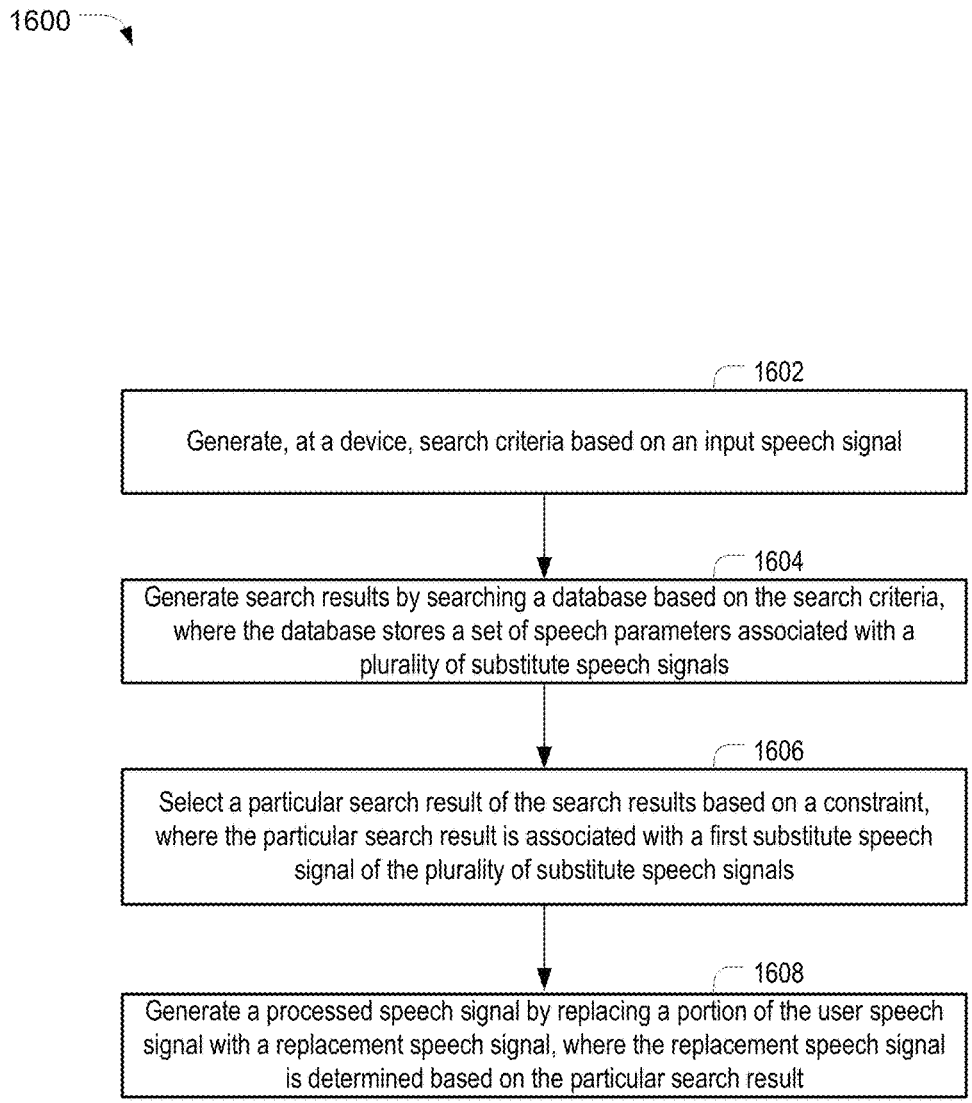
FIG. 16 is a flow chart illustrating another aspect of a method of replacing a speech signal.

Referring to FIG. 16, a flow chart of a particular illustrative aspect of a method of replacing a speech signal is shown and is generally designated 1600. The method 1600 may be executed by the signal processing module 122 of FIG. 1, the signal processing module 422 of FIG. 4, the signal processing module 622 of FIG. 6, the signal processing module 722 of FIG. 7, or a combination thereof.

The method 1600 may include generating, at a device, search criteria based on an input speech signal, at 1602. For example, the analyzer 402 may generate the search criteria 418 based on the first user speech signal 130, as described with reference to FIG. 4. As another example, the analyzer 602 may generate the search criteria 612 based on the first data 630, as described with reference to FIG. 6.

The method 1600 may also include generating search results by searching a database based on the search criteria, at 1604. The database may store a set of speech parameters associated with a plurality of substitute speech signal. For example, the searcher 404 may generate the search results 414 by searching the parameterized database 424 based on the search criteria 418, as described with reference to FIG. 4. As another example, the searcher 604 may generate the set of plurality of speech parameters 614 based on the search criteria 612, as described with reference to FIG. 6. As a further example, the searcher 704 may generate the plurality of substitute speech signals 714 based on the search criteria 612. The parameterized database 424 may include the speech parameters 472, 474, and 476.

The method 1600 may further include selecting a particular search result of the search results based on a constraint, at 1606. The particular search result may be associated with a first substitute speech signal of the plurality of substitute speech signals. For example, the constraint analyzer 406 may select the selected result 416 of the search results 414 based on a constraint, as described with reference to FIG. 4. The selected result 416 may include the first substitute speech signal 172, the first speech parameters 472, or both. As another example, the constraint analyzer 606 may select the first plurality of speech parameters 472 of the set of plurality of speech parameters 614, as described with reference to FIG. 6. As a further example, the constraint analyzer 706 may select the first substitute speech signal 172 of the plurality of substitute speech signals 714, as described with reference to FIG. 7.

The method 1600 may also include generating a processed speech signal by replacing a portion of the user speech signal with a replacement speech signal, at 1608. The replacement speech signal may be determined based on the particular search result. For example, the synthesizer 408 may generate the first processed speech signal 116 by replacing a portion of the first user speech signal 130 with a replacement speech signal, as described with reference to FIG. 4. As another example, the synthesizer 608 may generate the first processed speech signal 116 by replacing a portion of an input signal of the first data 630 with a replacement speech signal, as described with reference to FIG. 6. As a further example, the synthesizer 708 may generate the first processed speech signal 116 by replacing a portion of an input signal of the first data 630 with a replacement speech signal, as described with reference to FIG. 7.

Thus, the method 1600 may enable generation of a processed speech signal by replacing a portion of an input speech signal with a substitute speech signal. The processed speech signal may have a higher audio quality than the input speech signal.

The method 1600 of FIG. 16 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 1600 of FIG. 16 may be performed by a processor that executes instructions, as described with respect to FIG. 19.

Figure 17:
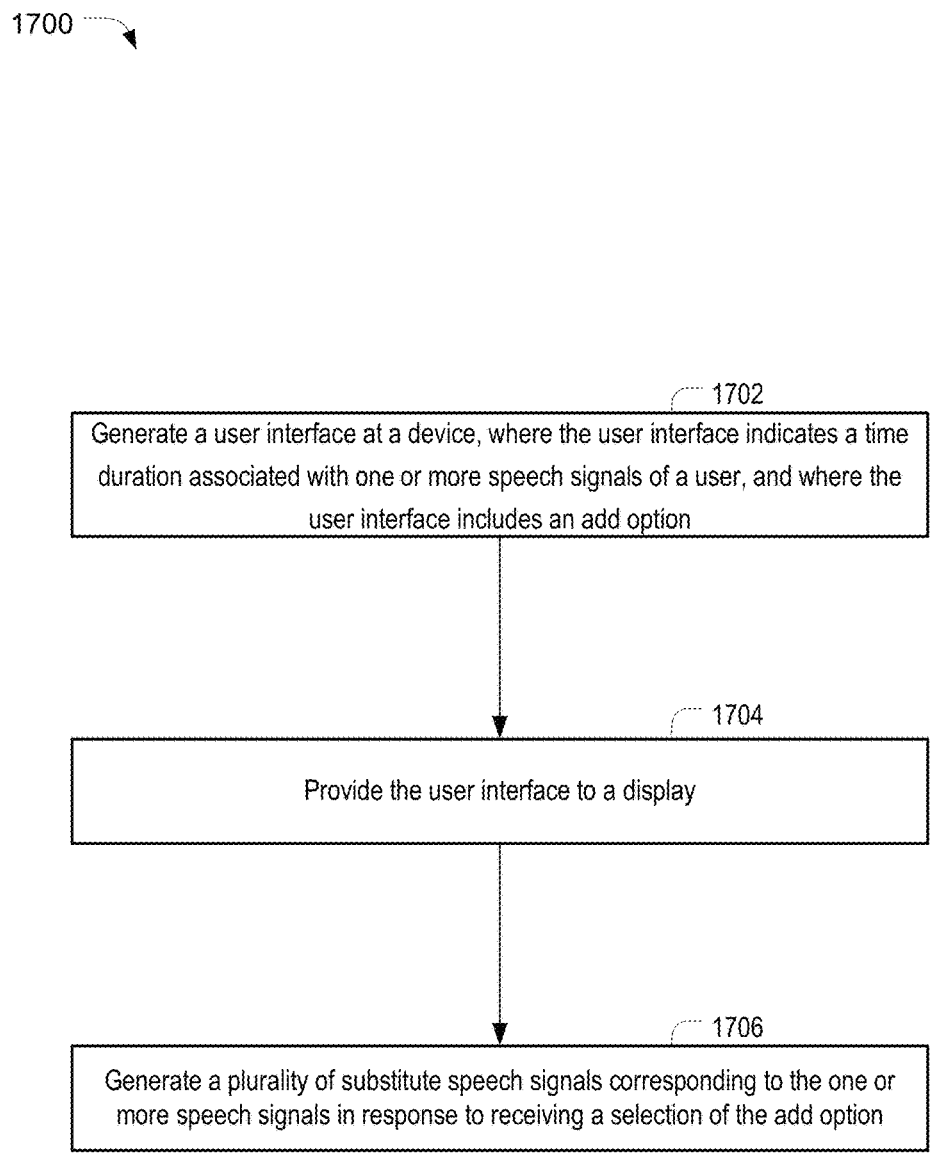
FIG. 17 is a flow chart illustrating another aspect of a method of generating a user interface.

Referring to FIG. 17, a flow chart of a particular illustrative aspect of a method of generating a user interface is shown and is generally designated 1700. The method 1700 may be executed by the signal processing module 122 of FIG. 1, the signal processing module 422 of FIG. 4, the signal processing module 622 of FIG. 6, the signal processing module 722 of FIG. 7, or a combination thereof.

The method 1700 may include generating a user interface at a device, at 1702. The user interface may indicate a time duration associated with one or more speech signals of a user. The user interface may include an add option. For example, the signal processing module 122 of FIG. 1 may generate the user interface 300, as described with reference to FIG. 3. The first bar 302 of the user interface 300 may indicate a time duration associated with one or more speech signals of a user (e.g., "Randal Hughes"), as described with reference to FIG. 3. The user interface 300 may include the add option 308, as described with reference to FIG. 3.

The method 1700 may also include providing the user interface to a display, at 1704. For example, the signal processing module 122 of FIG. 1 may provide the user interface 300 to a display of the first device 102, as described with reference to FIG. 3.

The method 1700 may further include generating a plurality of substitute speech signals corresponding to the one or more speech signals in response to receiving a selection of the add option, at 1706. For example, the signal processing module 122 may generate a plurality of substitute speech signals 112 corresponding to the one or more speech signals in response to receiving a selection of the add option 308 of FIG. 3. To illustrate, the signal processing module 122 may send a request to a speech signal manager 262 in response to receiving the selection of the add option 308 and may receive the plurality of substitute speech signals 112 from the speech signal manager 262, as described with reference to FIG. 3.

Thus, the method 1700 may enable management of substitute speech signals. The method 1700 may enable monitoring of speech signals associated with users. The method 1700 may enable generation of substitute speech signals associated with a selected user.

The method 1700 of FIG. 17 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 1700 of FIG. 17 may be performed by a processor that executes instructions, as described with respect to FIG. 19.

Figure 18:
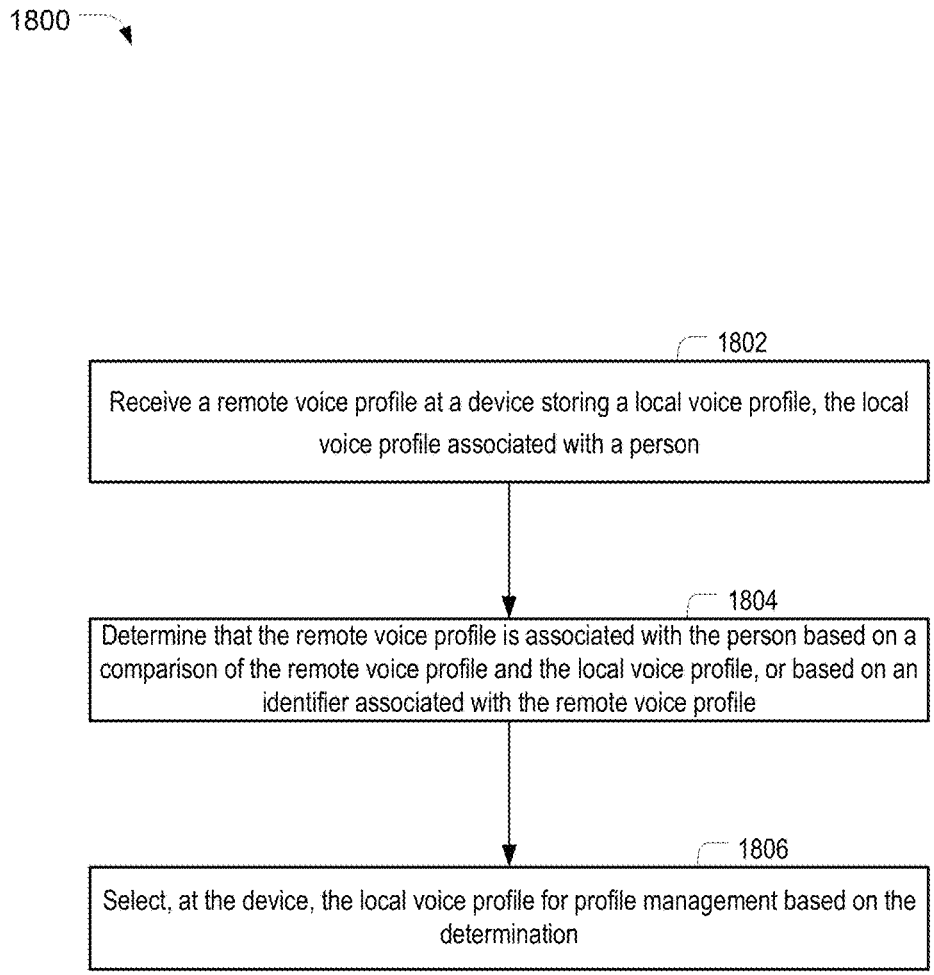
FIG. 18 is a flow chart illustrating another aspect of a method of replacing a speech signal.

Referring to FIG. 18, a flow chart of a particular illustrative aspect of a method of replacing a speech signal is shown and is generally designated 1800. The method 1800 may be executed by the signal processing module 122 of FIG. 1, the signal processing module 422 of FIG. 4, the signal processing module 622 of FIG. 6, the signal processing module 722 of FIG. 7, or a combination thereof.

The method 1800 may include receiving a remote voice profile at a device storing a local voice profile, the local voice profile associated with a person, at 1802. For example, the signal processing module 122 of the first device 102 may receive the remote voice profile 1174 associated with the second user 154, as described with reference to FIG. 11. The first device 102 may store the local voice profile 1104 associated with the second user 154.

The method 1800 may also include determining that the remote voice profile is associated with the person based on a comparison of the remote voice profile and the local voice profile, or based on an identifier associated with the remote voice profile, at 1804. For example, the signal processing module 122 may determine that the remote voice profile 1174 is associated with the second user 154 based on a comparison of speech content associated with the remote voice profile 1174 and speech content associated with the local voice profile 1104, as described with reference to FIG. 11. As another example, the signal processing module 122 may determine that the remote voice profile 1174 is associated with the second user 154 in response to determining that the remote voice profile 1174 includes the identifier 1168 associated with the second user 154, as described with reference to FIG. 11.

The method 1800 may further include selecting, at the device, the local voice profile for profile management based on the determination, at 1806. For example, the signal processing module 122 of the first device 102 may select the local voice profile 1104 based on determining that the remote voice profile 1174 corresponds to the second user 154, as described with reference to FIG. 11. Examples of profile management may include, but are not limited to, updating the local voice profile 1104 based on the remote voice profile 1174, and providing voice profile information to a user by generating a GUI that includes a representation of the remote voice profile 1174, a representation of the local voice profile 1104, or both.

The method 1800 may thus enable a local voice profile of a person to be selected for profile management in response to receiving a remote voice profile of the person from another device. For example, the local voice profile may be compared to the remote voice profile. As another example, the local voice profile may be updated based on the remote voice profile.

The method 1800 of FIG. 18 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 1800 of FIG. 18 may be performed by a processor that executes instructions, as described with respect to FIG. 18.

Figure 19:
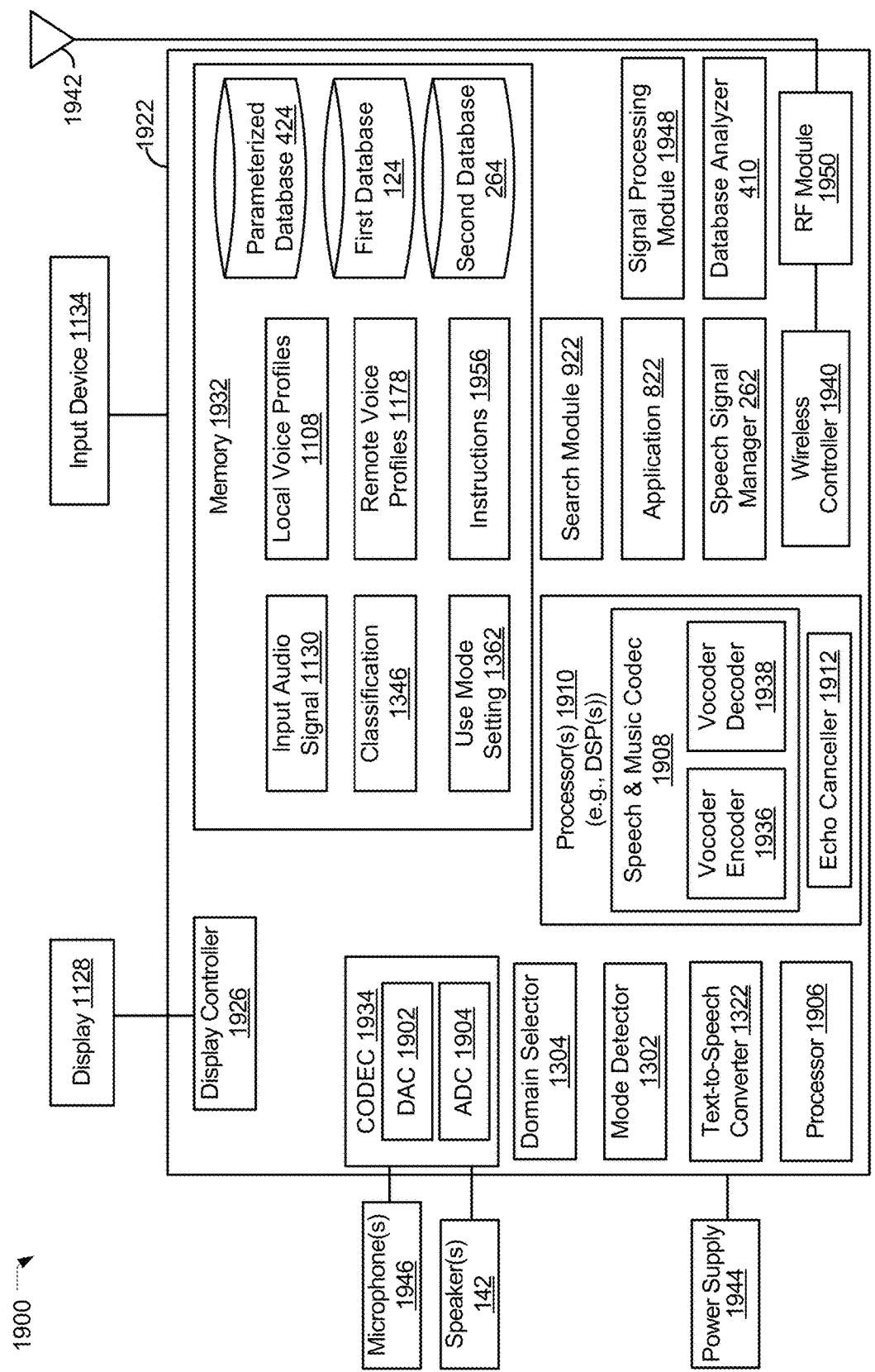
FIG. 19 is a block diagram of a particular illustrative aspect of a device that is operable to replace speech signals in accordance with the systems and methods of FIGS. 1-18.

Referring to FIG. 19, a block diagram of a particular illustrative aspect of a device (e.g., a wireless communication device) is depicted and generally designated 1900. In various aspects, the device 1900 may have more or fewer components than illustrated in FIG. 19. In an illustrative aspect, the device 1900 may correspond to the first device 102, the mobile device 104, the desktop computer 106 of FIG. 1, or the server 206 of FIG. 2. In an illustrative aspect, the device 1900 may perform one or more operations described herein with reference to FIGS. 1-18.

In a particular aspect, the device 1900 includes a processor 1906 (e.g., a central processing unit (CPU)). The processor 1906 may correspond to the processor 1152, the processor 1160 of FIG. 11, or both. The device 1900 may include one or more additional processors 1910 (e.g., one or more digital signal processors (DSPs)). The processors 1910 may include a speech and music coder-decoder (CODEC) 1908 and an echo canceller 1912. The speech and music codec 1908 may include a vocoder encoder 1936, a vocoder decoder 1938, or both.

The device 1900 may include the memory 1932 and a CODEC 1934. The memory 1932 may correspond to the memory 1132, the memory 1176 of FIG. 11, or both. The device 1900 may include a wireless controller 1940 coupled, via a radio frequency (RF) module 1950, to an antenna 1942. The device 1900 may include the display 1128 coupled to a display controller 1926. The speakers 142 of FIG. 1, one or more microphones 1946, or a combination thereof, may be coupled to the CODEC 1934. The CODEC 1934 may include a digital-to-analog converter 1902 and an analog-to-digital converter 1904. In an illustrative aspect, the microphones 1946 may correspond to the microphone 144, the microphone 146 of FIG. 1, the microphone 246 of FIG. 2, the microphones 1244 of FIG. 12, or a combination thereof. In a particular aspect, the CODEC 1934 may receive analog signals from the microphones 1946, convert the analog signals to digital signals using the analog-to-digital converter 1904, and provide the digital signals to the speech and music codec 1908. The speech and music codec 1908 may process the digital signals. In a particular aspect, the speech and music codec 1908 may provide digital signals to the CODEC 1934. The CODEC 1934 may convert the digital signals to analog signals using the digital-to-analog converter 1902 and may provide the analog signals to the speakers 142.

The memory 1932 may include the first database 124 of FIG. 1, the second database 264 of FIG. 2, the parameterized database 424 of FIG. 4, the local voice profiles 1108, the remote voice profiles 1178, the input audio signal 1130 of FIG. 11, the classification 1346, the use mode setting 1362 of FIG. 13, or a combination thereof. The device 1900 may include a signal processing module 1948, the speech signal manager 262 of FIG. 2, the database analyzer 410 of FIG. 4, the application 822 of FIG. 8, the search module 922 of FIG. 9, the mode detector 1302, the domain selector 1304, the text-to-speech converter 1322 of FIG. 13, or a combination thereof. The signal processing module 1948 may correspond to the signal processing module 122 of FIG. 1, the signal processing module 422 of FIG. 4, the signal processing module 622 of FIG. 6, the signal processing module 722 of FIG. 7, or a combination thereof. In a particular aspect, one or more components of the speech signal manager 262, the database analyzer 410, the application 822 of FIG. 8, the search module 922 of FIG. 9, the mode detector 1302, the domain selector 1304, the text-to-speech converter 1322 of FIG. 13, and/or the signal processing module 1948 may be included in the processor 1906, the processors 1910, the CODEC 1934, or a combination thereof. In a particular aspect, one or more components of the speech signal manager 262, the database analyzer 410, the application 822 of FIG. 8, the search module 922 of FIG. 9, the mode detector 1302, the domain selector 1304, the text-to-speech converter 1322 of FIG. 13, and/or the signal processing module 1948 may be included in the vocoder encoder 1936, the vocoder decoder 1938, or both.

The signal processing module 1948, the speech signal manager 262, the database analyzer 410, the application 822, the search module 922, the mode detector 1302, the domain selector 1304, the text-to-speech converter 1322, or a combination thereof, may be used to implement a hardware aspect of the speech signal replacement technique described herein. Alternatively, or in addition, a software aspect (or combined software/hardware aspect) may be implemented. For example, the memory 1932 may include instructions 1956 executable by the processors 1910 or other processing unit of the device 1900 (e.g., the processor 1906, the CODEC 1934, or both). The instructions 1956 may correspond to the speech signal manager 262, the database analyzer 410, the application 822, the search module 922, the mode detector 1302, the domain selector 1304, the text-to-speech converter 1322, the signal processing module 1948, or a combination thereof.

In a particular aspect, the device 1900 may be included in a system-in-package or system-on-chip device 1922. In a particular aspect, the processor 1906, the processors 1910, the display controller 1926, the memory 1932, the CODEC 1934, and the wireless controller 1940 are included in a system-in-package or system-on-chip device 1922. In a particular aspect, the input device 1134 and a power supply 1944 are coupled to the system-on-chip device 1922. Moreover, in a particular aspect, as illustrated in FIG. 19, the display 1128, the input device 1134, the speakers 142, the microphones 1946, the antenna 1942, and the power supply 1944 are external to the system-on-chip device 1922. In a particular aspect, each of the display 1128, the input device 1134, the speakers 142, the microphones 1946, the antenna 1942, and the power supply 1944 may be coupled to a component of the system-on-chip device 1922, such as an interface or a controller.

The device 1900 may include a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, or any combination thereof.

In an illustrative aspect, the processors 1910 may be operable to perform all or a portion of the methods or operations described with reference to FIGS. 1-18. For example, the microphones 1946 may capture an audio signal corresponding to a user speech signal. The ADC 1904 may convert the captured audio signal from an analog waveform into a digital waveform comprised of digital audio samples. The processors 1910 may process the digital audio samples. A gain adjuster may adjust the digital audio samples. The echo canceller 1912 may reduce any echo that may have been created by an output of the speakers 142 entering the microphones 1946.

The processors 1910 may compare a portion of the user speech signal to a plurality of substitute speech signals. For example, the processors 1910 may compare a portion of the digital audio samples to the plurality of speech signals. The processors 1910 may determine that a first substitute speech signal of the plurality of substitute speech signals matches the portion of the user speech signal. The processors 1910 may generate a processed speech signal by replacing the portion of the user speech signal with the first substitute speech signal.

The vocoder encoder 1936 may compress digital audio samples corresponding to the processed speech signal and may form a transmit packet (e.g. a representation of the compressed bits of the digital audio samples). The transmit packet may be stored in the memory 1932. The RF module 1950 may modulate some form of the transmit packet (e.g., other information may be appended to the transmit packet) and may transmit the modulated data via the antenna 1942. As another example, the processor 1910 may receive a training signal via the microphones 1946 and may generate a plurality of substitute speech signals from the training signal.

As a further example, the antenna 1942 may receive incoming packets that include a receive packet. The receive packet may be sent by another device via a network. For example, the receive packet may correspond to a user speech signal. The vocoder decoder 1938 may uncompress the receive packet. The uncompressed waveform may be referred to as reconstructed audio samples. The echo canceller 1912 may remove echo from the reconstructed audio samples.

The processors 1910 may compare a portion of the user speech signal to a plurality of substitute speech signals. For example, the processors 1910 may compare a portion of the reconstructed audio samples to the plurality of speech signals. The processors 1910 may determine that a first substitute speech signal of the plurality of substitute speech signals matches the portion of the user speech signal. The processors 1910 may generate a processed speech signal by replacing the portion of the user speech signal with the first substitute speech signal. A gain adjuster may amplify or suppress the processed speech signal. The DAC 1902 may convert the processed speech signal from a digital waveform to an analog waveform and may provide the converted signal to the speakers 142.

In conjunction with the described aspects, an apparatus may include means for receiving a remote voice profile. For example, the means for receiving the remote voice profile may include the signal processing module 1948, the processor 1906, the processors 1910, the RF module 1950, one or more other devices or circuits configured to receive the remote voice profile, or any combination thereof.

The apparatus may also include means for storing a local voice profile associated with a person. For example, the means for storing may include the memory 1932, the signal processing module 1948, the processor 1906, the processors 1910, one or more other devices or circuits configured to store a local voice profile, or any combination thereof.

The apparatus may further include means for selecting the local voice profile for profile management based on determining that the remote voice profile is associated with the person based on speech content associated with the remote voice profile or an identifier of the remote voice profile. For example, the means for selecting the local voice profile may include the signal processing module 1948, the processor 1906, the processors 1910, one or more other devices or circuits configured to select the local voice profile, or any combination thereof.

The means for receiving, the means for storing, and the means for selecting may be integrated into at least one of a vehicle, an electronic reader device, an acoustic capturing device, a mobile communication device, a smart phone, a cellular phone, a laptop computer, a computer, an encoder, a decoder, a tablet, a personal digital assistant, a display device, a television, a gaming console, a music player, a radio, a digital video player, a digital video disc player, a tuner, a camera, or a navigation device.

Those of skill would further appreciate that the various illustrative logical blocks, configurations, modules, circuits, and algorithm steps described in connection with the aspects disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

It should be noted that although one or more of the foregoing examples describes remote voice profiles and local voice profiles that are associated with specific persons, such examples are for illustrative purposes only, and are not to be considered limiting. In particular aspects, a device may store a "universal" (or default) voice profile. For example, the universal voice profile may be used when a communication infrastructure or environment does not support exchanging voice profiles associated with individual persons. Thus, a universal voice profile may be selected at a device in certain situations, including but not limited to when a voice profile associated with a specific caller or callee is unavailable, when replacement (e.g., higher-quality) speech data is unavailable for a particular use mode or demographic domain, etc. In some implementations, the universal voice profile may be used to supplement a voice profile associated with a particular person. To illustrate, when a voice profile associated with a particular person does not include replacement speech data for a particular sound, use mode, demographic domain, or combination thereof, replacement speech data may instead be derived based on the universal voice profile. In particular aspects, a device may store multiple universal or default voice profiles (e.g., separate universal or default voice profiles for conversation vs. singing, English vs. French, etc.).

The steps of a method or algorithm described in connection with the aspects disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein and is to be accorded the widest scope possible consistent with the principles and novel features as defined by the following claims.

What is claimed is:

1. A device comprising:
a memory configured to store substitute speech data corresponding to substitute speech signals; and
a processor configured to:
generate search result data via a search of the memory based on input speech data corresponding to an input speech signal;
select particular search result data based on a constraint, wherein the particular search result data is associated with particular substitute speech data; and
generate processed speech data by replacing a portion of the input speech data with replacement speech data, wherein the replacement speech data is determined based on the particular search result data.

2. The device of claim 1, wherein the input speech signal comprises a distorted signal, and wherein the processor is further configured to determine that the input speech data includes distortion.

3. The device of claim 2, wherein the processor is further configured to generate search criteria data based on the input speech data, wherein the search criteria data comprises speech parameter data associated with the input speech data.

4. The device of claim 3, wherein the search result data is generated using the input speech data, the search criteria data, or both, wherein the search result data comprise a set of substitute speech data, and wherein the set of substitute speech data substantially matches the input speech data.

5. The device of claim 1, wherein the substitute speech data comprises pulse code modulation (PCM) waveforms.

6. The device of claim 1, wherein the memory is further configured to store speech parameter data associated with the substitute speech data, and wherein the speech parameter data includes a pitch parameter, an energy parameter, a linear predictive coding (LPC) parameter, mel-frequency cepstral coefficients (MFCC), line spectral pairs (LSP), line spectral frequencies (LSF), a cepstral, line spectral information (LSI), discrete cosine transform (DCT) parameters, pulse code modulation (PCM), discrete fourier transform (DFT) parameters, fast fourier transform (FFT) parameters, formant frequencies, or a combination thereof.

7. The device of claim 1, wherein the processor is further configured to generate the search result data based on a comparison of the input speech data and speech parameter data.

8. The device of claim 1, wherein the processor is further configured to:
copy the input speech data to generate copied speech data;
remove the portion of the input speech data from a particular location of the copied speech data; and
concatenate the replacement speech data and the copied speech data at the particular location to generate the replacement speech data.

9. The device of claim 1, wherein the constraint comprises a cost constraint, an error constraint, or both.

10. A device comprising:
a memory configured to store a plurality of substitute speech data corresponding to a plurality of substitute speech signals; and
a processor electrically coupled to the memory and configured to:
identify at least a portion of speech data, the speech data corresponding to speech signals;
select, based on the substitute speech data, a portion of the substitute speech data that matches the portion of the speech data; and
replace at least the portion of the speech data with the selected portion of the substitute speech data to generate output speech data.

11. The device of claim 10, wherein the processor is further configured to encode the output speech data to generate encoded output speech data, and further comprising a transmitter configured to transmit the encoded output speech data.

12. The device of claim 11, wherein the encoded output speech data comprises packetized speech data, and further comprising an output device configured to project the output speech data, wherein the output device comprises a speaker device.

13. The device of claim 10, further comprising a receiver configured to receive encoded speech data, wherein the processor is further configured to decode the encoded speech data to generate reconstructed speech data, the reconstructed speech data corresponding to the speech data.

14. The device of claim 10, wherein the speech data comprises sequential speech data frames, wherein a first speech data frame is sequentially prior to a second speech data frame that corresponds to the portion of the speech data, and wherein the processor is further configured to:
generate a first match value indicative of a first quality of a first match between the portion of the substitute speech data and the second speech data frame; and
in response to a determination that the first match value is less than a threshold value, generate a second match value indicative of a second quality of a second match among the portion of the substitute speech data, the first speech data frame and the second speech data frame.

15. The device of claim 14, wherein the processor is further configured to compare the second match value to a second threshold, and wherein generation of the output speech data corresponds to a concatenation of the portion of the substitute speech data to the first speech data frame.

16. A device comprising:
a receiver configured to receive an indicator representative of a locator value associated with substitute speech data;
a memory configured to store the substitute speech data corresponding to a plurality of substitute speech signals; and
a processor electrically coupled to the memory and configured to:
select a portion of the substitute speech data based on the locator value, the portion associated with a particular substitute speech signal; and
generate output speech data based on the portion of the substitute speech data.

17. The device of claim 16, wherein the substitute speech data includes a plurality of substitute speech data portions substantially devoid of distortion.

18. The device of claim 16, wherein the receiver is further configured to receive a representation of speech data corresponding to a speech signal, and wherein the output speech data comprises an overlap of components of the portion of the substitute speech data with a portion of reconstructed speech data, the reconstructed speech data based on the representation of the speech data.

19. The device of claim 16, wherein the output speech data comprises a concatenation of the portion of the substitute speech data and a first speech frame corresponding to speech data.

20. The device of claim 19, wherein the concatenation comprises a substitution of a second speech frame of the speech data with the portion of the substitute speech data and a joining of the portion of the substitute speech data with the first speech frame, and wherein the second speech frame comprises distorted speech data.

21. A device comprising:
- a memory configured to store substitute speech data corresponding to a plurality of substitute speech signals and to store a plurality of locator values, each locator value associated with a corresponding portion of the substitute speech data;
- a microphone configured to receive a speech signal and to convert the speech signal to speech data; and
- a processor electrically coupled to the memory and configured to:
  - receive the speech data from the microphone;
  - identify, based on at least a portion of the speech data, a locator value corresponding to a particular portion of the substitute speech data that matches the portion of the speech data; and
  - generate output data that includes an indication of the locator value.

22. The device of claim 21, wherein the locator value corresponds to an index value indicative of a memory location of the memory at which the particular portion of the substitute speech data is stored.

23. The device of claim 21, wherein the locator value corresponds to a pointer indicative of a memory location of the memory at which the particular portion of the substitute speech data is stored.

24. The device of claim 21, further comprising a transmitter configured to transmit the output data including the indication of the locator value.

25. The device of claim 21, wherein the processor is further configured to select the particular portion of the substitute speech data that matches the portion of the speech data based on a comparison of first audio parameters of the substitute speech data and second audio parameters of the portion of the speech data.

26. The device of claim 21, wherein the processor is further configured to:
- determine a first match value indicative of a quality of a match between the particular portion of the substitute speech data and the portion of the speech data; and
- compare the first match value to a threshold value.

27. The device of claim 26, wherein the processor is further configured to select the particular portion of the substitute speech data in response to a determination that the first match value equals or exceeds the threshold value.

28. A device comprising:
- a memory configured to store substitute speech data corresponding to a plurality of substitute speech signals;
- a processor configured to generate a graphical user interface (GUI) that indicates a playback duration of the substitute speech data; and
- an interface configured to display the GUI.

29. The device of claim 28, wherein the playback duration is associated with a quantity of frames of substitute speech data, wherein the memory is further configured to store an association between the substitute speech data and a plurality of user identifiers, each user identifier corresponding to a different person, and wherein the substitute speech data comprises first substitute speech data corresponding to a first user identifier, second substitute speech data corresponding to a second user identifier, and third substitute speech data corresponding to a third user identifier.

30. The device of claim 29, wherein the processor is further configured to transmit a request for additional substitute speech data associated with a particular user identifier of the plurality of user identifiers in response to a determination that a first playback duration of first substitute speech data satisfies an update threshold.

31. The device of claim 29, wherein the GUI is configured to receive a first command indicating deletion of the first substitute speech data.

32. The device of claim 29, wherein the GUI indicates a first age of first substitute speech data, a second age of second substitute speech data, and a third age of third substitute speech data, and wherein the substitute speech data corresponds to substantially undistorted speech signals.

33. The device of claim 31, wherein an age of substitute speech data corresponds to a date of acquisition of the substitute speech data.

34. The device of claim 29, wherein the GUI is configured to receive a second command indicating addition of fourth substitute speech data associated with a fourth user identifier of the plurality of user identifiers.

* * * * *